(12) United States Patent
Albert et al.

(10) Patent No.: US 10,052,814 B2
(45) Date of Patent: Aug. 21, 2018

(54) APPARATUS, METHOD AND SYSTEM FOR CONSTANT DISTANCE EXTRUSION ONTO A 3-D PRINTER PLATFORM

(71) Applicant: FunFare, LLC, Redwood City, CA (US)

(72) Inventors: Charles Albert, Redwood City, CA (US); David G. Capper, Novato, CA (US); Andrew S. Filo, Cupertino, CA (US); Jason G. Heller, San Mateo, CA (US)

(73) Assignee: FunFare, LLC, Redwood City, CA (US)

( * ) Notice: Subject to any disclaimer, the term of this patent is extended or adjusted under 35 U.S.C. 154(b) by 0 days.

(21) Appl. No.: 15/668,040

(22) Filed: Aug. 3, 2017

(65) Prior Publication Data

US 2017/0355153 A1 Dec. 14, 2017

Related U.S. Application Data

(63) Continuation of application No. 15/162,046, filed on May 23, 2016, now Pat. No. 9,764,514, which is a
(Continued)

(51) Int. Cl.
*B29C 64/20* (2017.01)
*B29C 64/245* (2017.01)
(Continued)

(52) U.S. Cl.
CPC ............ *B29C 64/245* (2017.08); *B29C 47/92* (2013.01); *B29C 64/106* (2017.08);
(Continued)

(58) Field of Classification Search
None
See application file for complete search history.

(56) References Cited

U.S. PATENT DOCUMENTS

| 6,027,068 | A | 2/2000 | Lantsman |
| 6,280,785 | B1 * | 8/2001 | Yang .................... A21C 11/163 |
| | | | 425/112 |

(Continued)

OTHER PUBLICATIONS

International Search Report dated Aug. 11, 2016 from International Application No. PCT/US2016/020517.
(Continued)

*Primary Examiner* — Matthew J Daniels
*Assistant Examiner* — Manley L Cummins, IV
(74) *Attorney, Agent, or Firm* — Beyer Law Group LLP

(57) ABSTRACT

An apparatus, method, system for 3-D printing that includes a nozzle and a movable platform, wherein the platform provides for a constant distance configuration of the platform relative to the extrusion emitter or nozzle thereby precluding the need to level the printer. The apparatus includes motion vectors associated with each direction of motion of the movable platform. A central point of origin is further provided for establishing the directions of movement of the movable cantilevered platform. The direction of motion of the motion vectors each pass through the central point of origin thereby providing a movable platform that stays a constant distance relative to the nozzle when moved in any planar direction within each layer.

22 Claims, 34 Drawing Sheets

Related U.S. Application Data continuation-in-part of application No. 15/059,187, filed on Mar. 2, 2016.

(60) Provisional application No. 62/126,876, filed on Mar. 2, 2015.

(51) Int. Cl.
*B29C 47/92* (2006.01)
*B29C 67/24* (2006.01)
*B29C 64/112* (2017.01)
*B29C 64/106* (2017.01)
*B29C 64/386* (2017.01)
*B33Y 30/00* (2015.01)
*B33Y 50/02* (2015.01)
*B33Y 10/00* (2015.01)

(52) U.S. Cl.
CPC ............ *B29C 64/112* (2017.08); *B29C 64/20* (2017.08); *B29C 64/386* (2017.08); *B29C 67/245* (2013.01); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 6,685,866 B2 | 2/2004 | Swanson et al. |
| 7,168,935 B1 | 1/2007 | Taminger et al. |
| 7,938,351 B2 | 5/2011 | Taatjes et al. |
| 8,070,474 B2 | 12/2011 | Abe et al. |
| 8,827,684 B1 | 9/2014 | Schumacher et al. |
| 9,205,600 B1 | 12/2015 | Kerr et al. |
| 9,248,600 B2 * | 2/2016 | Goodman ............... B29C 64/35 |
| 9,266,288 B2 | 2/2016 | Okamura |
| 2001/0030383 A1 | 10/2001 | Swanson et al. |
| 2002/0050411 A1 | 5/2002 | Kusumoto et al. |
| 2010/0100222 A1* | 4/2010 | Skubic ................ B29C 67/0085 700/110 |
| 2012/0164256 A1 | 6/2012 | Swanson et al. |
| 2014/0085620 A1* | 3/2014 | Lobovsky ........... G03F 7/70775 355/72 |
| 2014/0159284 A1 | 6/2014 | Leavitt |
| 2014/0197576 A1 | 7/2014 | Kraibuhler et al. |
| 2014/0265034 A1 | 9/2014 | Dudley |
| 2015/0037445 A1 | 2/2015 | Murphy et al. |
| 2015/0054918 A1 | 2/2015 | Lee et al. |
| 2015/0147424 A1* | 5/2015 | Bibas .................. B29C 67/0088 425/150 |
| 2015/0251360 A1* | 9/2015 | Steele .................... B33Y 10/00 264/308 |
| 2015/0276119 A1* | 10/2015 | Booker ............... B29C 67/0092 248/561 |
| 2016/0031160 A1* | 2/2016 | Din ....................... B33Y 30/00 425/113 |
| 2016/0052207 A1* | 2/2016 | Bloom ................ B29C 67/0085 425/3 |
| 2016/0067628 A1 | 3/2016 | Reid et al. |
| 2016/0067740 A1* | 3/2016 | Voris .................. B29C 67/0055 427/402 |
| 2016/0068793 A1 | 3/2016 | Maggiore |
| 2016/0096329 A1 | 4/2016 | Ko et al. |
| 2016/0257068 A1 | 9/2016 | Albert et al. |
| 2016/0271873 A1 | 9/2016 | Albert et al. |
| 2016/0297149 A1 | 10/2016 | Albert et al. |

OTHER PUBLICATIONS

Written Opinion dated Aug. 11, 2016 from International Application No. PCT/US2016/020517.

\* cited by examiner

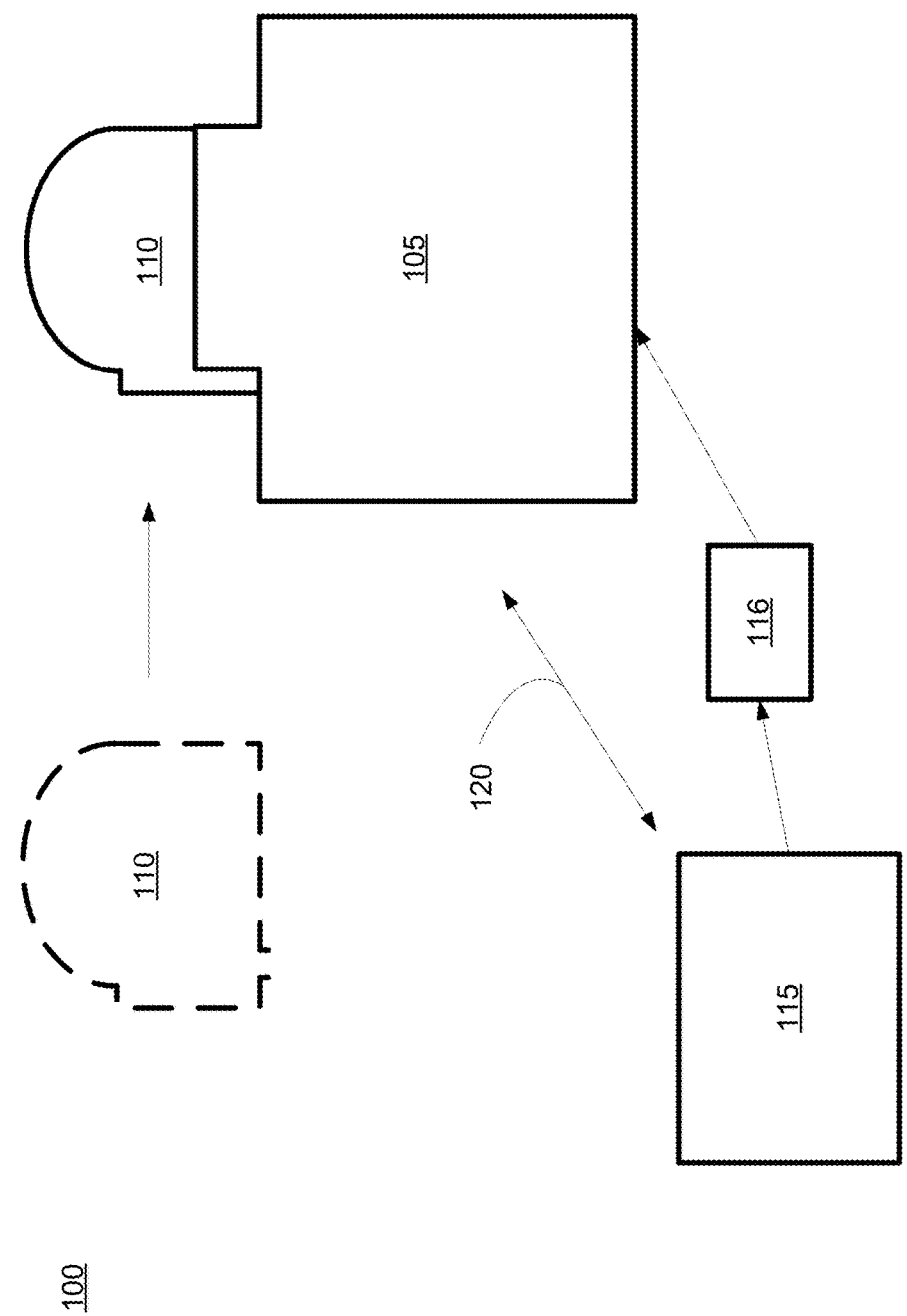

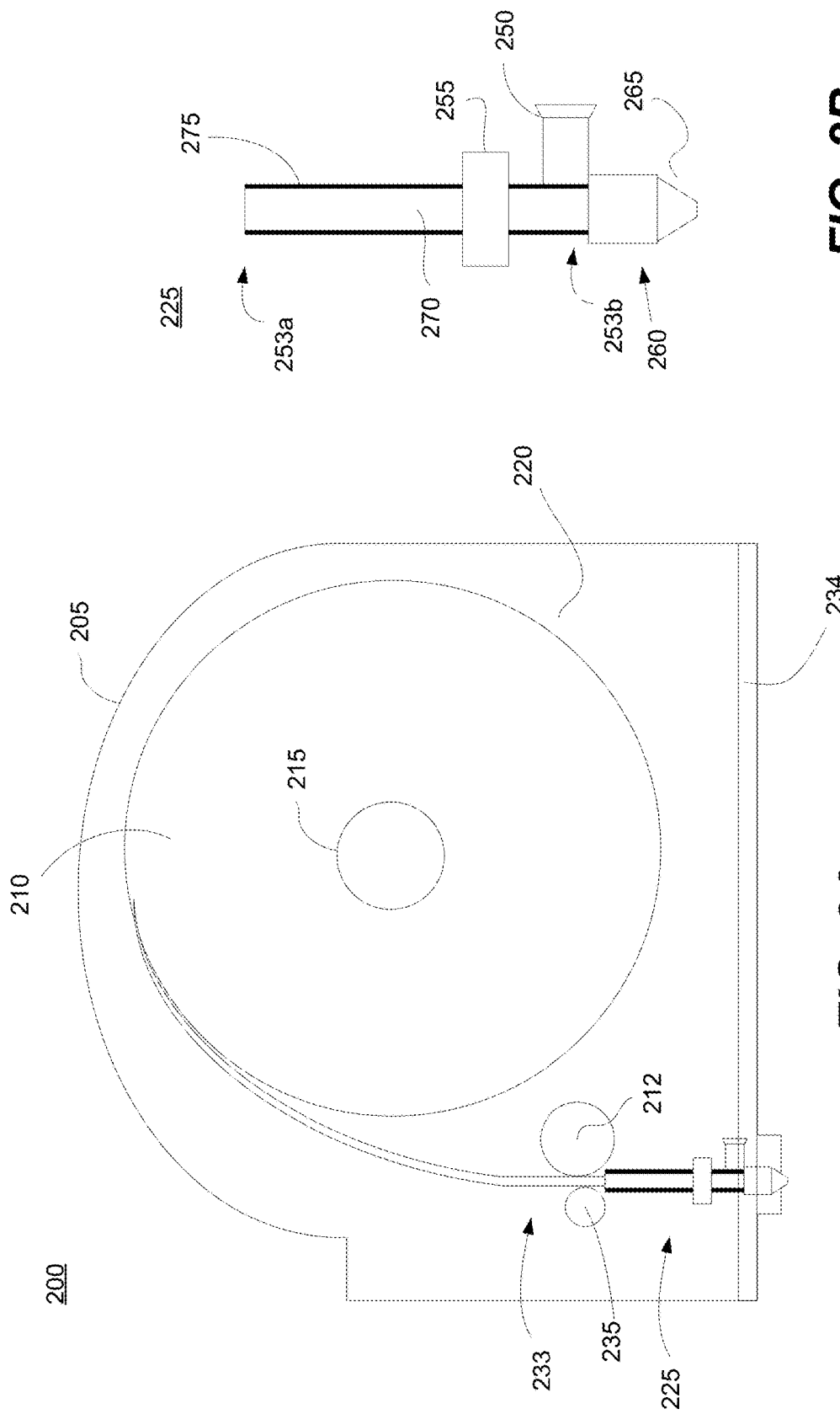

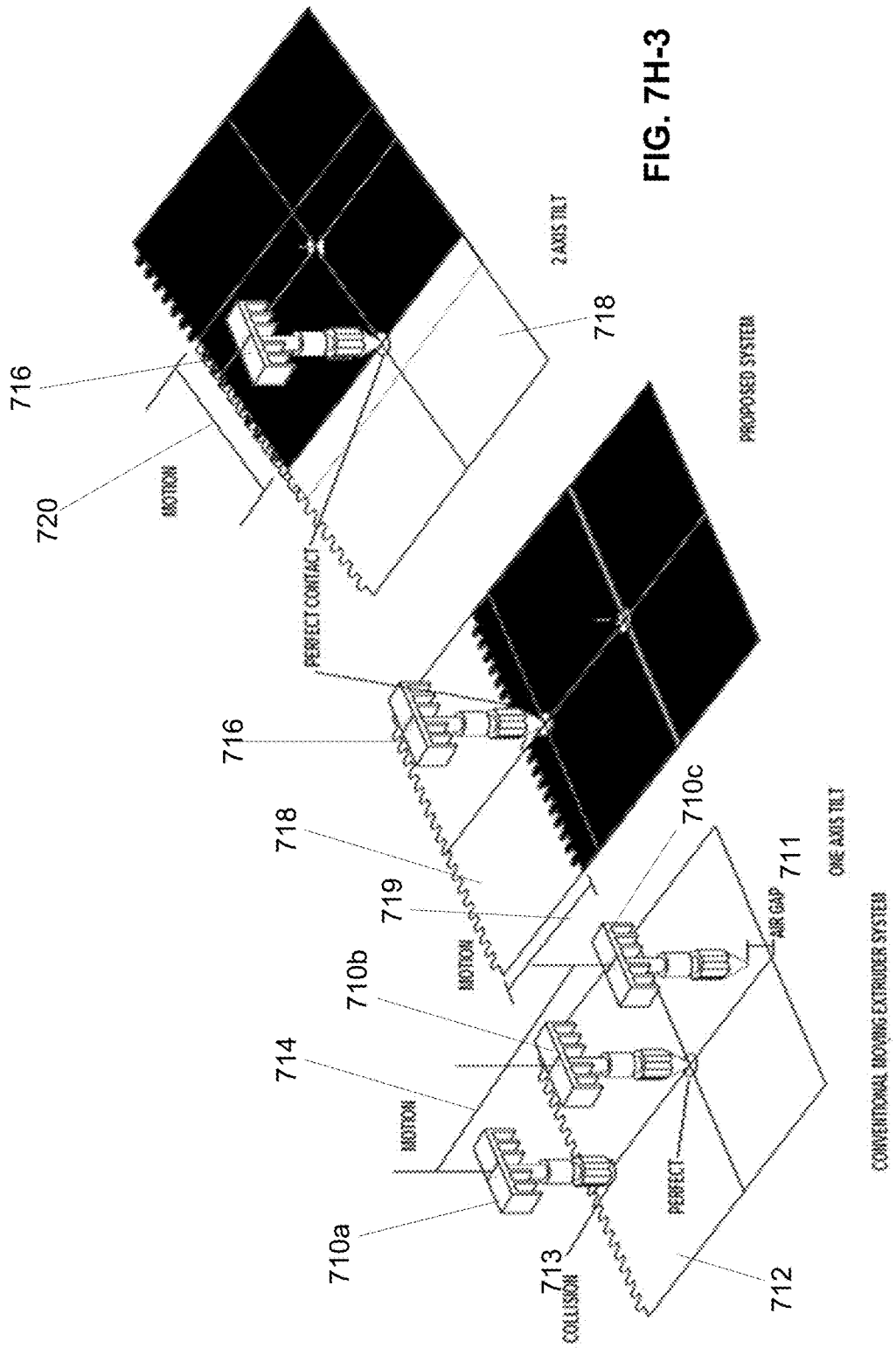

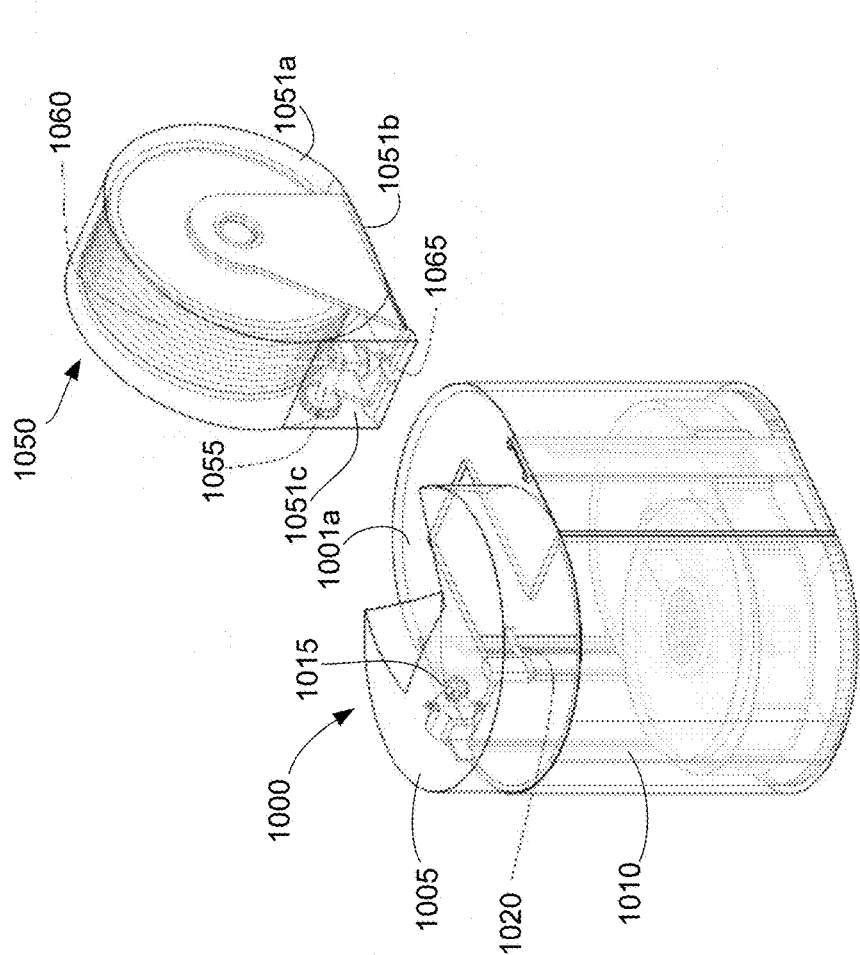

APPARATUS, METHOD AND SYSTEM FOR CONSTANT DISTANCE EXTRUSION ONTO A 3-D PRINTER PLATFORM

CROSS-REFERENCE TO RELATED APPLICATION(S)

This application is a Continuation of U.S. application Ser. No. 15/162,046, filed May 23, 2016. U.S. application Ser. No. 15/162,046 is a Continuation-in-Part of U.S. application Ser. No. 15/059,187, filed Mar. 2, 2016, which claims priority of U.S. Provisional Patent Application No. 62/126,876, filed Mar. 2, 2015. All of these priority applications are incorporated herein by reference in their entirety for all purposes.

FIELD OF THE INVENTION

The present invention relates to three dimensional printing, and in particular to a 3-D printer configuration that provides for constant distance extrusion onto a 3-D printer platform from a printing nozzle.

BACKGROUND OF THE INVENTION

Three dimensional (3-D) printing is an increasingly popular way of creating objects. Generally, three-dimensional printing involves dispensing successive layers of a deposition material (e.g., plastic) to form an object. In the past, manufacturing companies would use expensive, complicated equipment to print objects. However, the devices used for 3-D printing have become more affordable and simpler to use. As a result, many hobbyists and non-engineers have embraced three-dimensional printing and used it to create a wide variety of objects, such as toys, household items and even simple machines.

In various implementations, 3-D printing is performed using a computer, deposition material (e.g., plastic filament) and a printer. At the computer, a user executes a program for modeling a desired object. The object is virtually sliced into 2-D layer data. The layer data, which indicates the shape and features of the object, is transmitted to the printer. Based on the received data, the printer determines how different parts of the printer (i.e., nozzle, platform, etc.) should be moved to form a 3-D object from the successive 2-D layers. The printer typically heats a deposition material and feeds it into the nozzle. The nozzle of the printer then releases the deposition material over the platform. The printer moves the nozzle and platform relative to one another such that the desired object is gradually formed through the deposition of successive layers over the platform.

In order to create the rendered 3-D object, the printer must accurately deposit the first layer of deposition material at a constant height distance. This anchors the rendered object to a flat surface in the printer and prevents the object from moving, warping, or breaking free during the print cycle. To successfully attach the first layer of the object being rendered, the extruder or emitter or nozzle of the print device must be within close proximity and a consistent height distance to the printer's build surface or platform. While the height distance for each subsequent layer might be different than the previous layer, the height distance across each particular layer must be maintained at a distance that allows for consistent adhesion to the layer below.

In prior 3-D printer configurations, the printer must be leveled or trued so that the material emitter (or nozzle) is the same distance from the build surface throughout the entire surface traveled. Another problem is that a level platform setting must be maintained during the entire print operation, which could often take days for a large or complex print operation. Yet another problem is that the machine must keep this level tolerance during its full operational life. Attempts to solve these problems have relied on solutions including manual leveling adjustments and motorized tilt adjustments. More complex solutions involve performing a precise platform scan or detection with sensors, and then developing a software map of the print surface leveling errors. The errors will then be compensated for during the print operation. While these methods provide forms of relief for the underlying symptoms, they are complex and do not address the underlying cause.

In the end, the nozzle and platform need to be a constant distance relative to each other, without complicated adjustments, for the deposition of each successive 2-D layer. If this distance is maintained correctly throughout all motions of the 3-D printer, then the 3-D object will be formed correctly.

SUMMARY OF THE INVENTION

The present invention relates to systems, methods, software, devices and hardware relating to three dimensional printing. Some embodiments of the present invention relate to a cartridge and a three dimensional printer arranged to interface with the cartridge. Other embodiments relate to the providing a 3-D printer platform having a constant distance relative to the printing nozzle.

In one aspect of the present invention, a printer apparatus is provided for providing layers including a nozzle, a movable stage, and a platform, the printer having a constant distance configuration between the nozzle and the platform, the apparatus comprising: a movable stage being coupled to the printer so that it moves in a vertical direction and planar directions, wherein a motion vector is associated with each direction of motion; a platform associated with the movable stage, the platform including a central point of origin for defining the motion vectors and for establishing the constant distance from the nozzle; and wherein each motion vector is configured to pass through the central point of origin thereby providing a movable platform that stays the constant distance relative to the nozzle when the platform is moved in any of the planar directions within a layer and thereby precludes the need to level the printer apparatus.

In another aspect of the present invention, a method for providing a printer for creating layers is provided including a nozzle and a movable stage with an associated platform, the printer having a constant distance configuration between the nozzle and the platform, the method comprising the steps of: moving the stage and associated platform in different directions, with a motion vector being associated with each direction of motion of the platform; defining a central point of origin for the movable platform; coupling the moving stage and associated platform so that each motion vector passes through the central point of origin thereby providing a platform that stays the constant distance relative to the nozzle when the platform is moved in any direction within a layer and thereby precluding the need to level the printer apparatus.

In another aspect of the present invention, a printer system is provided for providing layers having a nozzle and a movable stage with a platform, the printer system having a constant distance configuration between the nozzle and the platform, the system comprising: a movable platform having a set of motion vectors associated with the motion of the platform, wherein each direction of motion has a corresponding motion vector; a central point of origin for the motion vectors of the movable platform; and a movable stage for holding the platform, the stage oriented so that each direction of motion of the corresponding vectors passes through the central point of origin and thereby provides a movable platform that stays a constant distance relative to the nozzle when the platform is moved in any direction within a layer and thereby precludes the need to level the printer apparatus.

In another aspect of the present invention, a 3-D printer system is provided for generating a 3-D object from successive 2-D layers, the system having a nozzle and a movable stage with a platform for providing a constant height between the nozzle and the platform for each successive 2-D layer printed, the system comprising: a movable platform having a set of motion vectors associated with the motion of the platform, wherein each direction of motion has a corresponding motion vector; a central point of origin for establishing the motion vectors of the movable platform; and a movable stage for holding the platform, the stage configured so the motion vectors pass through the central point of origin, with the motion vectors having motion vector angles that are coincident to the nozzle, thereby providing a movable platform that remains at a constant height relative to each 2-D layer of a 3-D printed object.

BRIEF DESCRIPTION OF THE DRAWINGS

The invention and the advantages thereof, may best be understood by reference to the following description taken in conjunction with the accompanying drawings in which:

FIG. 1 is a diagram of a three-dimensional printing system according to a particular embodiment of the present invention.

FIG. 2A is a diagram of a cartridge according to a particular embodiment of the present invention.

FIG. 2B is a diagram of a nozzle assembly according to a particular embodiment of the present invention.

FIG. 7H-1 shows the relative motion of a prior art extruder configuration.

FIG. 7H-2 shows the relative motion of a present extruder configuration in relation to a first plane of motion.

FIG. 7H-3 shows the relative motion of a present extruder configuration in relation to a second plane of motion.

FIG. 7I-1 shows a succession of layers being formed, each having a consistent height or thickness.

FIG. 7I-2 shows a succession of layers being formed, each tracking upward along the Z or vertical axis.

FIG. 10 is perspective view of a cartridge and three-dimensional printer according to a particular embodiment of the present invention.

DETAILED DESCRIPTION OF THE PREFERRED EMBODIMENTS

Figure 3A:
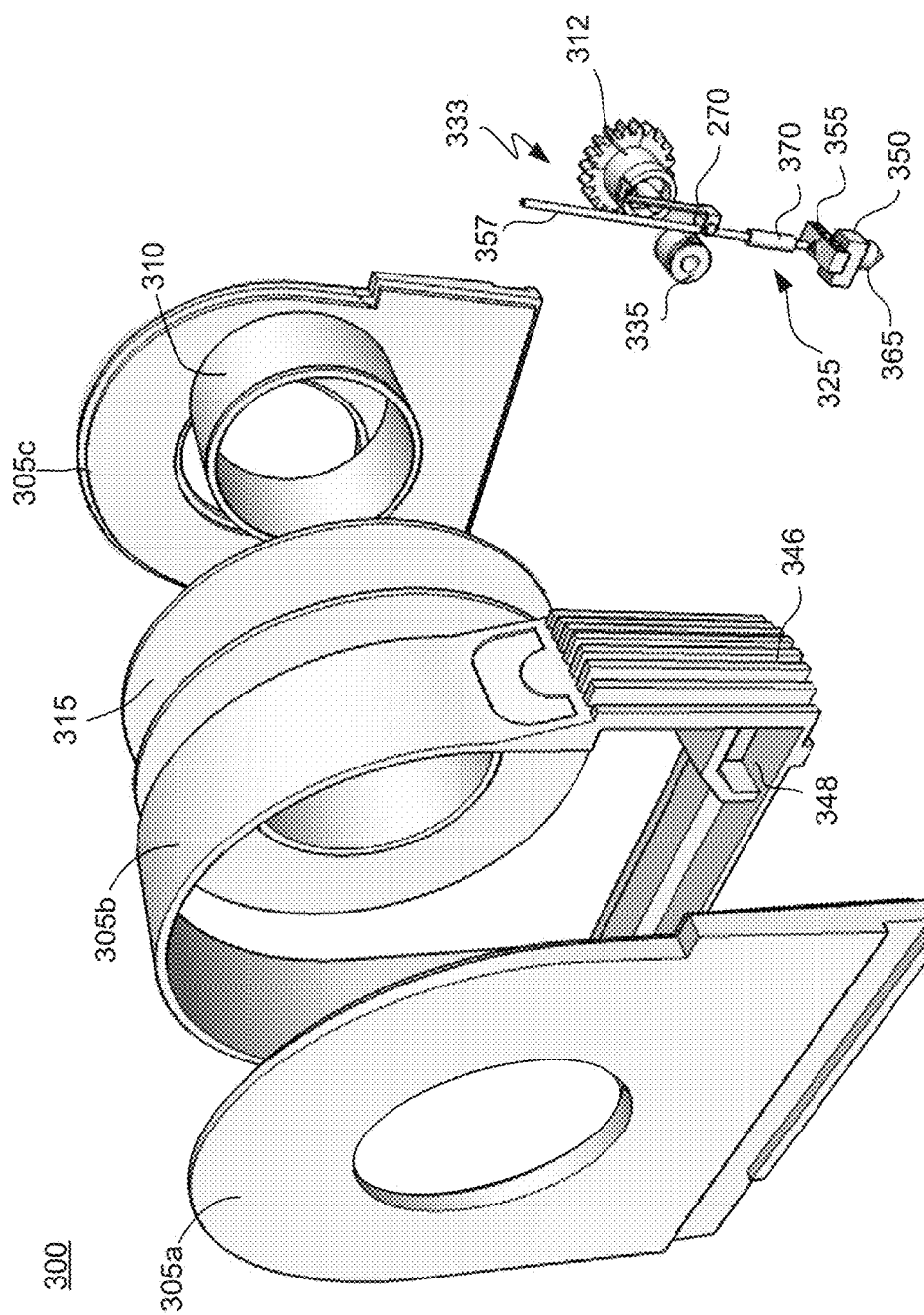
FIG. 3A is an illustration of the cartridge and its internal components according to a particular embodiment of the present invention.

As noted in the Background, over time three-dimensional printers have become smaller and more affordable. As a result, they have started to spread from industrial facilities and businesses into the homes and garages of hobbyists and non-engineers.

Although the operation of three-dimensional printers has become somewhat simplified over the years, they are nevertheless still challenging to use. For example, many conventional printers require that a user manually mount a spool of plastic filament into the printer. Afterward, the user holds one end of the filament and inserts it into a feed mechanism that leads to a nozzle. When the printer is operating properly, it will continuously move the filament through the feed mechanism, melt the filament into a plastic state, and then release the plastic from the nozzle to form a desired object.

In this process, however, a number of problems can occur. For instance, the insertion of the filament into the tube and nozzle requires fine precision and can be done improperly. It takes time and can be tedious to perform. Also, since the filament is manually handled and is exposed to the air, oil, hair and dust can easily collect on the filament and/or enter the feed mechanism. As a result, a clog can form in the feed mechanism and/or in the nozzle, which can cause an error in the printing process. Whenever this happens, the user must remove the clog and realign the filament with the feed mechanism. This can be a challenging and frustrating process, particularly for a layperson.

Another source of frustration is the positioning of the nozzle prior to printing. For example, in some Cartesian printers, the printer causes the nozzle to touch the platform. In various implementations, the nozzle must touch the platform in multiple locations e.g., four or more locations. This is because in such printers, if the entire platform is not extremely flat, the print may fail. That is, the printer uses the contact between the nozzle and the platform to confirm the flatness of the platform as well as the position of the nozzle relative to the platform. In some designs, if the platform is not found to be sufficiently flat for printing, the printer will display a warning to the user. The user must then manually adjust the position of the platform. Sometimes, the user will receive multiple warnings and will have to manually adjust the position of the platform multiple times, because even a slight slant in the platform can cause printing to fail. Such a situation, of course, can cause much frustration for the user.

Another source of difficulty comes from the platform becoming unlevel relative to the printing nozzle. Prior 3-D printers have required strict compliance requirements regarding the platform being level. Over time and use, the platform drifts out of level and alignment screws or other such means are provided to adjust the platform back to a level state. This adjustment process can prove to be cumbersome and counterproductive, as adjustments to one side of the platform can often cause another side to be adversely affected.

Various embodiments of the present invention address one or more of the above issues. Referring initially to FIG. 1, a system 100 for three-dimensional printing according to a particular embodiment of the present invention will be described. The system includes a printer cartridge 110, a three-dimensional printer 105 and a computing device 115.

The computing device 115 is arranged to transmit or transfer data indicating the dimensions and/or characteristics of an object that will be formed in the 3-D printer 105. In some embodiments, for example, the computing device 115 stores a three-dimensional model of the object. The user may interact with the computing device to edit or create the model, and/or it may be downloaded or transferred into the computing device 115. In various implementations, software on the computing device 115 then slices the model into multiple, successive layers. The computing device 115 transmits the data indicating the object characteristics, layers and/or the model to the 3-D printer over a network 120. Alternatively the data can be transferred via the use of removable or transferrable memory device 116 that is loaded via the computing device 115 and used to transfer data over to the 3-D printer device 105. Any suitable software may be installed and used on the computing device 115 to perform the above operations e.g., 3-D modeling software, software suitable for generating 3D files, and so forth.

The computing device 115 may be any device suitable for communicating with and controlling the 3-D printer 105. In some embodiments, the computing device is a laptop, a computer tablet, smart phone, desktop computer and/or another type of computing device. Any suitable network or communications protocol may be used to transmit data to and/or receive data from the 3-D printer, e.g., WiFi, Ethernet, Bluetooth, etc. The network 120 may be wired or wireless. The memory 116 can be any form of movable memory, including, e.g., a memory stick, solid-state drive (SSD), magnetic storage means, or memory cartridge.

The cartridge 110 is arranged to provide deposition material to the 3-D printer 105. The cartridge 110 may have a wide variety of configurations, shapes and designs. The cartridge can be configured to dispense or extrude any of a variety of substances, including filament, paste, liquid, food, gels, putty, and/or any other building material (both organic and inorganic) that can be dispensed in a controlled manner. Filament materials can include, for example, acrylonitrile butadiene styrene (ABS) or polylactic acid (PLA), nylon, polymide and laywood. Photopolymers can also be dispensed as a liquid and then hardened (or cured) via a photoinitiator such as UV light. Organic materials such as bone or bone fragments could also be mixed with other materials to generate replacement bones. Materials can be interchangeably used having a different modulus of rigidity, for instance with some being flexible and some being rigid. The cartridge can also be configured to hold a marking instrument such as a pen (e.g., when the device is used as a plotter or otherwise arranged to mark objects), a knife or a cutting tool (e.g. when the device is used as a subtractive manufacturing machine). Combinations of any such materials or devices can lead to unique formations of 3-D printed objects, the formation of which is uniquely facilitated by the 3-D printer configuration described below.

A representative example design of the cartridge 110 will be described in more detail later in this application in connection with FIG. 2A. In some implementations, for example, a spool of filament is rotatably mounted within a housing. A feed mechanism within the housing helps direct filament towards a nozzle assembly in the cartridge. The nozzle assembly is arranged to dispense the deposition material within a compartment of the 3-D printer.

Generally, the cartridge 110 includes an engagement element on its exterior. For example, the engagement element may be but is not limited to a slot, a latch and/or rail.

In various designs, the cartridge is arranged to be slid into or inserted into the 3-D printer using the engagement element. Generally, the cartridge is removable e.g., in various embodiments, it may be easily and repeatedly engaged with and withdrawn from the 3-D printer 105, and is not (permanently) attached with adhesive, screws and/or bolts to the printer 105.

The use of the cartridge offers various benefits. For one, it prevents the deposition material and/or the feed mechanism from being exposed. This helps prevent dirt and oil from entering the feed mechanism and causing a clog. Additionally, the user need not manually insert a filament or deposition material into the nozzle assembly. Instead, in various designs, the filament is pre-inserted into the nozzle assembly and encased in the housing. Thus, once the cartridge is engaged with the printer, the filament is already properly positioned within the cartridge so that it can be heated and dispensed to form the desired object on the platform.

When the cartridge 110 is properly engaged with the printer 105 and object data has been received from the computing device 115, the 3-D printer 105 is arranged to determine the printer operations necessary to form the desired object. Generally, the 3-D printer 105 includes a printing compartment and a platform. The cartridge provides a nozzle assembly and a supply of deposition material. The 3-D printer 105 is arranged to dispense the deposition material from the nozzle assembly in order to form the object indicated in the data received from the computing device 115.

Various implementations of the 3-D printer 105 include features that make the printer easier to use and calibrate. In some embodiments, for example, the platform of the printer includes a contact. The contact, which may include a button and/or a sensor, is arranged to generate a signal when it has been touched by the nozzle. Prior to printing, the 3-D printer causes the nozzle to touch the contact and uses the resulting signal to help determine the location of the nozzle relative to the platform. Unlike some conventional printer designs, there may be no need for the nozzle to touch multiple different points on the platform in order to properly calibrate the printer. This helps reduce or eliminate the delay, inaccuracy and frustration resulting from such calibration procedures.

Additionally, various designs of the 3-D printer 105 involve a nozzle and a nozzle assembly that do not move during the operation of the printer and/or the dispensing of deposition material from the nozzle. For example, the printer may be a polar coordinate printer. In some implementations, the printer is arranged to rotate, raise, lower and otherwise move the platform. The nozzle, however, does not move while dispensing deposition material and is fixedly attached with the cartridge.

Many 3-D printers are Cartesian printers i.e., in which the nozzle moves and is repositioned while deposition material is dispensed. One disadvantage of such printers is that they require extremely flat platforms. Even a slight deviation in the alignment of the platform can cause the nozzle to either dig into or drift too far from the surface of the platform. As will be discussed later in the application, such problems are greatly reduced in some of the 3-D printer designs described herein.

A 3-D printer design with a non-moving nozzle also works well with the aforementioned cartridge design. If the aforementioned cartridge design were used and the printer were required to move the nozzle during the printing process, then the entire cartridge and its store of deposition material would have to be constantly in motion. Alternatively, the nozzle of the cartridge could be flexibly attached (e.g., using a flexible tube) with the cartridge, which would allow the nozzle to be moved independently from the cartridge. However, such a design may have other problems. For instance, it is easy for a clog to develop in the flexible tube that connects the cartridge with a separated nozzle. Additionally, the constant motion of the flexible tube can increase the chance that the deposition material or filament in the tube is warped or broken. Thus, it has been determined that for various applications, the aforementioned cartridge design works particularly well with the polar coordinate printer or a printer in which the nozzle is not required to move during the operation of the printer. Put another way, in various embodiments, the nozzle is not coupled with deposition material in the cartridge through a flexible tube, but instead the nozzle is fixedly attached with the housing of the cartridge. In some embodiments, any tube that connects the nozzle with the cartridge stays within the housing of the cartridge during the operation of the printer and/or does not flexibly bend and move during the printing process.

Referring next to FIG. 2A, a cartridge 200 according to a particular embodiment of the present invention will be described. The cartridge 200 illustrated in FIG. 2A may be the cartridge 110 illustrated in FIG. 1. The cartridge 200 includes housing 205, a storage compartment 220, a feed mechanism 233, deposition material 210 and a nozzle assembly 225. A magnified view of the nozzle assembly 225 is provided in FIG. 2B. It will be understood that, in some embodiments, a 3-D printer can support multiple cartridges. Each of the cartridges can be a self-contained cartridge and each cartridge can contain either the same or a different type of deposition material in terms of color, consistency, texture, and/or chemistry. Each of the self-contained cartridges can be readily removed from or attached to the 3-D printer by a user to facilitate color and material variations as well as to remedy material or technical issues with the 3-D printer. It will be understood that, in embodiments having multiple cartridges, a different nozzle can be provided for each cartridge.

Housing 205 is arranged to cover and protect the internal components of the cartridge 200. The housing 205 may be made of any suitable material, including but not limited to metal, ceramic and plastic. In various embodiments, the housing 205 is in the form of a hard, substantially inflexible shell that almost entirely encases the nozzle assembly 225, the deposition material 210 and/or other internal components, although portions of the nozzle assembly 225 (e.g., at least a portion of the nozzle, the heater receiving element, etc.) may be exposed through openings or apertures in the housing.

The exterior of the housing 205 may include features that help facilitate its engagement with the 3-D printer. In some designs, there are one or more engagement elements 234 on the exterior of the housing 205. Each engagement element may be but is not limited to a slot, a rail and/or latch. One particular design involves a rail (e.g., a structure that extends along an axis and extends out of a surface of the cartridge) that is arranged to slide into a slot on the exterior of a 3-D printer.

The interior of the housing includes a storage compartment 220. The storage compartment 220 is a space within the housing 205 that is arranged to contain deposition material 210. The deposition material 210 may be any suitable material that can be extruded or dispensed through the nozzle assembly 225 to form the desired object. For instance, the deposition material may be but is not limited to polylactic acid (PLA), acrylonitrile butadiene styrene (ABS), any suitable form of plastic and a food material.

The deposition material 210 may be stored in any suitable form. In the illustrated embodiment, for example, the deposition material 210 is in the form of filament. The filament is coiled around a hub 215, which is part of or attached with the housing 205. In other embodiments, the deposition material is in the form of pellets or any other suitable shape.

The feed mechanism 233 is any suitable structure that is arranged to help direct the deposition material 210 towards and/or through the nozzle assembly 225. In the cartridge 200 illustrated in FIG. 2A, for example, a portion of the filament is uncoiled from the spool 215 and extends through the feed mechanism 233 and the nozzle assembly 225. In this example, the feed mechanism 233 includes a pressure roller 235 and a feed gear 212. As will be discussed later in the application, the feed gear 212 is driven by a pinion in a 3-D printer when the 3-D printer is engaged with the cartridge 200.

In the illustrated embodiment, the feed gear 212 is in physical contact with the filament and, when rotated, helps push the filament through the nozzle assembly 225. The pressure roller 235 is positioned at an opposing side of the filament relative to the feed gear 212. The pressure roller 235 applies pressure onto the filament and helps stabilize it as it is moved through the nozzle assembly 225. The pressure roller 235 and the feed gear 212 are positioned close to one end of the nozzle assembly. It should be appreciated that the feed mechanism 233 may have a different design and/or include fewer or more components than what is illustrated in FIG. 2A. For instance, the feed mechanism 233 may include different numbers of rollers, gears or other components such as a funnel, tubing, etc., which help guide the filament/deposition material towards the nozzle assembly.

Referring next to FIG. 2B, the nozzle assembly 225 illustrated in FIG. 2A will be described. The nozzle assembly 225 includes a nozzle 260, a heater receiving element 250, a heat sink 255, a tube 270 and an insulating layer 275. It should be noted that the illustrated embodiment is intended to be exemplary and other embodiments are also contemplated that may depart from the design shown therein.

The tube 270 may be any hollow structure arranged to help transport the deposition material 210 through the nozzle assembly. In the illustrated embodiment, for example, one end 253a of the tube is arranged to receive the filament/deposition material 210 from the storage compartment 220. The other, opposing end 253b of the tube is attached to the nozzle 260. The tube 270 may be made of any suitable material, including but not limited to metal, ceramic and plastic.

An insulating layer 275 covers at least portions of the tube 270 and is arranged to help prevent heat from escaping the nozzle assembly 225 into the ambient environment. In the illustrated embodiment, the insulating layer 275 covers all exposed surfaces of the tube 270. The insulating layer may be made of any suitable thermally insulating material, such as polytetrafluoroethylene (PFTE).

In this design, a heat sink 255 is (directly) attached to the tube 270 and is arranged to help dissipate heat from the nozzle assembly 225. The heat sink 255 may be made of metal and/or any suitable thermally conductive material. The heat sink 255 may take a variety of different forms e.g., a comb-like shape. The heat sink 255 may be positioned in any suitable location in the nozzle assembly 225 e.g., as indicated in the figure, at the midsection of the tube 270 between the two end 253a and 253b. The heat sink 255 enables a clean transition of the filament from a solid to a flowing state, the principles of which are generally known in the art.

The heater receiving element 250 is arranged to receive the heating element from a 3-D printer when the printer is engaged with the cartridge 200. The heater receiving element 250 may take a variety of forms. In the illustrated embodiment, for example, the heater receiving element 250 forms a tube or socket with an open end into which the heating element can be inserted. The open end of the heater receiving element 250 may be flared, as shown in the figure, to help facilitate the insertion of the heater element. The other (closed) end of the heater receiving element 250 is attached (directly) to the tube 270 (e.g., at end 253b of the tube), the nozzle 260 or another suitable location on the nozzle assembly.

In various implementations, the heater receiving element 250 is attached at a location on the nozzle assembly 225 that is adjacent to or directly at the nozzle 260. When the heating element of a printer is inserted into the heater receiving element 250, heat passes into the nozzle assembly 225 and melts a portion of the filament/deposition material 210. For instance, in the illustrated embodiment, there is a portion of the filament/deposition material 210 that extends through the nozzle assembly 225 and that is adjacent to the location on the nozzle assembly 225 where the heater receiving element 250 is attached. In various embodiments, the heat causes this portion of the filament/deposition material to change from a solid state to a plastic/glass state, so that it can be dispensed through the nozzle 260.

The nozzle 260 may be any suitable structure arranged to extrude or dispense deposition material onto a platform in the 3-D printer to form the desired object. The nozzle 260 may be made of a wide variety of materials and/or have various forms. In the illustrated embodiment, for example, the nozzle is made of metal and has a tapered tip 265 through which extrudate is released, although this is not a requirement and the nozzle 260 may have a different shape or configuration (e.g., that of a straight, non-tapered tube.)

Referring next to FIG. 3A, an exploded view of a cartridge 300 according to another embodiment of the present invention will be described. The cartridge 300 may have any of the features described in connection with cartridge 200 of FIG. 2A.

In this particular embodiment, the housing of the cartridge 300 is formed from at least three parts (parts 305a-305c.) The parts, when fitted together, collectively encase and form a protective shell around an interior storage compartment. The housing may be made of any suitable material. For example, it may be made of a hard, relatively inflexible plastic. A hub 310 is positioned in the storage compartment. A spool 315 of filament/deposition material is rotatably mounted on the hub. The filament may be made of any suitable deposition material e.g., PLA, ABS, etc.

FIG. 3A also displays various embodiments of a nozzle assembly 325 and a feed mechanism 333. The nozzle assembly 325 includes a nozzle 365, heat sink 355 and a tube 370, which may be covered in an insulating material. The feed mechanism 333 includes a feed gear 312 and one or more rollers 335. The one or more rollers and the feed gear are engaged with and/or are in physical contact with a filament 357 that extends through the tube 370 and the nozzle assembly 325. The feed gear 312 includes a cylinder with two ends. At one end, there is a toothed gear that is arranged to engage a feed pinion from the 3-D printer. When the pinion is powered and rotated by the printer, it rotates the feed gear as well. The other end, when rotated, is arranged to apply force onto the filament to help push it through the nozzle assembly 325. Just before or as a portion of the filament passes through the nozzle, it is heated by a heater receiving element 350. Thus, filament dispensed from the nozzle is in a plastic/glass state.

Figure 3B:
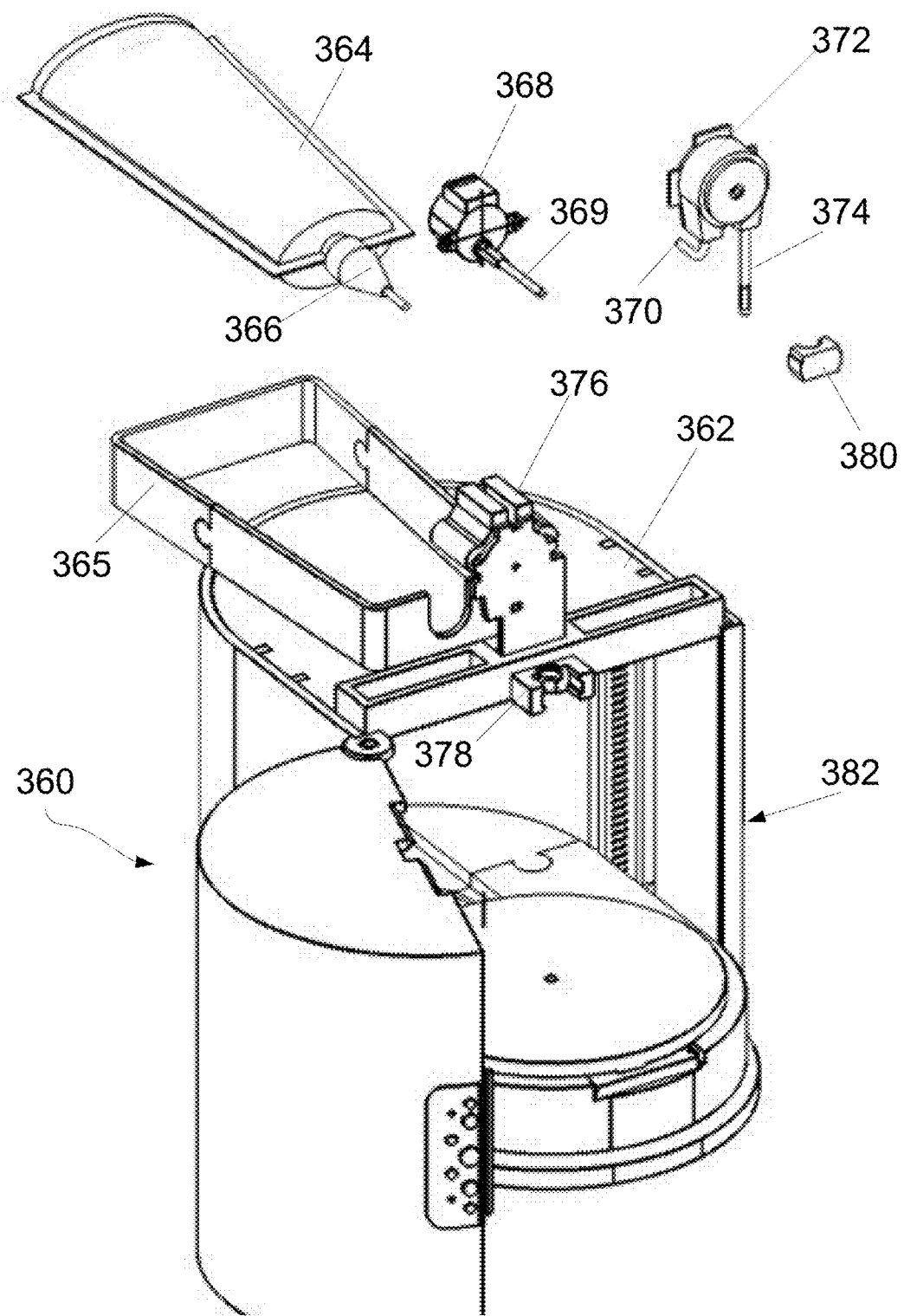
FIG. 3B is an exploded view of a 3-D printer platform with a top plate configured to accommodate a liquid or paste tube (e.g., frosting or decorative gel) whereby the tube extrusion is driven by a pump.
Figure 3C:
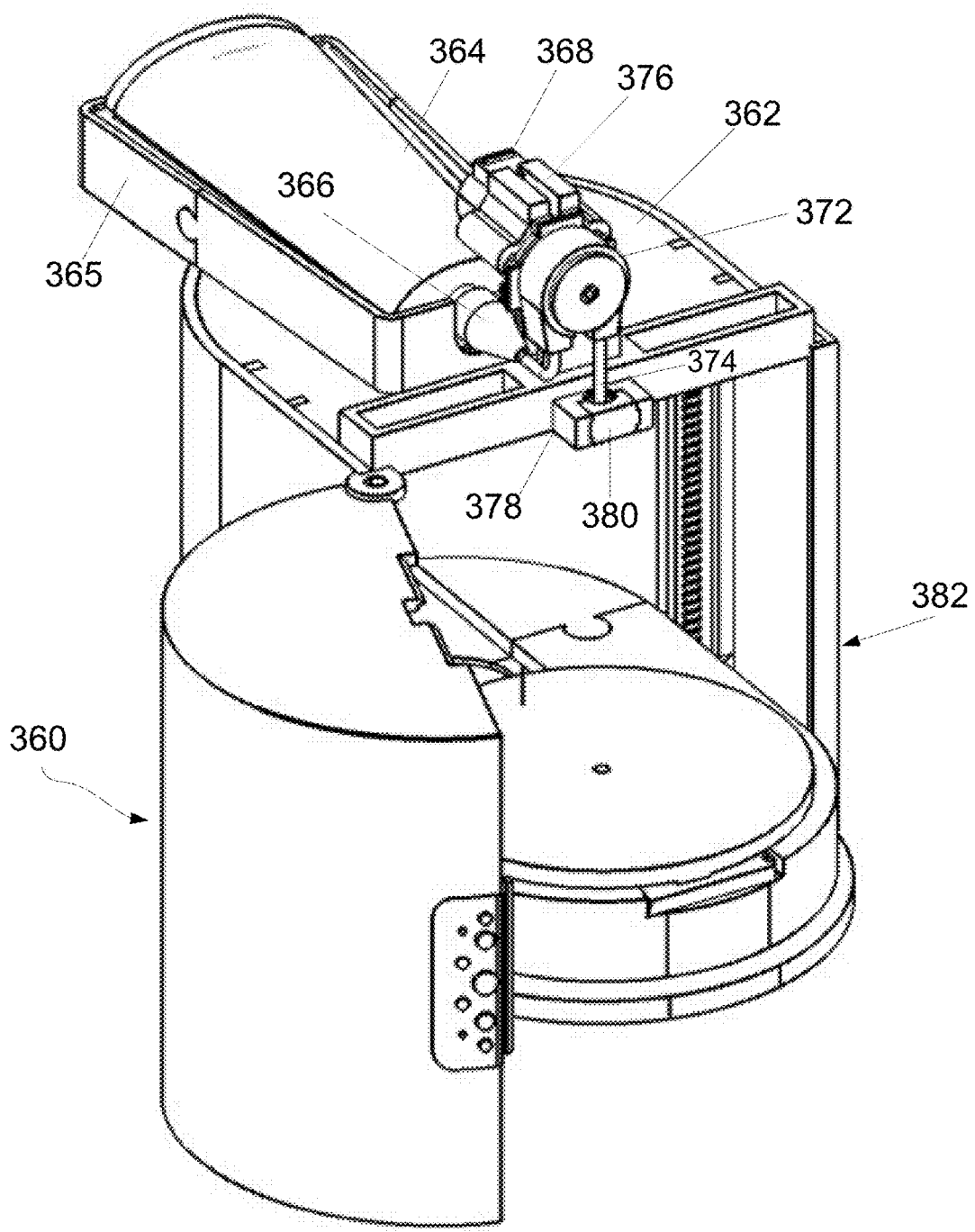
FIG. 3C is an assembled view of the 3-D printer platform with the top plate configured to accommodate a liquid or paste tube (e.g., frosting or decorative gel) whereby the tube extrusion is driven by a pump.

Referring now to FIG. 3B and FIG. 3C, a different configuration 360 is shown where the top plate 362 that holds the filament cartridge has been replaced and/or reconfigured to accommodate a pouch 364 of edible material such as frosting or decorative gel. FIG. 3B shows an exploded view of the parts, and FIG. 3C shows the parts in their assembled form. In general, the pouch 364 can accommodate any of a variety of materials, including for instance a paste or liquid media. A pouch holder 365 is formed on the top plate 362 to securely hold the pouch while the liquid is being dispensed.

The opening of the pouch, where the paste or liquid is dispensed, includes a pouch-to-intake adapter 366 that serves to guide the paste or liquid into the intake of a motor 368 having a pump shaft 369. The pump shaft interfaces with the intake port 370 of a pump 372. The pump 372 includes a nozzle 374 for dispensing the paste or liquid in a controlled manner. The pump 372 can include different types of devices including for instance a peristaltic pump, a screw pump, a gear pump, or a progressing cavity pump. In the example shown, a peristaltic pump is used, which has been found to provide a simple and expensive configuration. The peristaltic pump has also been found to provide a consistent and steady flow of paste or liquid through the pump. A steady flow is important for 3-D printing operations, as each subsequent layer must be consistently dispensed in order to properly form the full 3-D object. The top plate 362 further includes a motor and pump mount 376 for accommodating and holding the motor 368 and pump 372. A nozzle holder 378 and nozzle lock 380 are further shown for securely holding the nozzle 374 in place.

Once fully mounted, the pouch and pump configuration serves to dispense a liquid or paste to an associated 3-D printing apparatus 382. The filament cartridge configuration (described above, e.g., in FIGS. 2A, 2B, and 3A) uses a heating element in associate with a coil of filament. This pouch and pump configuration do not require a heating element, as the paste or liquid in the pouch is already in a flowing flow. The configuration works well with food products, such as a frosting or edible gel. The tube or pouch of food product can be placed in the holder 365 and edible 3-D objects can be formed. Decorations can also be added to the top of existing food products, i.e. candy, cookies, or cakes, using the 3-D printer with frosting or gel extrusion. Alternatively, the pouch can be replaced with, for example, a cup or receptacle for holding the liquid or paste, and a tube can be inserted into the cup or receptacle and attached to the motor in order to siphon the deposition material through the pump. Still another alternative might configure the tube or pouch to be squeezed, by the extrusion motor or other associated device, in order to dispense the deposition material.

Figure 4A:
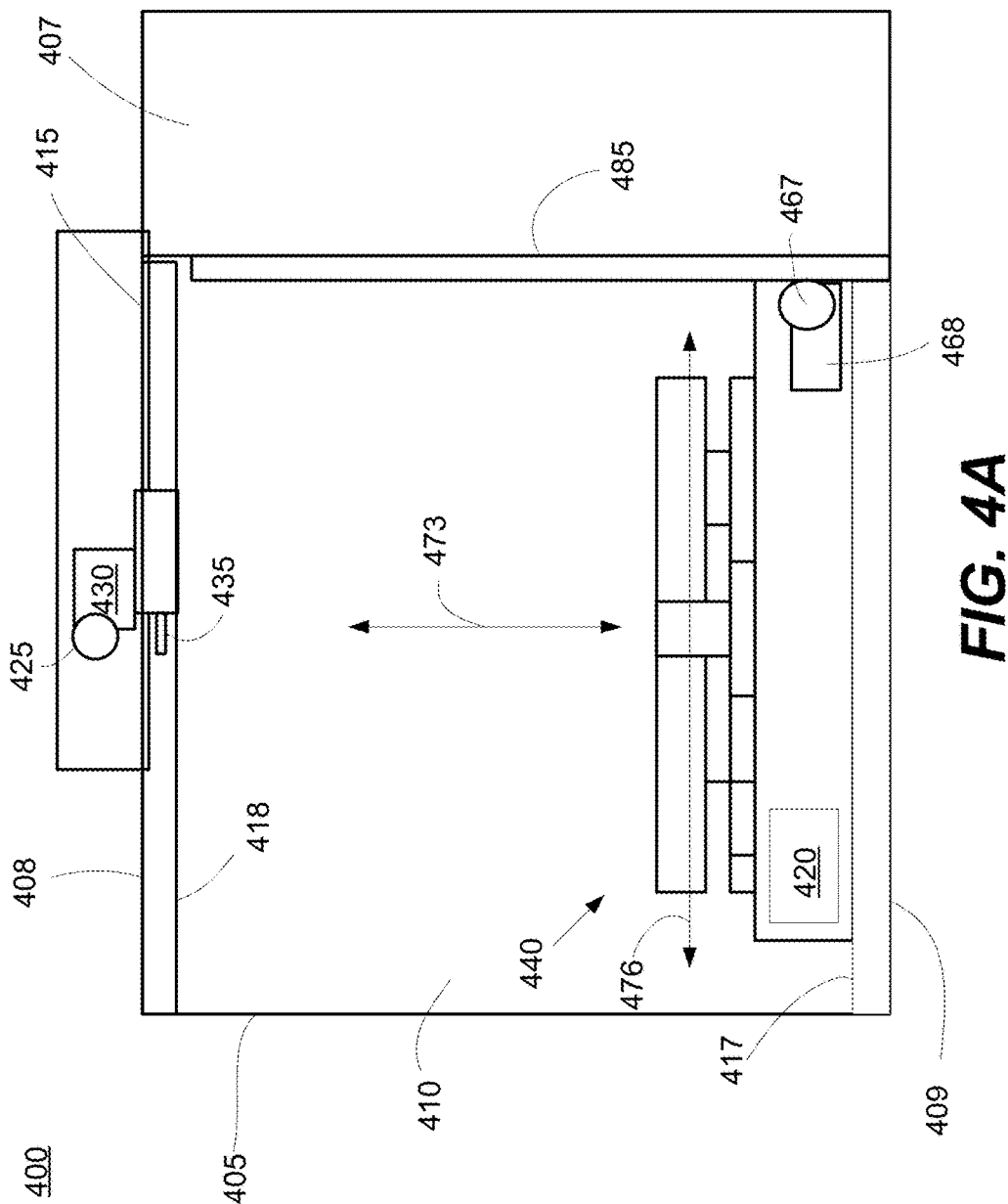
FIG. 4A is a diagram of a three-dimensional printer according to a particular embodiment of the present invention.
Figure 4B:
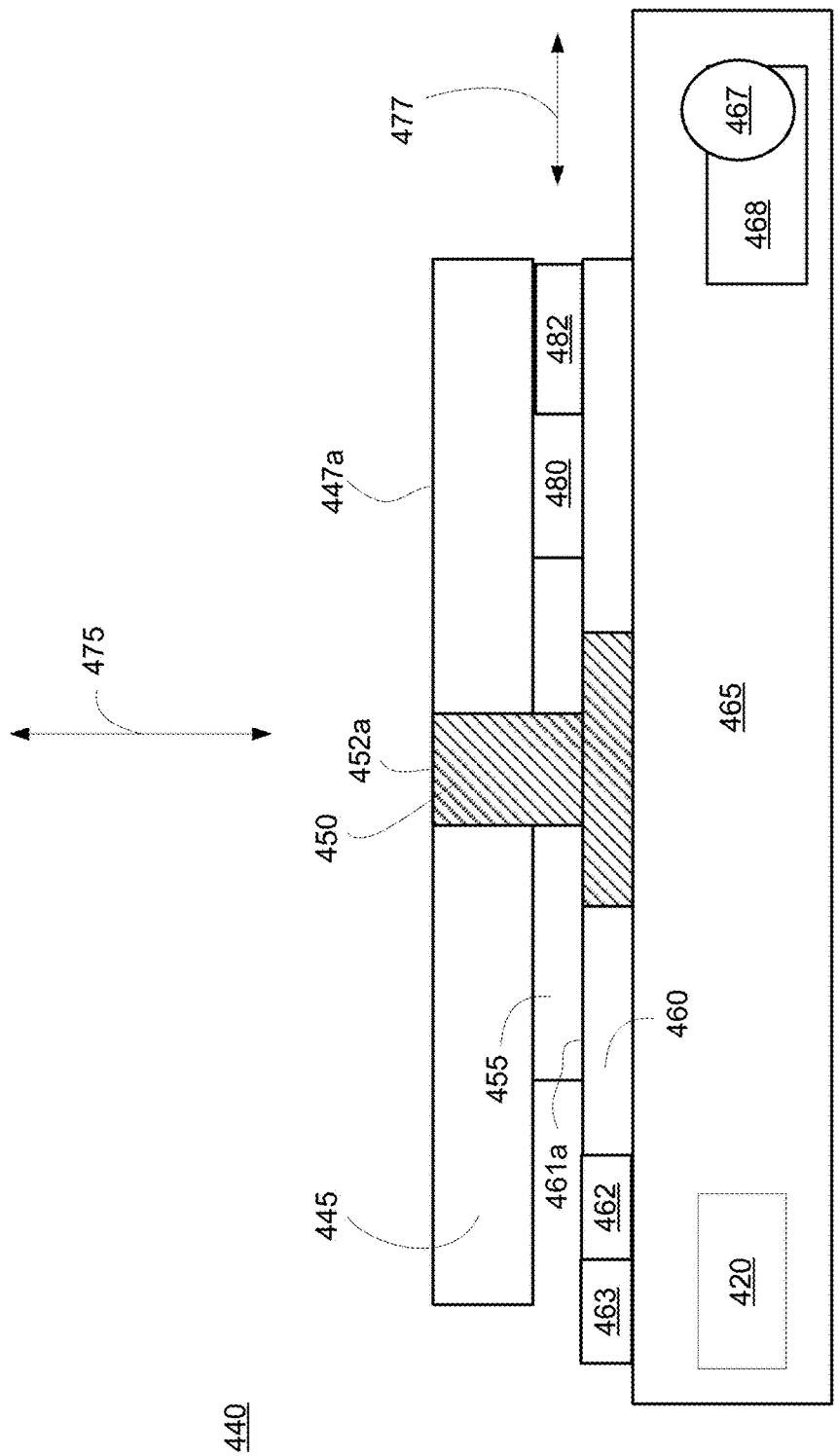
FIG. 4B is a diagram of the platform assembly illustrated in FIG. 4A.

Referring next to FIGS. 4A and 4B, a three dimensional printer 400 according to a particular embodiment of the present invention will be described. Note that this printer 400 is meant to be used with any variety of extrusion materials and dispensing means, including for instance the cartridge (e.g., 110) and/or the food dispensing configuration (e.g., 364, 368, 372). The 3-D printer 400 may be any suitable printer that is arranged to form objects using any known three dimensional printing techniques e.g., additive manufacturing, subtractive manufacturing, fused deposition modeling, etc. The 3-D printer 400 may be, for example, the printer 105 of FIG. 1. The printer 400 includes a housing 405, an inner compartment 410, a cartridge interface 415 and a platform assembly 440. Near or at the cartridge interface 415 is a feed pinion 425, feed gear motor 430 and a heating element 435. As indicated in FIGS. 4A and 4B, the platform assembly 440 includes a platform 445, a contact 450, a platform turning mechanism 455, slider 460, a table 465, a control system 420 and associated motors and gears. The control system 420 can include any of a variety of processors and associated memory storage devices. It should be appreciated that the illustrated printer is intended to be exemplary and non-limiting, and that a wide variety of different printer systems (e.g., Cartesian, polar coordinate, etc.) with fewer or more components may be used.

The housing 405 is arranged to protect and/or encase internal components of the printer 400. The housing 405 may be made of any suitable material, including but not limited to plastic and metal. In various embodiments, the housing 405 includes a door 407 that can be opened to obtain access to the inner compartment 410.

The housing 405 and the printer 400 may take a wide variety of different forms. In the illustrated embodiment, for example, the housing 405 has opposing top and bottom surfaces 408/409. The top surface 408 is the location at which a cartridge interfaces with the printer e.g., the location of cartridge interface 415, feed pinion 425 and the heating element 435. The bottom surface 409 is arranged to be placed on an underlying surface e.g., the floor or a table. This above design is intended to be exemplary, however, and it should be appreciated that the housing 405 and the printer 400 may have any suitable arrangement, configuration and/ or shape.

The inner compartment 410 is arranged to be a space within the housing 405 in which printing takes place. In the illustrated embodiment, the platform assembly 440, which includes a platform 445, a slider 460 and a table 465, rests on a bottom surface 417 of the compartment. The opposing top surface 418 of the compartment 410 shares a housing wall with the cartridge interface 415 and/or is arranged to help physically support a nozzle assembly 225 of a cartridge 200, so that deposition material can be dispensed over the platform 445 through the nozzle assembly 225.

The platform 445 is any suitable structure that is arranged to receive deposition material dispensed from the nozzle assembly 225. In the illustrated embodiment of FIGS. 4A and 4B, for example, the printer 400 is positioned such that deposition material is dispensed directly onto a top surface 447a of the platform 445 to form the desired object. The platform 445 may be of any suitable size and shape. In various implementations, the top surface 447a of the platform is circular.

As shown in FIG. 4B, a contact 450 is positioned on the platform 445. The contact 450 may be any structure, mechanism or device on the platform that is arranged to help generate a signal when it is touched e.g., by the nozzle 260 of the nozzle assembly 225. In the illustrated embodiment, for example, the contact 450 is a mechanical button that extends at least partially through the platform. In other embodiments, the contact 450 is or includes an electrical contact, a capacitive sensor, a magnetic sensor or any other suitable type of sensor arranged to detect the touching or proximity of an object (e.g., the nozzle.) In various implementations, the contact 450 is a structure physically separate from the platform, while in other implementations, it forms a part of or is integrated into the platform.

In the illustrated embodiment, for example, the contact/button extends entirely through the platform 445, the platform turning mechanism 455 and at least partially through the slider 460. Put another way, there are apertures in the platform and platform turning mechanism that are aligned with one another, thus allowing the contact/button to extend through them. In this example, the top surface 447a of the platform 445 and the top surface 452a of the contact/button are coplanar. Additionally, the top surface of the contact/button is exactly at the center of the circular, top surface of the platform. In other designs, however, the contact and platform may have different arrangements. For example, in some implementations, the contact 450 may not extend entirely through the platform 445 and/or may be situated in a recessed region in the platform.

The contact 450 is coupled with the control system 420. When the contact 450 is touched and/or when the contact/sensor detects the proximity of a particular object (e.g., the nozzle 260 of a cartridge 200), it is arranged to generate a signal. The control system 420 receives the signal and, in response, sends commands to other components in the printer 400. As will be discussed in greater detail later in the application, the control system 420 determines the proper position of the nozzle relative to the top surface of the platform in part based on the signal.

In the example illustrated in FIGS. 4A and 4B, underlying the platform 445 is a platform turning mechanism 455. The platform turning mechanism is arranged to physically support and/or rotate the platform e.g., around the Z axis 473. In some embodiments, the platform turning mechanism is a circular, rotatable gear. A platform turning gear 480 engages the platform turning mechanism and drives its rotation. A platform turning motor 482 provides power to and drives the platform turning gear 480. In this example, the platform 445 is fixedly attached with the underlying platform turning mechanism 455, so that when the platform turning mechanism 455 rotates, the platform rotates as well.

In this example, the platform turning mechanism 455 is sandwiched between the platform 445 and the slider 460. The slider 460 is any suitable structure that is arranged to help move the platform along an R axis 477 i.e., a lateral axis that is perpendicular to the Z axis. (Note that in some embodiments, the R axis may also be extending directly out of the page, rather than across the page.) In various embodiments, the platform 445 and/or the platform turning mechanism 455 are fixedly attached with a top surface 461a of the slider 460, so that when the slider moves, the platform and/or the platform turning mechanism move in tandem. A slider gear 462, which is driven by a slider motor 463, is physically engaged with the slider 460. When the slider gear 462 is powered by the motor 463, the slider gear 462 rotates, which causes the slider 460 to move along the R axis.

The table 465 is any suitable structure arranged to help physically support, raise and lower the overlying platform 445, platform turning mechanism 455 and/or the slider 460. In the illustrated embodiment, for example, the table 465 is fixedly attached with a Z axis gear 467, which is powered by a Z axis motor 468. The Z axis gear 467 engages a rail 485 that extends in a direction parallel to the Z axis 473. When the Z axis gear is rotated, the table 465 and other components that overlie the table (e.g., the platform 445, the platform turning mechanism 455 and the slider 460) move upward or downward within the compartment i.e., along the Z axis 473.

The table 465 may have a variety of designs. For example, in the illustrated embodiment, the table 465 is at least partially hollow and contains an internal space. In the space are circuitry, memory and/or one or more processors that make up the control system 420. (Note that in some designs, the control system 420 may be positioned in a different location of the printer.) Other components (e.g., motors or gears) may also be situated in the space within the table.

On one or more exterior surfaces of the housing 405 of the printer 400 is a cartridge interface 415. The cartridge interface 415 is any structure arranged to engage with the printer. Any suitable locking or attachment mechanism may be used in the cartridge interface. In some implementations, for example, the cartridge interface 415 includes a rail, a slot, a latch, a fastener or some other attachment/connecting apparatus. Generally, the cartridge interface 415 helps to securely attach the cartridge with the printer, as well as help properly position the cartridge 200 so that printing can begin using the deposition material 210 and nozzle assembly 225 in the cartridge 200.

The heating element 435 is any suitable structure in the printer 400 used to heat deposition material in the cartridge. The heating of the deposition material is performed so that the formerly solid deposition material can be put into a state such that it can be easily dispensed from the nozzle assembly 225 of the cartridge 200. Generally, the heating element 435 is arranged to engage the heater receiving element 250 of the cartridge 200. For example, the heating element 435 may be a tube 270 or structure that is arranged to extend through an opening in the cartridge housing such that is positioned adjacent to the tube or nozzle of the nozzle assembly in the cartridge. The heating element 435 generates heat, which helps melt deposition material in the tube or nozzle.

The heating element 435 may have a wide variety of designs. In some implementations, for example, the heating element 435 includes a hollow tube made of a thermally conductive material e.g., metal. Inside a space within the tube is a (metallic) wire or coil. To generate heat, the 3-D printer 400 runs a current through the wire. There may also be a temperature sensor attached on the outside or inside of the heating element 435, so that the control system 420 of the printer 400 can determine whether a predetermined, desired temperature has been reached.

The control system 420 of the printer 400 may adjust the temperature of the heating element, depending on the type of deposition material used. For example, if PLA is used as a deposition material, in various embodiments, the printer may heat the heating element to a temperature of over 150° F. or between 170 and 230° F. If ABS is used, the printer may be arranged to heat the heating element to a temperature of over 220° F. or between 220 and 280° F. Generally, the printer may heat the heating element to a wide range of temperatures e.g., whatever temperature is needed to change deposition material to a plastic or glass state at a desired rate.

The heating element 435 may be positioned in a variety of locations and configurations. For example, the heater element 435 may be exposed outside of the housing of the printer. In other embodiments, the heater element 435 is positioned within the housing, but is accessible through a door or opening in the housing 405.

The printer also includes a feed pinion 425. The feed pinion 425 is a gear or other structure that is arranged to engage the feed gear 212 on the cartridge 200 and help drive the filament/deposition material through the nozzle assembly 225 of the cartridge 200. In various embodiments, the feed pinion 425 is exposed outside of the housing 405 of the printer 400, so that it has easy access to the cartridge. In other embodiments, the pinion 425 is within the housing, but is accessible through a door or opening in the housing. In the illustrated embodiment, the feed pinion 425 is driven by a feed pinion motor 430.

The feed pinion 425 and/or feed pinion motor 430 may be positioned in various locations on the printer. In the illustrated embodiment, for example, the feed pinion 425 and the feed pinion motor 430 are positioned on a top side/surface 408 of the printer. When the cartridge is inserted into or engaged with the top side of the printer, the feed pinion 425 is in a position to engage the feed gear 212 of the cartridge 200.

Figure 5A:
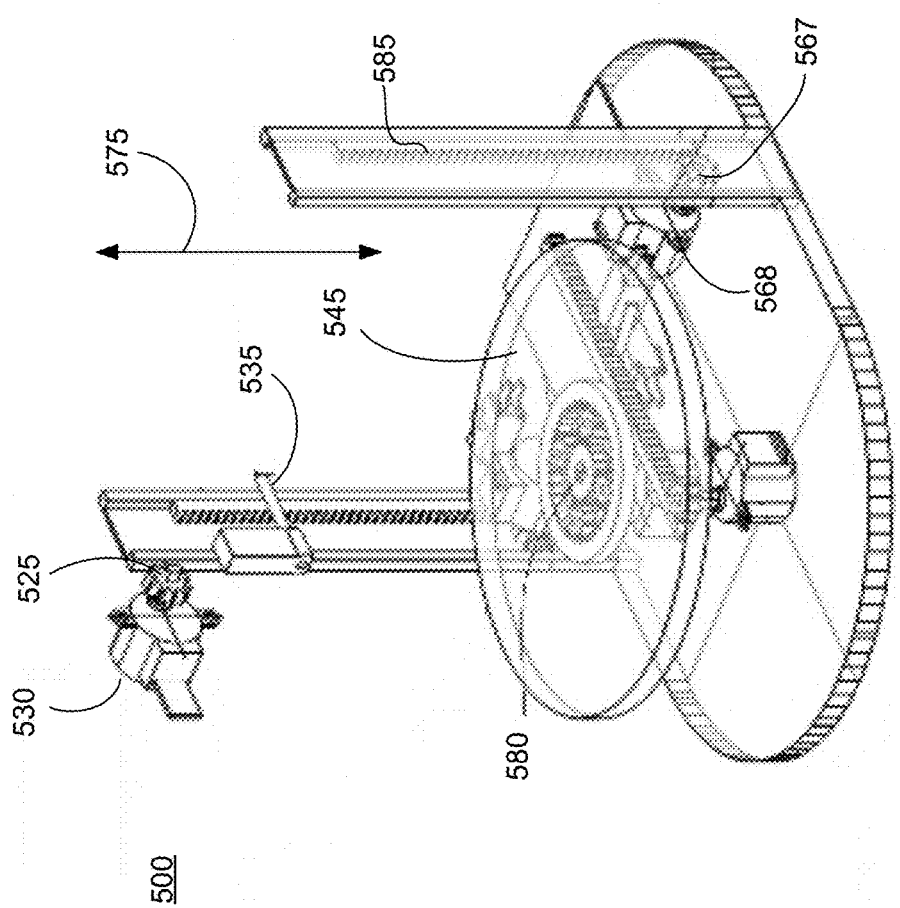
FIG. 5A is an illustration of some components in a three-dimensional printer according to a particular embodiment of the present invention.

Referring next to FIG. 5A, a perspective view of selected internal components of a 3-D printer according to a particular embodiment of the present invention is described. FIG. 5 illustrates a 3-D printer 500 (which may have any of the features and components of the printer 400 of FIG. 4) that includes a feed pinion 525, feed gear motor 530, a heating element 535, a platform 545 and rails 585 for vertically raising and lowering the platform. For illustrative purposes, the platform 545 is transparent so that an underlying platform turning mechanism 580 can be seen.

In this particular embodiment, the platform 545 is circular and is centered over the underlying platform turning mechanism 580, which is also circular. The platform 545 is fixedly attached with the platform turning mechanism 580 so that when the mechanism rotates, the platform rotates.

The platform 545 is also attached with a Z axis gear 567, which is driven by a Z axis motor 468. When the Z axis motor 468 causes the Z axis gear 567 to rotate, the gear 567 moves along the rail 585 along a Z axis 575, together with the platform 545.

Figure 5B:
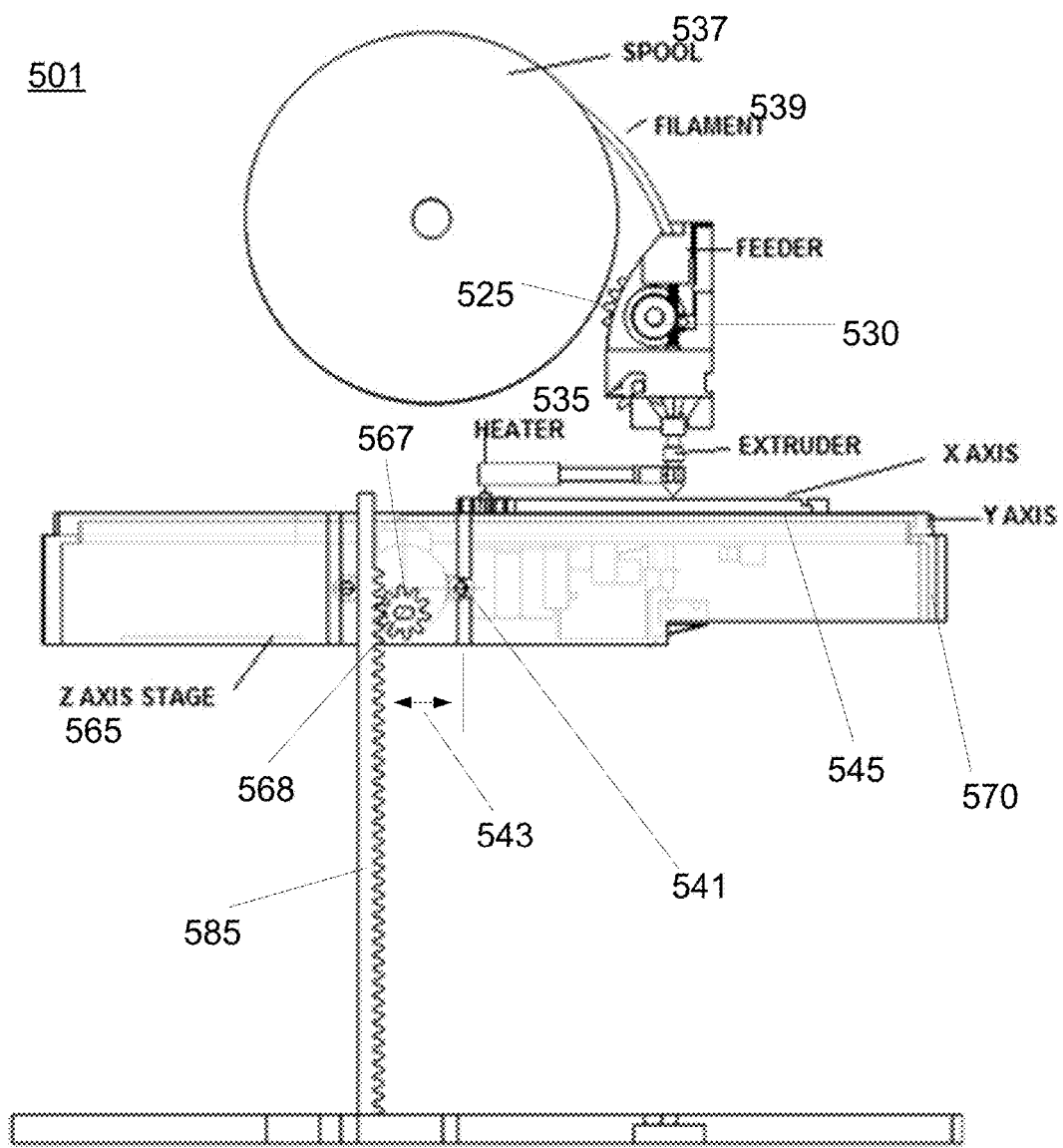
FIG. 5B is a side view of some components in a three-dimensional printer according to a particular embodiment of the present invention.

Referring next to FIG. 5B, a side view of selected internal components of a 3-D printer according to a particular embodiment of the present invention is described. FIG. 5B illustrates a 3-D printer side view 501, which may have any of the features and components of the printer 400 of FIG. 4. This includes a feed pinion 525, feed gear motor 530, a heating element 535, a spool 537, filament 539, and a platform 545. One Z axis rail 585 is shown for vertically raising and lowering the platform. A stage (or table) 565 is also shown with a Z axis gear 567 that meshes with rail 585 for raising and lowering the stage 565. For illustrative purposes, the stage 565 is semi-transparent so that some underlying parts (for instance, from FIGS. 7A and 7B) can be seen. In terms of weight and weight loading, the relative center of the stage 565 is located at approximately point 541. The mesh gear 567 (and associated stage motor, shown in transparency) are mounted off center, and the Z axis gear 585 is configured and mounted to interact at this off center point, with the representative off center distance shown by 543. A pivot point for the weight loading thereby exists somewhere around point 568. In operation, the stage 565 will have more weight levered around pivot point 568 because the front of the stage 570 is longer (and heavier) with the stage being anchored at point 568, versus the stage being anchored at point 541. Accordingly, this configuration provides for a cantilevered stage which can tilt down slightly at the front edge 570. For reasons explained further below, this tilt does not adversely affect operation of the present 3-D printer configuration. Conversely, the cantilevered configuration actually provides for more stable operation of the stage when running up and down the Z axis gear 585.

Figure 6C:
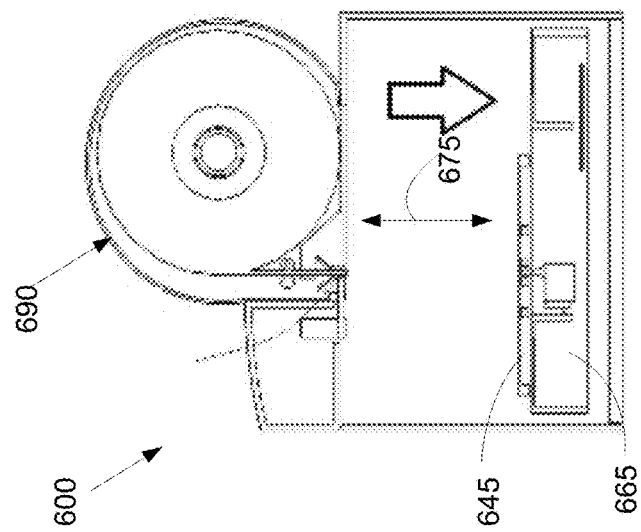
FIGS. 6A, 6B, and 6C are diagrams indicating movements of 3-D printer platform according to a particular embodiment of the present invention.
Figure 6B:
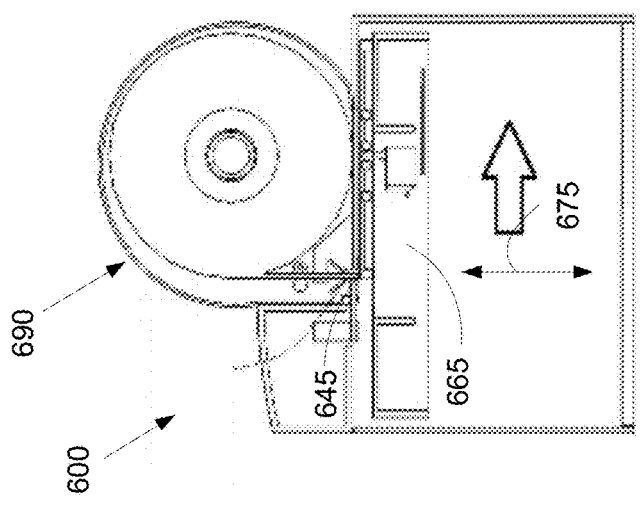
Figure 6A:
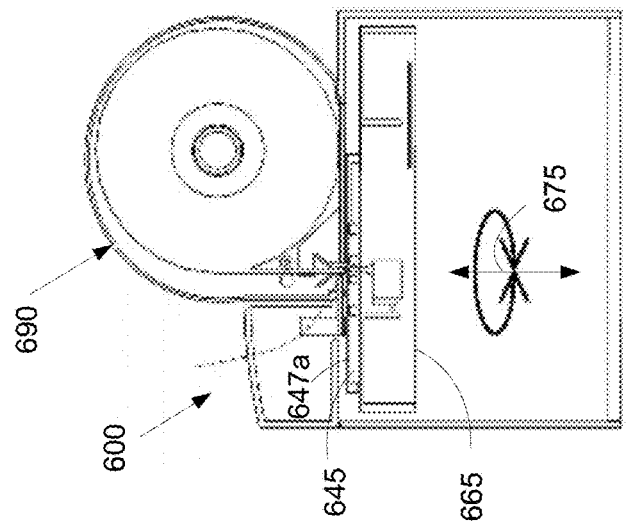

Referring next to FIGS. 6A-6C, various side views of a 3-D printer 600 and a cartridge 690 according to a particular embodiment are described. The printer 600 may have any of the features or components of other printers described herein (e.g., printer 400 of FIG. 4.) FIGS. 6A-6C illustrate various ways in which a platform 645 and/or connected components (e.g., a platform turning mechanism, a slider and a table) may be moved within the compartment of the printer. In the illustrated embodiment, the printer 600 includes a platform 645 and a table 665. The table 665 underlies and helps physically support the platform 645.

In FIG. 6A, the platform 645 is rotating, as indicated by the arrows. More specifically, it is rotating around a Z axis 675 that extends vertically up through the printer i.e., an axis that extends perpendicular to a top surface 647a of the platform 645. It should be noted that in this example, the table is not necessarily rotating. Rather, there may be a gear (e.g., platform turning mechanism, which is not shown) that is sandwiched between the table and the platform. The platform 645 is attached to the gear and rotates in tandem with the gear, while the table remains still and/or does not rotate.

In FIG. 6B, the platform 645 is moving in a lateral direction i.e., in a direction that is perpendicular to the Z axis 675. In this example, a table 665 is not necessarily moving in the same direction. There is a structure (e.g., a slider, which is not shown) that is sandwiched between the table 665 and the platform 645. The slider is fixedly attached with the platform, such that when the slider moves in the lateral direction, the platform 645 moves laterally in tandem, while the table remains still.

FIG. 6C indicates that the platform 645 is capable of being raised and lowered. (In FIGS. 6A and 6B, the platform was in a raised position, and in FIG. 6C it has been lowered.) The raising and lowering involves moving the platform vertically along the Z axis 675. In this example, the table 665 is capable of moving up and down as described above. Since the platform 645 rests on the table 665, the platform moves up and down in tandem with the table.

Any of the movements described above may be driven by various gears and motors described in connection with FIGS. 4A and 4B. For example, the vertical raising and lowering of the platform may be performed using the Z axis gear 467, Z axis motor 482 and the table. The lateral movement of the platform may be performed using the slider gear 462, the slider motor 463 and the slider 460. The rotation of the platform may be performed using the platform turning mechanism 455, the platform turning motor 482 and the platform turning mechanism 455.

Figure 7A:
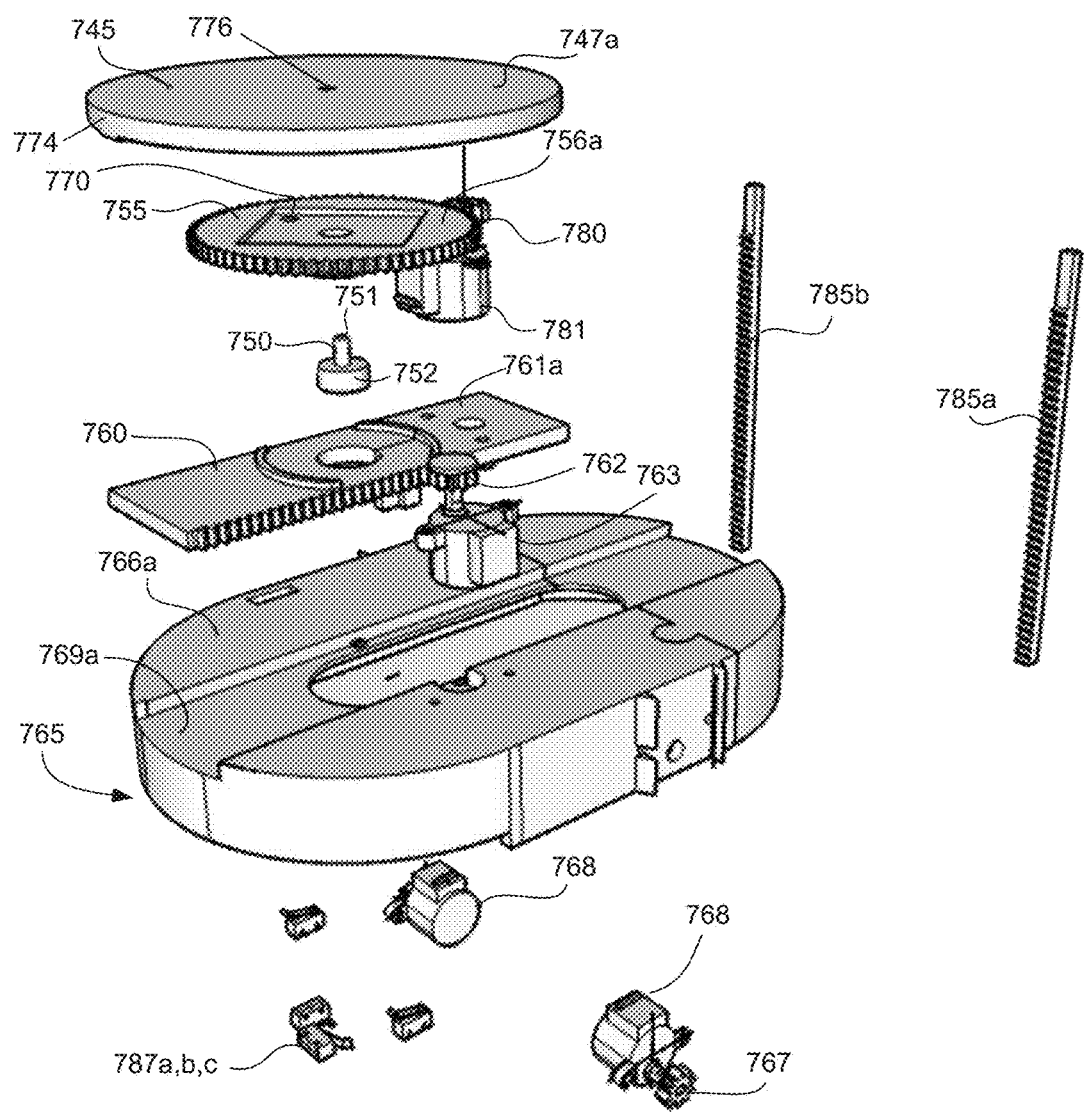
FIG. 7A is an illustration of various components inside a 3-D printer according to a particular embodiment of the present invention.

Referring next to FIG. 7A, an exploded view of various components inside the compartment of an example printer 700 (e.g., which may be printer 400 of FIG. 4) will be described. The components include a platform 745, a platform turning mechanism 755, a contact 750, a slider 760 and a table 765. The components may have any of the features of the corresponding components described in FIGS. 4A and 4B.

In this particular embodiment, the platform 745 includes a top surface 747a that is circular. At the center of the top surface 747a is an aperture that extends entirely through to an opposing bottom surface of the platform. The bottom surface of the platform rests on and/or is fixedly attached to the underlying platform turning mechanism 755.

The platform turning mechanism 755 also includes a top surface 756a and an opposing bottom surface that have circular shapes. At the center of the top surface of the mechanism is an aperture that extends entirely through the mechanism to the bottom surface. In various embodiments, the edges of the mechanism are toothed, so that they can engage a platform turning gear 780. In a polar coordinate system, the rotation of the platform corresponds to the theta angle. The platform turning gear is associated with a rotational, or theta axis motor 781 that drives rotation of the platform.

The platform turning mechanism 755 further includes at least one magnet 770 that corresponds and aligns with at least one opposing magnet (not shown here) on the bottom surface of the platform 745. The platform 745 can thereby be removably attached to the platform turning mechanism 755 via the magnets. Removal of the platform 745 helps to facilitate cleaning or resurfacing of the top surface 747a. The removable platform 745 also provides for easier removal of a printed object that is formed on top the platform 745 during a printing operation.

The slider 760 includes a top surface 761a and an opposing bottom surface. The bottom surface of the platform turning mechanism rests on the top surface of the slider. The top surface of the slider may have grooves, rails or other features that allow the platform turning mechanism to freely turn without causing the slider to turn as well. In some embodiments, at least a portion of the edge of the slider 760 is toothed, so that it can easily engage a slider gear 762. When a slider motor 763 drives the slider gear 762, it rotates, which causes the slider to move in a lateral direction. In a polar configuration, this lateral direction corresponds to the R axis. The slider carries the overlying platform, contact and/or platform turning mechanism, such that they move laterally in tandem with the slider.

In this particular embodiment, the contact 750 is in the form of a button. The button is arranged to transmit a signal when it is pressed (e.g., by the nozzle 260 of the cartridge 200.) In this example, the button includes a base 752 having a cylindrical shape and a depressible trigger 751 that also has a cylindrical shape. The diameter of the base is larger than the diameter of the trigger. The trigger is inserted into the base and extends perpendicular to the top surface of the base.

The trigger 751 is capable of being in at least two positions. The first position is when the trigger extends a particular amount out of the top surface of the base 752, which is its default position when no pressure is applied to it. The second position is when pressure is applied to the trigger (e.g., by the nozzle of a cartridge), which causes the switch to extend less out of the top surface of the base. A sensor or mechanism within the mechanism detects this pressure and transmits a signal to the control system 420 of the printer.

The button 750 is arranged such that it extends through the apertures in the platform 745, the platform turning mechanism 755 and the slider 760. In various implementations, the trigger portion of the button extends through the apertures in the platform 745 and/or the platform turning mechanism 755, while the base portion of the button is seated in a recessed region or aperture in the top surface 761a of the slider 760. In various implementations, the top surface of the switch is coplanar with the top surface 756a of the platform.

In the embodiment illustrated in FIG. 7A, the bottom surface of the slider is positioned in a recessed region or slot in a top surface 769a of the table 765. Thus, in various designs, the top surface of the slider and the top surface of the table are coplanar. The slider is able to slide freely along the recessed region, which defines a slot in the top surface of the table that conforms to the shape of the slider.

The table 765 may or may not have a bottom surface. In some designs, the table is a hollow shell or housing, with an open space defined by the top surface and perpendicular side surfaces of the table. In various embodiments, circuitry (e.g., a processor and memory) for the control system 420 and/or motors and gears may be situated in this space. In the illustrated example, a Z axis motor 768 and/or a Z axis gear 767 are attached to one or more of the side surfaces of the table 765. The gear 767 of each motor 768 interacts with a respective vertically oriented rack gear 785a and 785b. The gear 767, when rotated, causes the platform and the overlying components (e.g., the platform, the platform turning mechanism, the slider) to rise or lower within the compartment i.e., move vertically along the Z axis up and down the rack gears 785a, 785b. In this example, two Z axis motors 768 and two rack gears 785a and 785b are shown. Alternatively, the Z axis motion could be achieved through the use of a single motor that interacts with a single rack gear or two rack gears.

Figure 7B:
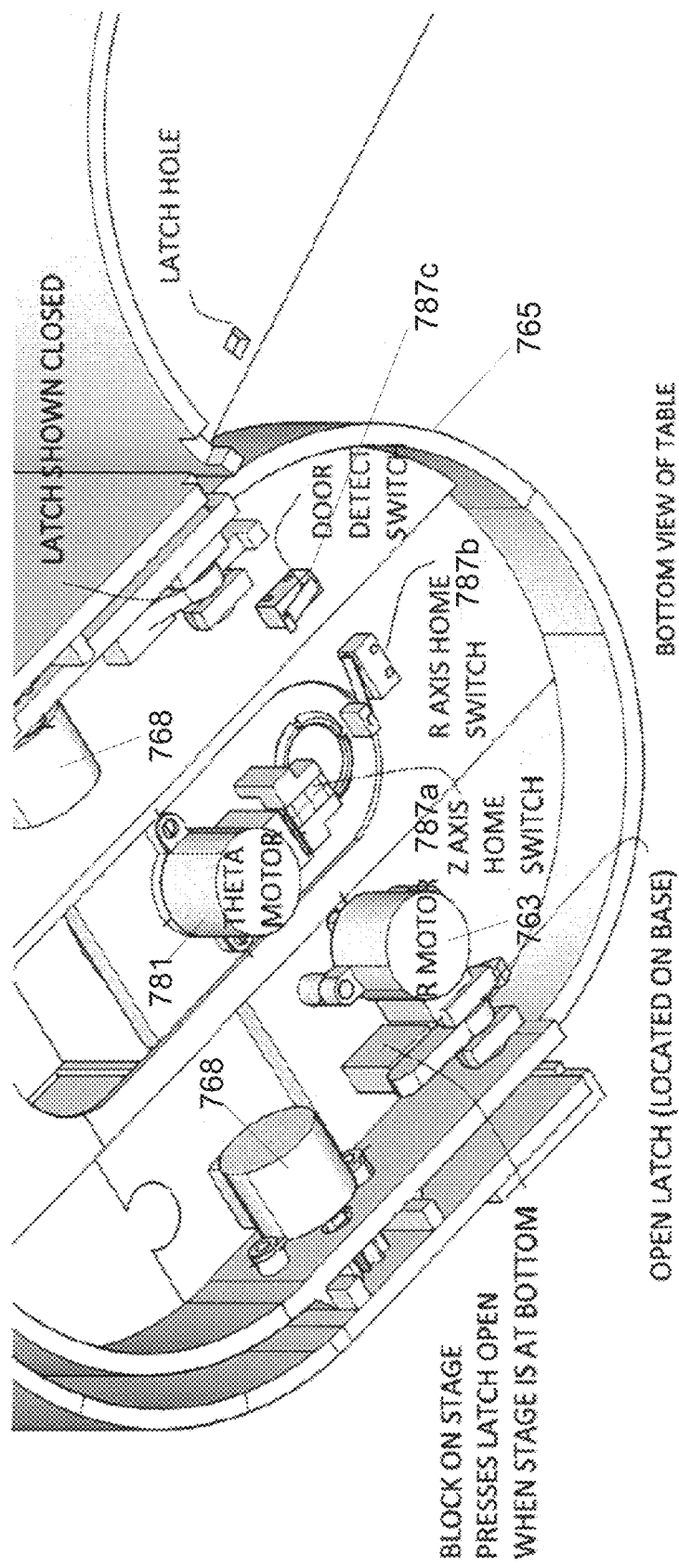
FIG. 7B is an upward perspective view of the self-contained stage that moves within the 3-D printer.

Further shown are a set of micro switches 787 for detecting the home positions of the Z axis, R axis and the theta axis motors. Also included in this set is a door sense switch. Referring next to FIG. 7B, the placement and orientation of the drive motors in the table 765 is further shown. The Z axis motors 768 are shown mounted to the sides of the table so that their respective gears can interact with the gear racks 785a and 785b. The theta motor 781 is mounted in the relative center of the table to drive the rotation of the platform turning mechanism 755. The R motor 763 is mounted to drive the slider 760 in a lateral direction. A corresponding Z axis home switch 787a and R axis home switch 787b are shown associated with the respective motors. A door detect switch 787c is also shown and is used to provide added safety during operation of the 3-D printer.

Further sensors or switches (not shown) can be included in the printer housing and/or stage that would serve to detect whether or not the 3-D printer has been adversely affected during the 3-D printing operation. This is even more necessary in a lightweight and portable printer design such as the one described herein, which can be more sensitive to outside influences than heavier designs. For instance, a sensor specifically configured to detect a jolt or impact on the printer can be provided. Additionally, a sensor specifically configured to detect tilt, and/or a sensor specifically configured to detect a jiggling or wobbling motion of the printer can be provided. Any of the sensors can be configured to sound an alarm if certain tolerances are exceeded. The detection of such adverse influences is advantageous because the 3-D printing process often takes a significant amount of time and resources to complete. If the adverse influences will negatively affect the 3-D print result, then the 3-D printing process can be stopped, inspected, adjusted, and/or completely restarted if needed.

Figure 7C:
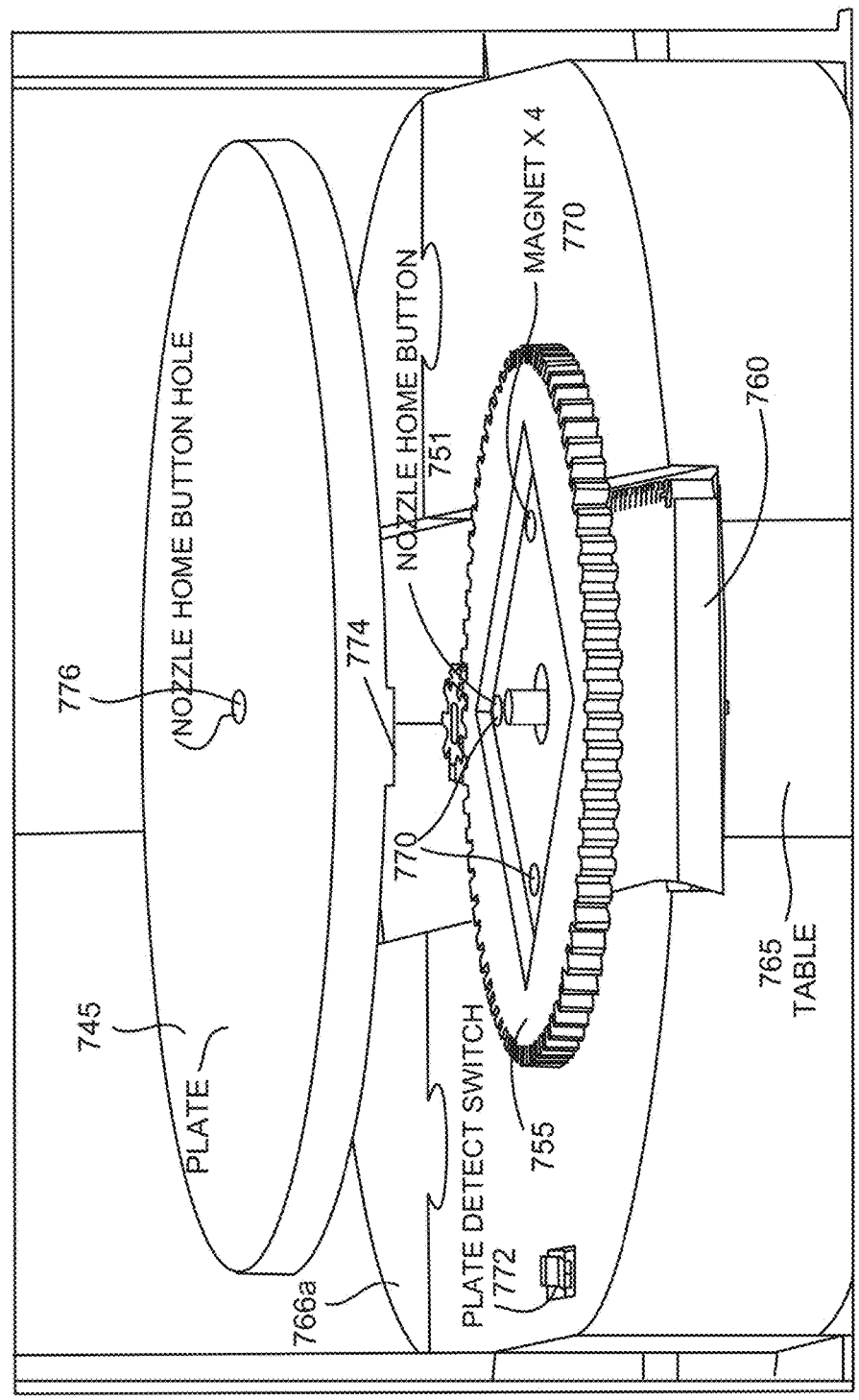
FIG. 7C is a view of the 3-D printer platform which is detachably mounted to the turning mechanism of the stage.
Figure 7D:
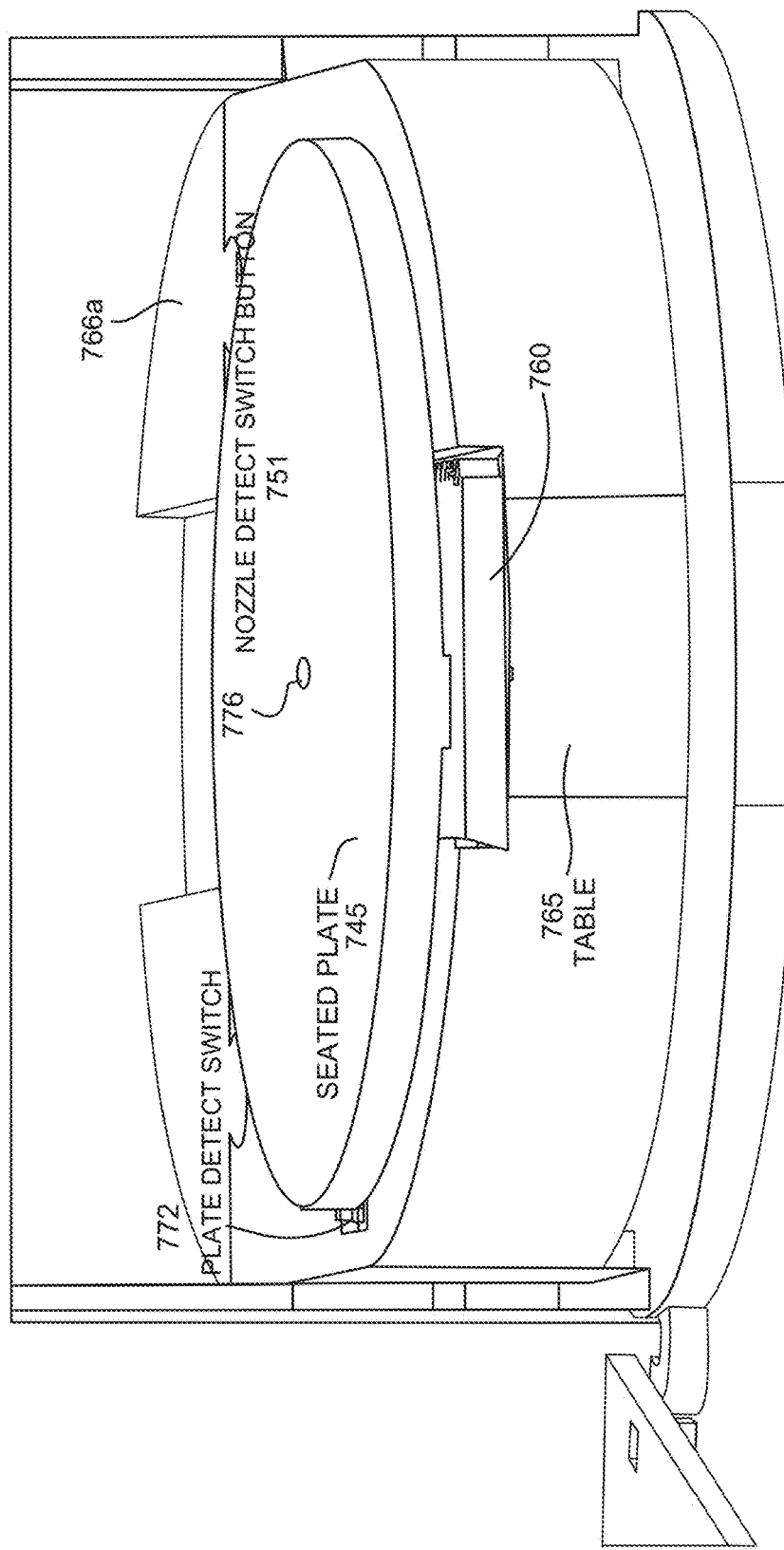
FIG. 7D is a view of the 3-D printer platform as mounted (detachably) to the turning mechanism of the stage.

Referring next to FIGS. 7C and 7D, the attachment of the plate 745 to the turning mechanism 755 is further described. FIG. 7C shows the plate 745 in a detached position. More viewable in this figure are magnets 770 on the upper surface of the turning mechanism 755. While any number of magnets can be used, this particular embodiment uses 4 magnets that are evenly spaced on the upper surface of the turning mechanism. Corresponding attraction magnets (not shown) are located on the lower surface of the plate 745 to align with the magnets 770. Further shown is the trigger 751 which extends through the nozzle home button hole 776 located in the center of the plate 745. A plate detect switch 772 is shown on the upper surface 766a of the table 765. The switch 772 is configured to interact with the plate 745 to detect when the plate is in a seated configuration on the turning mechanism. When the plate is seated, the magnets 770 will interact with their counterparts on the plate 745 and serve to hold the plate in position for added safety and precision during printing operations. A plate detect tooth 774 is also shown extending from the bottom of the plate 745, and can be used to further detect the presence of the seated plate. FIG. 7D next shows the plate 745 in a seated position. The outer edge of the plate is shown to be in engagement with the plate detect switch 772, and the plate detect tooth 774 is shown to be in contact with the upper surface of the table 766*a* or the slide 760, depending upon the orientation of the plate 745. This is accomplished via a 360 degree rotation of the plate 745. The top surface of the trigger button 751 is visible and accessible through the nozzle home button hole 776.

Another important aspect of the present configuration is that table 765, after it is fully assembled, becomes a complete self-contained or monolithic stage that includes all of the drive motors, switches and controllers for moving the platform in the needed directions. For a polar coordinate system this would include the Z, R, and theta directions. For a Cartesian coordinate system this would include the Z, X, and Y directions. This self-contained stage then becomes easier to manufacture and test as a single unit. The orientation and placement of the motors also provides for a lower load placement on the gears and the motors, and therefore lighter weight and lower cost motors can be used in manufacturing the stage. The lighter weight motors also use less power during operation. Prior configurations require large stepper motors that can brake and hold the X, Y, and Z mechanisms in place. The present configuration does not require such large stepper motors.

The configuration presented herein also provides a constant nozzle distance aspect to the 3-D printer. In any 3-D printer operation, the platform (or print bed) needs to remain at a constant distance relative to the printer nozzle in order to properly deposit the successive layers that form the 3-D printed object. Prior 3-D printers provide a platform that is configured to be initially level, but then needs to be adjusted back to level over time and use. The mechanical motion of the various parts relative to one another is difficult to keep aligned, and therefore prior configurations have required a leveling adjustment procedure to be performed often by the user. This procedure often involves the turning of leveling screws on the platform, which leads to a need for constant re-adjustment as each side of the platform is adjusted up or down.

The present configuration provides a 3-D printer that maintains the platform at a constant (known) distance relative to the printer nozzle without the need for constant adjustments or leveling of the printer platform. Accordingly, for the descriptions presented herein, the terms relating to 'level' or 'leveling' are meant to convey the proper operation of the 3-D printer with the printer nozzle being a known or constant distance from the platform, rather than 'level' being relative to a 'true' horizontal, or earth-based gravity horizontal, or the like. To achieve these advantages, the present configuration orients all motion vectors of the stage through a single point of origin. Therefore the stage described herein provides for consistent motion of the platform surface relative to the nozzle through all degrees of motion. Coincident angles between the motion vectors and the nozzle remaining constant. The platform remains in a consistent level plane relative to the nozzle, and therefore adjustments do not need to be made in order to keep the platform level, or at a constant distance from the printer nozzle.

Figure 7E:
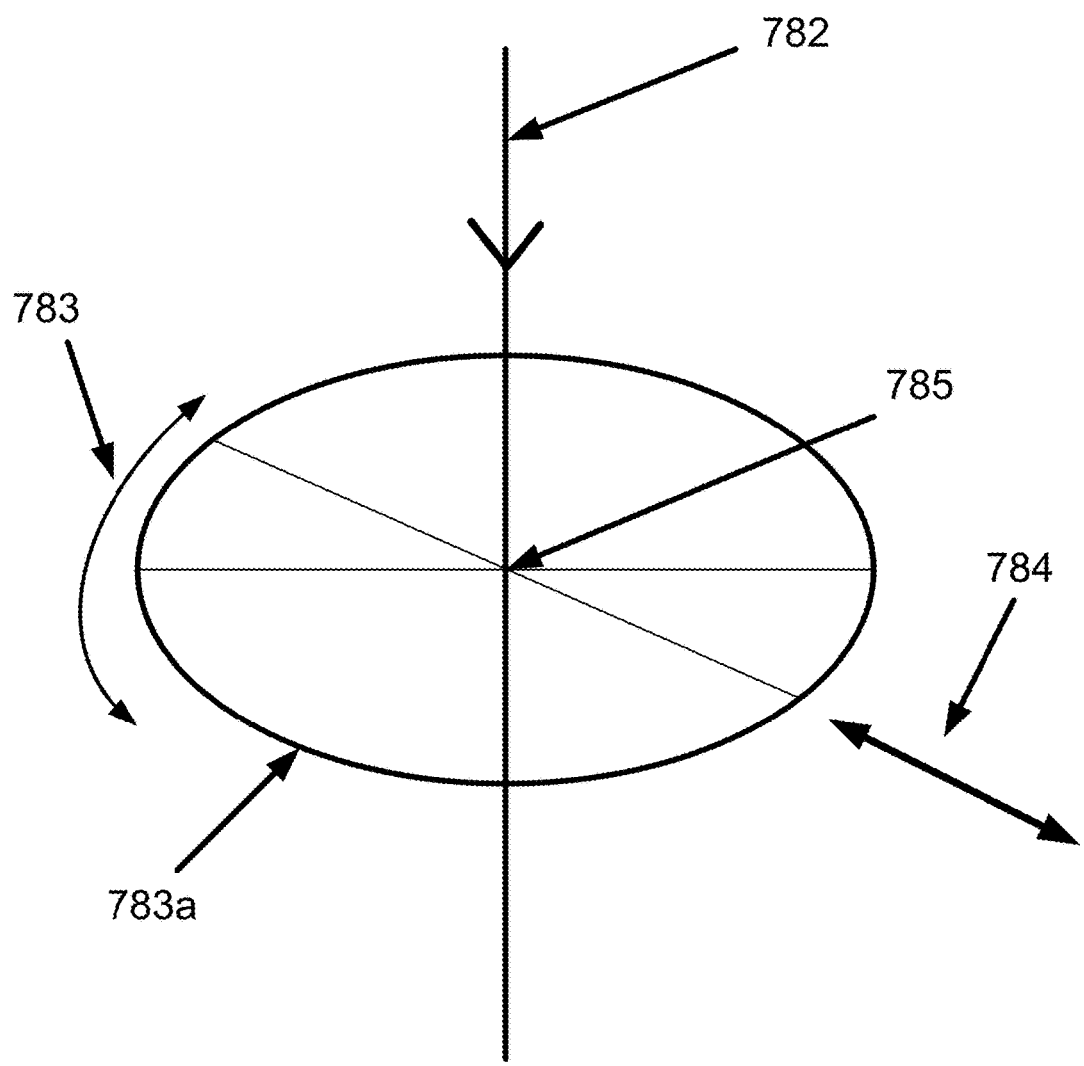
FIG. 7E is an illustration that shows the motion vectors of the 3-D printer being configured to all pass through a central point of origin.

This can be illustrated with reference to FIGS. 7E, 7F, and 7G. FIG. 7E shows a range of motions including a Z axis 782, a rotational theta axis 783, and a radial R axis 784. All vectors of motion are oriented around a single point of origin 785. A circular plane is shown as 783*a* and serves to represent the surface of the platform 745. If this circular plane is tilted at any angle relative to the point of origin, the vectors of motion will still pass through the point of origin 785 in any direction.

Figure 7F:
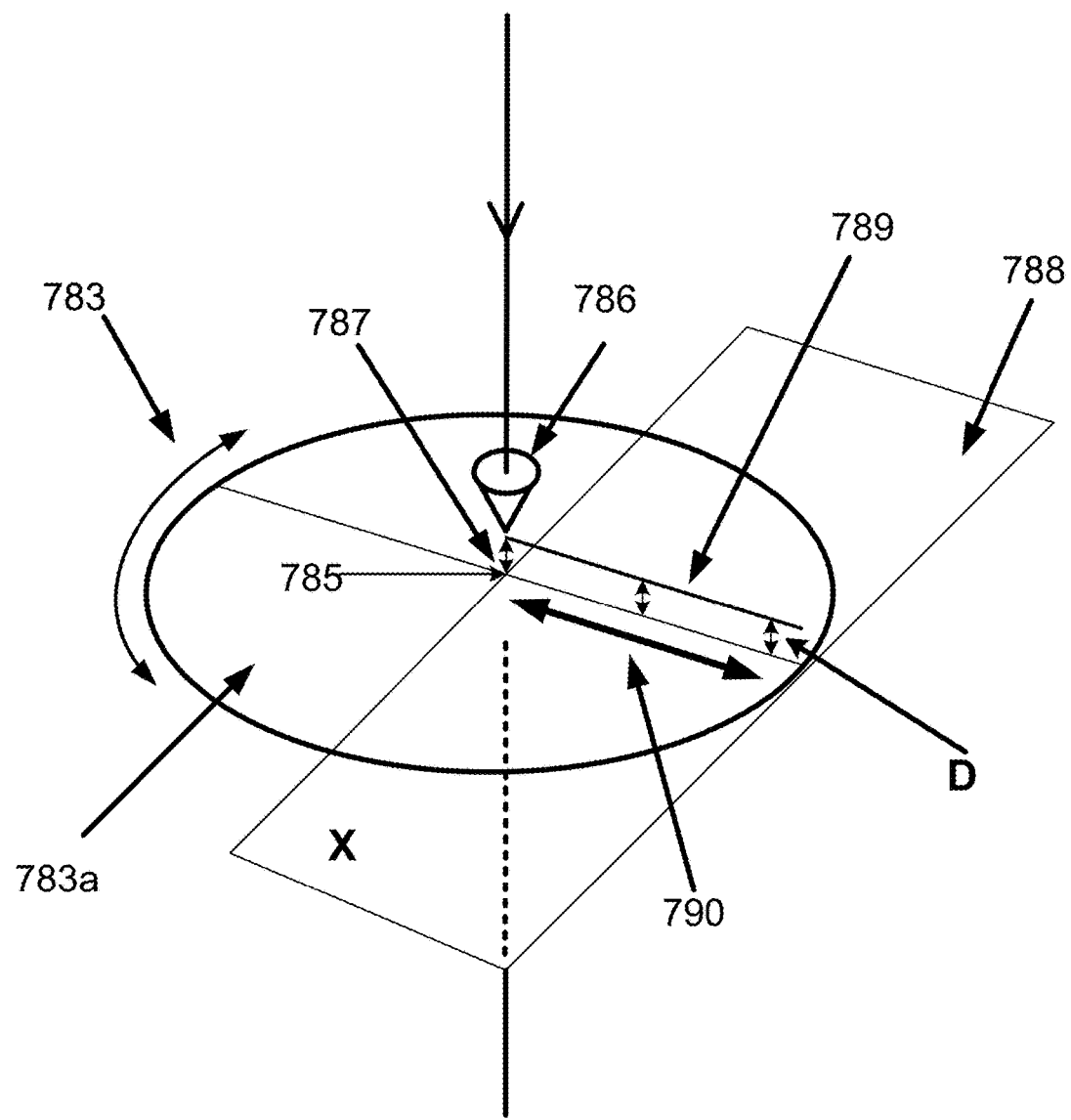
FIG. 7F is an illustration that further shows the motion vectors of the 3-D printer being configured to all pass through a central point of origin.

FIG. 7F serves to further illustrate the advantages of the present configuration. The principles are meant to be widely applicable to various types of coordinate systems. In relation to a Cartesian coordinate system (for instance), an X plane 788 is shown, wherein movement in the X direction relates to movement in the theta direction 783, 783*a*. The representative nozzle 786 is lowered to register with the button (or contact point, or switch) 787, which is located at the point of origin 785. This serves to nominalize or zero out the system and establish the point of origin 785 and the distance that the nozzle should be from the platform 745. Any motion thereafter along vector 789 in the X direction, which corresponds with the R (lateral) direction 790 in a polar system, is always co-planar with the nozzle. Therefore, the nozzle 786 is always the same distance D from the platform 745. A similar result would exist for other planes of motion, as long as they have all been established through a common point of origin per the described configuration.

Alternatively, the contact point or switch 787 does not need to be located at the point of origin 785. The switch 787 could be located anywhere on the platform 745. As long as the distance of the switch 787 from the origin 785 is known, this relative distance can be factored into the printer movements.

Accordingly, any relative tilt that might be imparted on the circular plane 783*a* will not present alignment problems for the 3-D printer during operation. The surface of the platform might not be level for any of a variety of reasons including cantilevering effects. See, for example FIG. 5B above. In this particular configuration, the platform is not anchored at the center of the platform, but instead a distance from the center. The pivot point of the mount is thereby off-center. When the stage is mounted inside the full printer configuration, this non-centered anchoring causes the platform to tilt slightly downward or be cantilevered. Since the platform moves on an axis that is always parallel to the surface of the platform, the nozzle tip is always the same distance from the surface of the platform. As a result, despite the slant in the surface of the platform, the nozzle tip will not drive into the surface of the platform.

In prior Cartesian printers, this would generally not be the case. With a Cartesian coordinate printer, the platform must generally be very flat, or there is a danger of driving the nozzle into the surface of the platform. One solution might be to center the platform, and try to make it flat rather than slanting downward. However, problems occur as the platform is raised or lowered, as it tends to wobble on the left side, and then the right side, and so forth. By using a cantilevered mounting configuration, the platform tends not to wobble and remains steady when moving up-and-down in the Z direction, even though it presents a slightly downward slanted position. In other words, gravity loads the platform so that it will not teeter around the Z-axis.

Figure 7G:
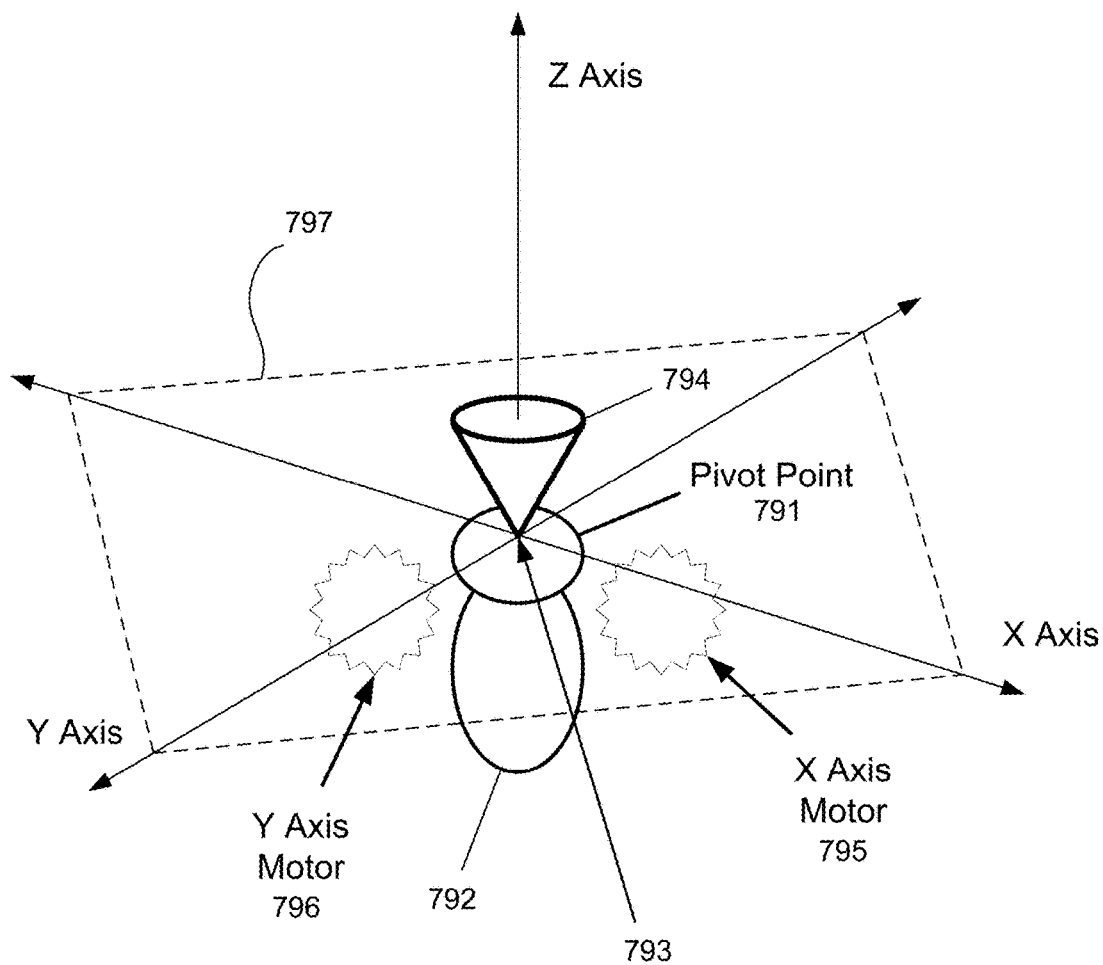
FIG. 7G is an illustration that shows use of a central pivot point in designing 3-D printer configurations with constant nozzle distance capabilities.
Figures 1, 7I:
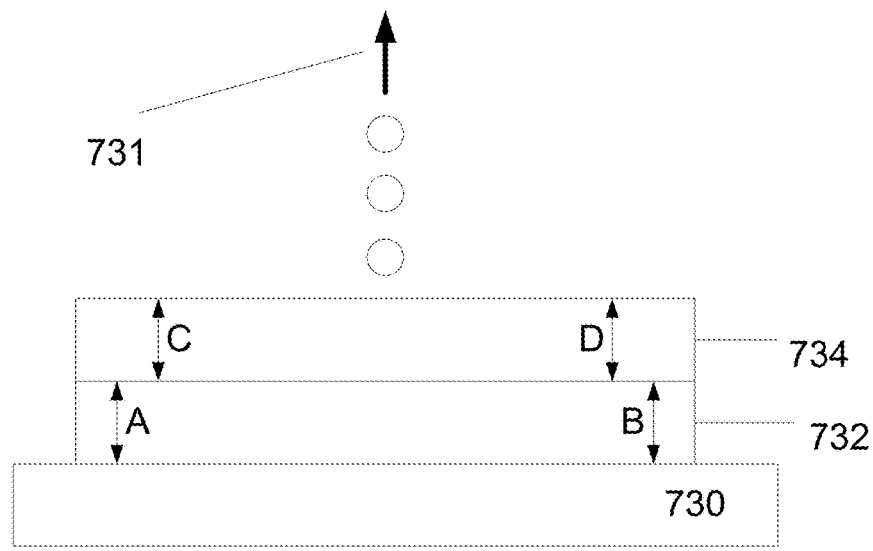

Referring now to FIG. 7G, a general approach is shown that can be applied to various other types of 3-D printer systems, including for instance a Cartesian coordinate printer. Central to the configuration is pivot point 791, which includes (for instance) a ball, post, or point. In this example, a post type structure with a rounded ball 792 is shown. The X axis, Y axis, and Z axis are each shown passing through a central point of origin 793 which is defined at the center-top of the pivot point. A nozzle 794 is shown registering with the central point of origin 793 in order to nominalize (or zero out) the system. An X axis motor 795 and Y axis motor 796 are shown associated with their respective axes. Rotation of the X and Y axes is applied by the respective motors 795, 796 around the pivot point 791. Accordingly, the representative plane 797, as formed by the X and Y axes and shown by the dotted line, would rotate as a plane around the pivot point 791. If the plane tilts in any given direction, the vectors of motion will still pass through the central point of origin 793 and be on-plane with 797. In practice, any type of manufacturing machine could incorporate the benefits of this approach as long as the machine's motion vectors are defined around a central pivot point, and the motion vectors all pass through a central point of origin. Such manufacturing machines can include, for instance, subtractive manufacturing machines, CNC (Computer Numerical Control) milling and turning machines, cutting machines, and laser cutting machines. The described approach is also suitable for use in marking devices such as plotters.

Referring next to FIGS. 7H-1, 7H-2, and 7H-3, a series of operational examples are shown which further demonstrate the advantages of the present configuration. FIG. 7H-1 shows representative movements of a 3-D printer extruder (or nozzle assembly) in a 3-D printer where the extruder 710(*abc*) moves over the top surface of the platform 712. In this example the platform 712 has one axis of tilt, which can be attributed (for instance) to an un-level platform. In the middle position 710*b*, the extruder is perfectly positioned a correct distance over the platform 712. 'Perfectly positioned' means that the tip of the emitter, which in this case is the nozzle of a heated plastic extruder, is in a fixed distance from the printing surface. This provides equal bonding and layer height to the object being printed. In position 710*c*, the extruder is too high above the platform and an air gap 711 is shown. Such air gaps most often lead to improperly formed 3D printer objects. In position 710*a*, the extruder is shown in a collision condition with the platform 712. At point 713, the nozzle of the extruder is too low and crashes directly into the platform or substrate. A collision between the extruder and the platform can damage both parts, and can also put damaging strain on the motors that are driving the movement of the extruder and/or the platform. This example therefore serves to illustrate certain problems that might occur in prior 3-D printer configurations.

Figures 2, 7I:
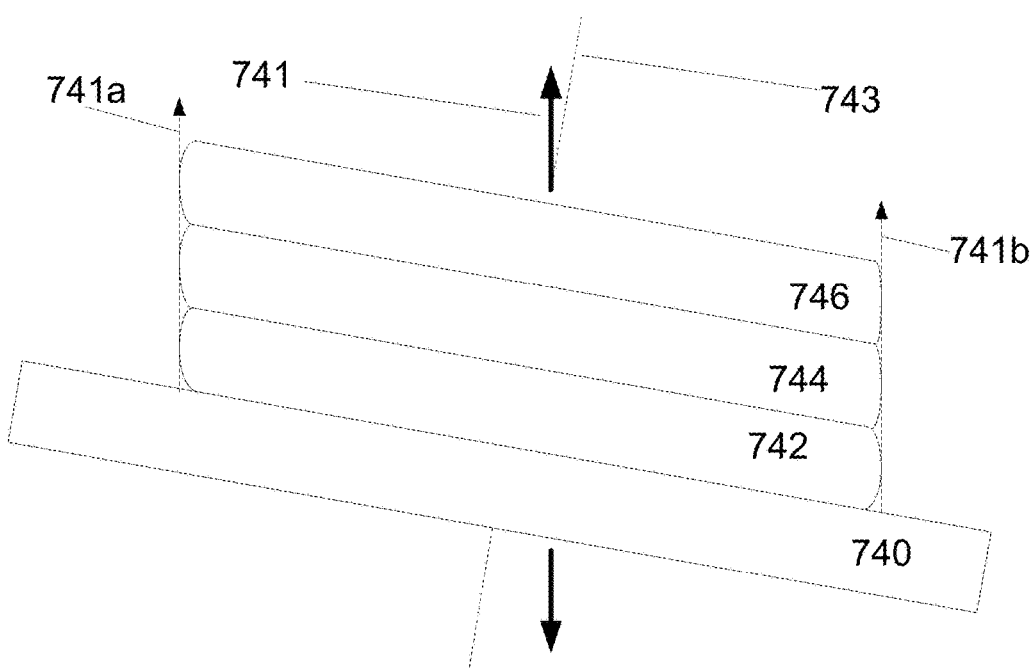

FIGS. 7H-2 and 7H-3 next show representative movements of a 3-D printer extruder according to the present configuration. According to the present configuration, the extruder (or nozzle assembly) remains in a fixed position, and the platform moves underneath the extruder. In FIG. 7H-2, an extruder 716 is shown in perfect position above a platform 718 which is shown to move along one axis 719. Similarly, in FIG. 7H-3, the extruder 716 is shown in perfect position above platform 718, with the platform shown to move along a second axis 720. Accordingly, regardless of there being two axes of movement, the present configuration maintains the extruder 716 at a constant distance above the platform 718. No air gaps or collisions will occur and the resulting 3D printed object will be produced correctly.

Referring now to FIG. 7I-1, the underlying principle that each subsequent layer should be a consistent height is further illustrated. A representative platform 730 is shown with a first layer 732 and a second layer 734 formed on the platform 730. The layers will extend upward through the Z (or vertical) axis 731 until the desired 3-D object is formed. The first layer 732 is shown to have a thickness A on the left portion and thickness B on the right portion of the layer. The second layer 734 is shown to have a thickness C on the left portion and thickness D on the right portion of the layer. Each layer should be consistent in height or thickness across the whole layer. However, each subsequent layer does not necessarily need to be equal to each other. Hence, in this representative example, A=B and C=D. However, A and B do not necessarily need to be equal to C and D.

Referring next to FIG. 7I-2, the underlying principle that each subsequent layer will properly track upward through the Z (or vertical) axis is further illustrated. A representative platform 740 is shown with a first layer 742, a second layer 744, and a third layer 746 formed thereon. The platform 740 is tilted (in an exaggerated manner) to illustrate that the subsequent layers 742, 744, 746 and so forth will be properly formed upward through the Z (or vertical) axis of the printer as shown by vectors 741, and also vectors 741*a* and 741*b*. Conversely, the subsequent layers will not track upward through the tilted axis 743, which is shown extending perpendicular to the surface of the platform 740. Per the description above, the platform can therefore have a certain amount of tilt without adversely affecting the formation of the 3-D printed object. In this representative example, the bottom of the object might have a slight angle when it is removed from the platform, but this will not adversely affect the end use of the object. If needed, the slight angle on the bottom can be removed or corrected before use of the object. In practice, such bottom angle corrections are a good trade-off versus the need to continually level and re-level the 3-D printer, which the present configuration avoids.

Accordingly, the present configuration achieves the aforementioned advantages by using a single reference point sensor in the center of the build surface or platform. The fixed nozzle is referenced to the intersecting vectors of the X and Y axes, with the vector's angles remaining relatively constant. The monolithic or self-contained design of the vertically moving (Z) stage is configured to link the X and Y axis to the Z motion of the nozzle. The deflection angles pass through the contact point of the nozzle for the first and every print layer at a constant angle. This constant angle is generally not known, but knowing the precise angle is not generally needed in the present configuration. During the print operation, the rendered object will be printed perfectly, meaning that every layer will be parallel, regardless of whether the constant angle is known or not.

The result can also be viewed as compliant printing on a non-level surface, and/or "level-agnostic" printing on a 3-D printer platform. Again, as long as the 3-D printer platform of the present configuration maintains a set of constant deflection angles relative to the emitter or nozzle, and the motion vectors are configured to pass through a central point of origin, then the relative levelness (or un-levelness) of the 3-D printer platform is not a factor, and will not be detrimental to the operation of the present configuration. The present configuration will therefore comply with the print surface which might be un-level on one axis, or multiple axes.

In prior art un-linked axis machines, the described inaccuracies will normally ruin a print and potentially damage such a machine. Some example 3-D printing machines use a fixed nozzle, but the X, Y, and Z axes are not linked, which results in the described problems of leveling. Most machines require the user to constantly re-level the machine, with a failure to properly level resulting in the aforementioned failures. It should also be noted that most prior art systems require large stepper motors that can brake and hold the X, Y, and Z mechanisms in place. This necessitates stronger construction (for instance) to resist deformations caused by shipping, handling and use.

Figure 8:
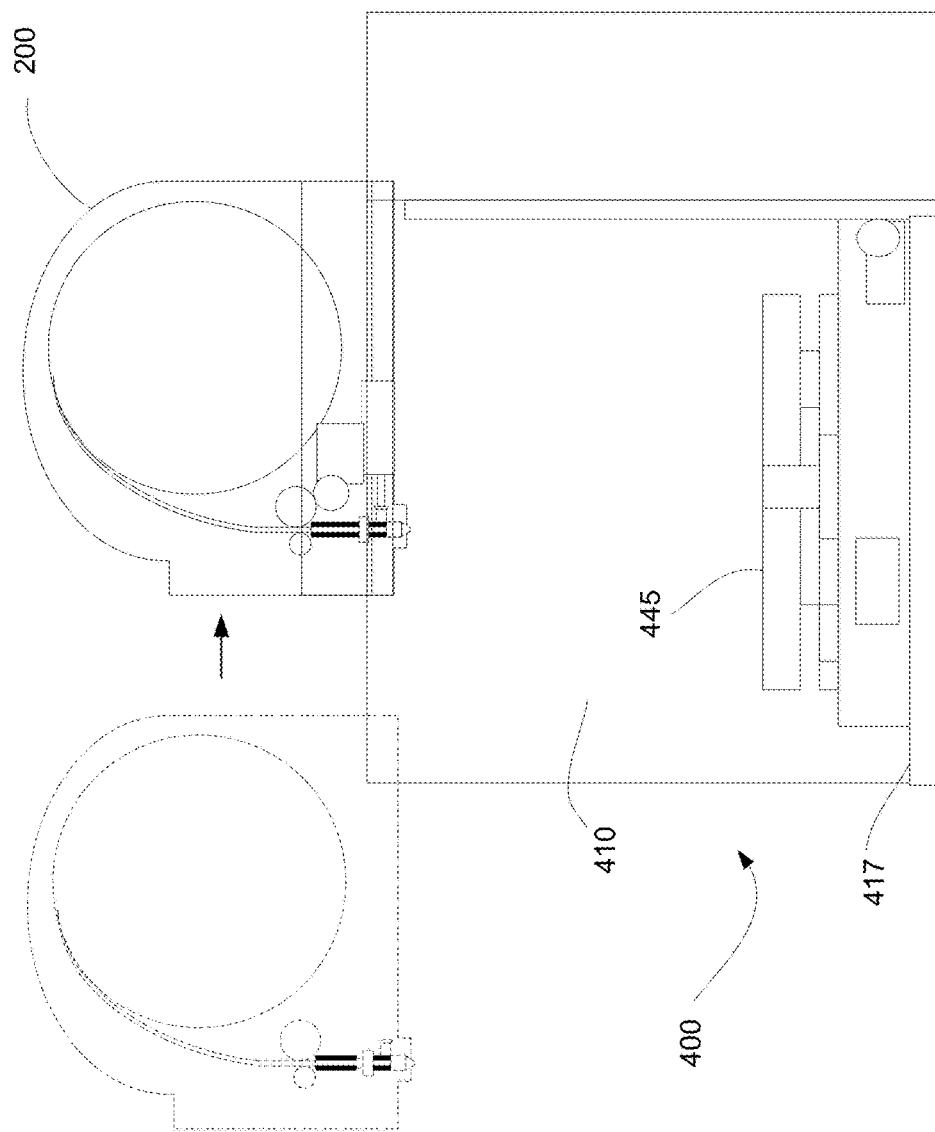
FIG. 8 is a diagram of the cartridge and the three-dimensional printer according to a particular embodiment of the present invention.
Figure 9:
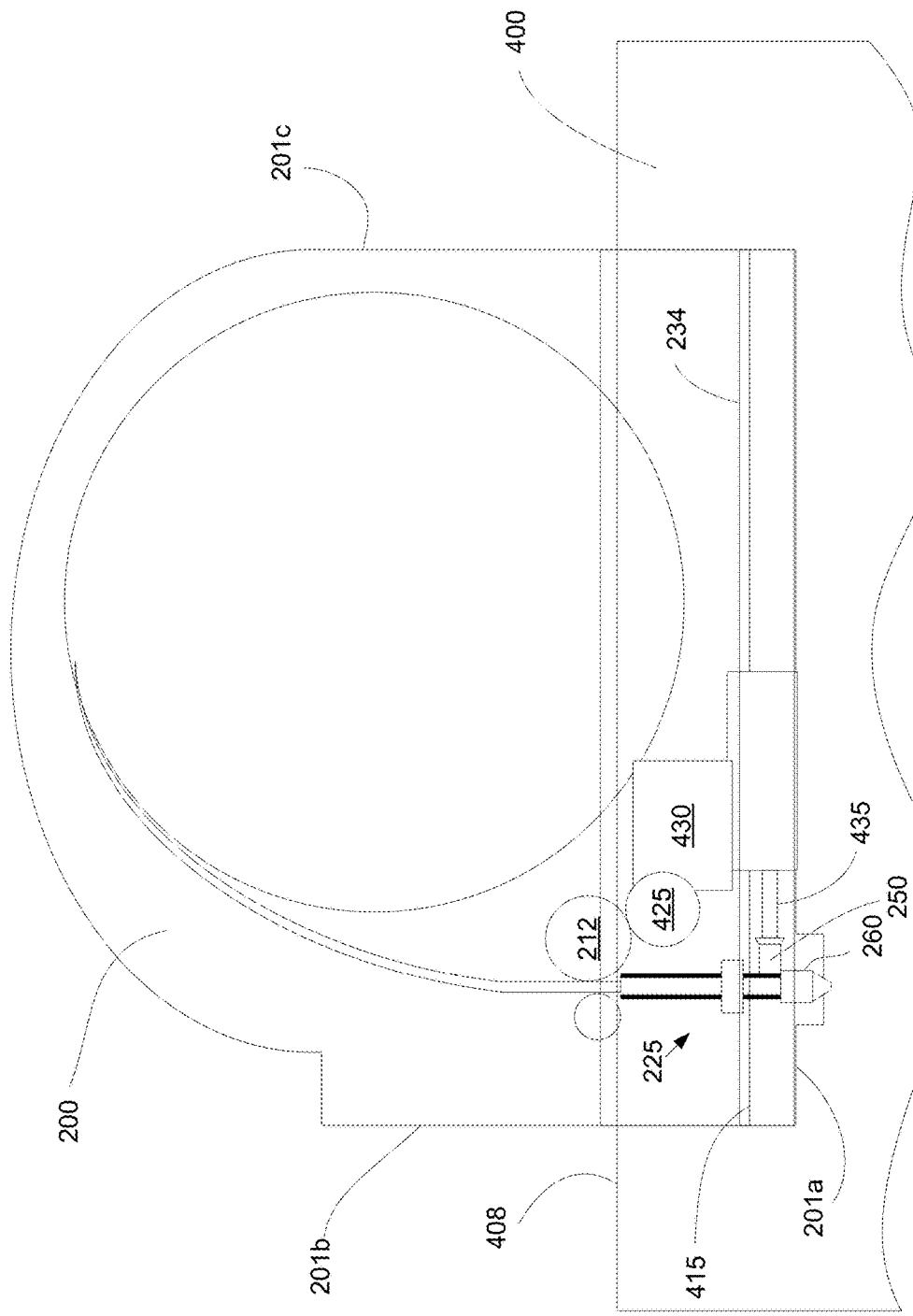
FIG. 9 is a magnified view of a portion of the diagram illustrated in FIG. 8.

Referring next to FIGS. 8 and 9, diagrams illustrating the engagement of the cartridge 200 and the 3-D printer 400 according to a particular embodiment of the present invention will be described. In this example, the cartridge 200 and the printer 400 are the cartridge and printer illustrated in FIGS. 2A and 4A, respectively.

In the illustrated embodiment, the cartridge 200 is oriented so that its bottom surface 201a (out of which a nozzle 260 extends) is facing downward i.e., in a direction that is perpendicular to the bottom surface 417 of the compartment 410 in the printer 400. To engage the cartridge 200 with the printer 400, the cartridge 200 is moved laterally into or along the printer i.e., in a direction that is parallel to the top surface 408 of the printer 400. Other movements (e.g., vertical movements) may be used in addition to or instead of this lateral movement to engage the cartridge 200 with the printer 400.

In various embodiments, the top surface 408 of the printer supports or includes a cartridge interface 415 with one or more engagement elements e.g., a rail, a slot, a latch, etc., which helps secure the cartridge 200 to the printer 400. In the illustrated embodiment, for example, the top surface 408 of the printer includes or supports one or more slots or recessed regions that extend in a direction parallel to the top surface. The cartridge 200 also includes one or more engagement elements 234 (e.g., a rail) that is inserted into the slot. The rail of the cartridge 200 is then slid along the slot of the printer 400 until the rail reaches the end of the slot. At that point, the cartridge 200 is fully seated in the printer 400.

In this example, the lateral motion of the cartridge 200 creates at least two points of engagement. For one, the lateral motion causes the heating element 435 of the printer 400 to engage or become inserted into the heater receiving element 250 of the nozzle assembly 225. Also, the lateral motion of the cartridge 200 simultaneously causes the feed gear 212 of the cartridge to physically engage the feed pinion 425 of the printer.

Figure 13:
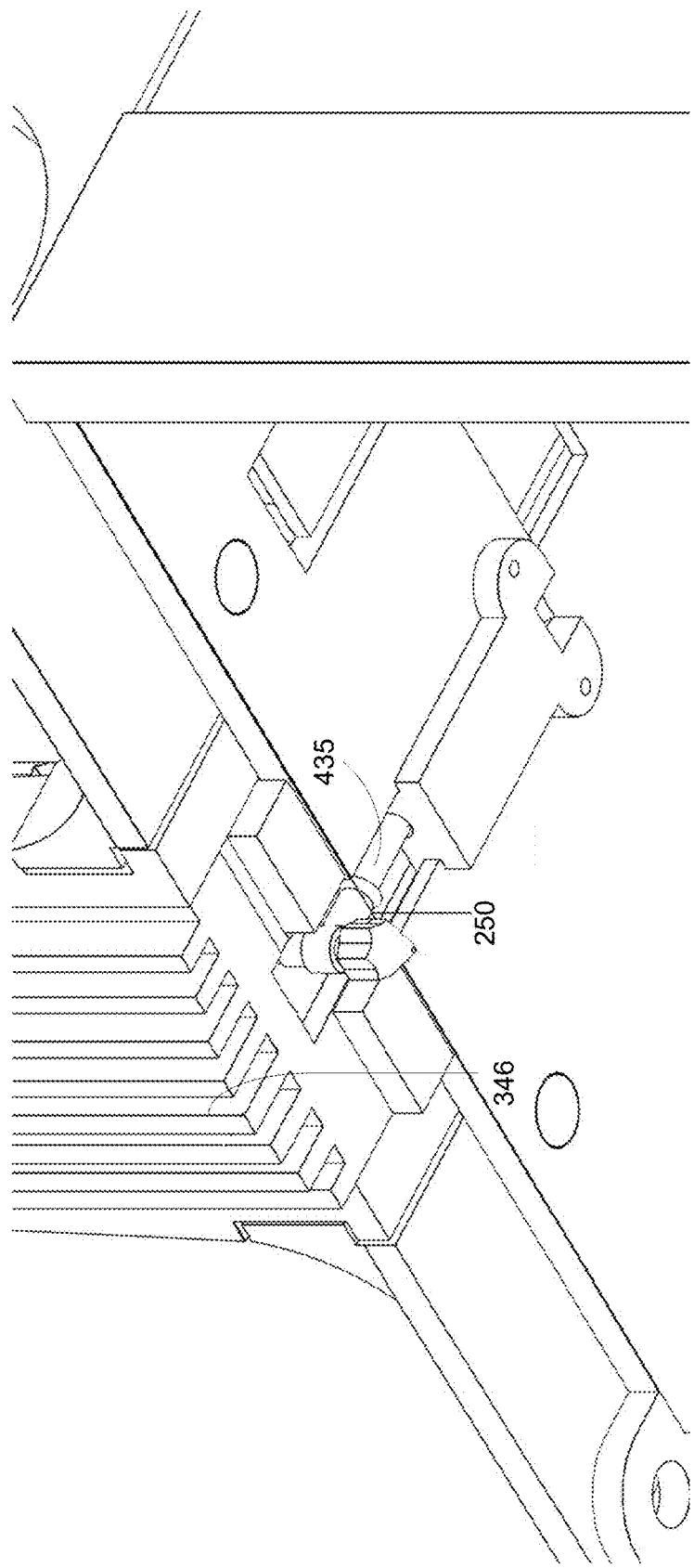
FIG. 13 is perspective view of a heater receiving element and a heating element according to a particular embodiment of the present invention.

As a result of the above engagement, the heating element 435 of the printer 400 and the feed pinion 425 of the printer 400 are able to perform their intended functions. That is, the heater element is arranged to generate heat and use the heat to help melt deposition material/filament in the nozzle assembly 225 to a plastic state. The heat generated by the heating element 435 flows upward through the nozzle assembly 225 and dissipates out through the front grate 346 (FIGS. 3A and 13). As shown in FIG. 3, a cavity 348 is provided to facilitate heat flow to prevent heat build-up in the cartridge 200 and deformation of the deposition material. The feed pinion 425, which is powered by the feed pinion motor 430 of the printer, is arranged to rotate, which in turn rotates the feed gear 212 of the cartridge 200. This rotation helps move the deposition material/filament through the nozzle assembly.

When the cartridge 200 is fully seated in and engaged with the printer 400 as described above, at least a portion of the nozzle 260 is exposed and/or extends beyond the housing 405 and is positioned within the inner compartment 410 of the printer. The nozzle 260 faces in a downward direction i.e., in a direction parallel to the Z axis and/or in a direction that is perpendicular to the bottom surface of the compartment 417 or the top surface of the platform 445. Accordingly, the nozzle 260 is well positioned to dispense deposition material over the platform.

Figure 11A:
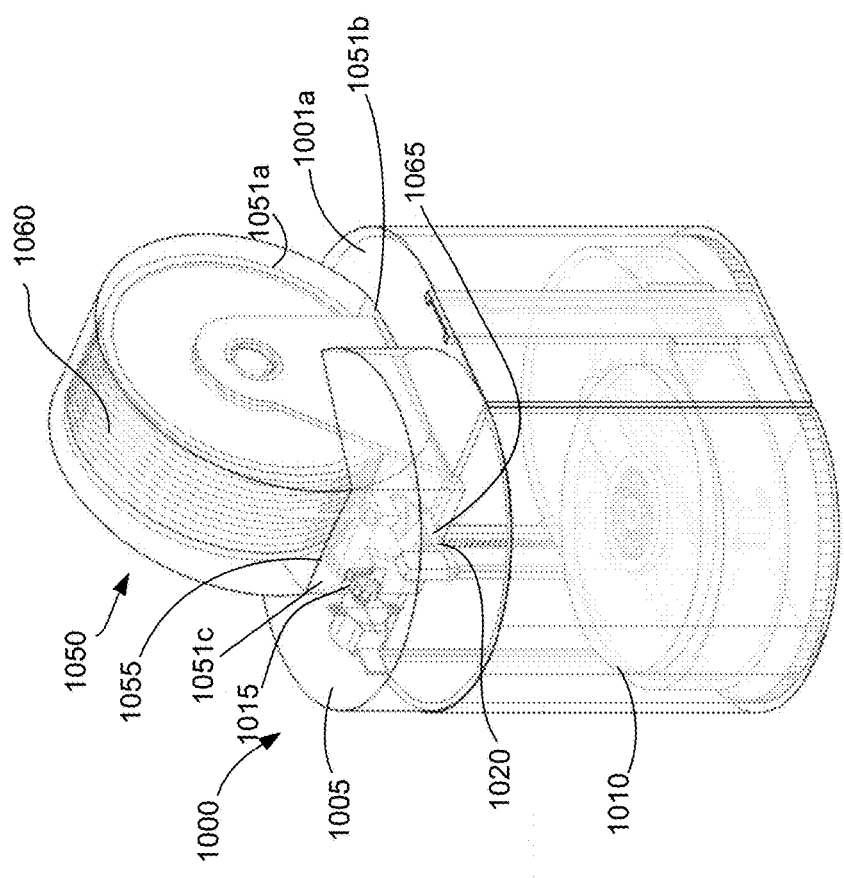
FIG. 11A is perspective view of a cartridge and three-dimensional printer according to a particular embodiment of the present invention.

Referring next to FIGS. 10 and 11A, a cartridge 1050 and a printer 1000 according to another embodiment of the present invention will be described. For the purpose of illustration and clarity, the housings of the cartridge and printer are drawn to be transparent so that their inner components can be seen. FIGS. 10 and 11A indicate an example method of attaching the cartridge 1050 to the printer 1000.

In this example, the cartridge 1050 includes a spool of deposition material/filament 1060, a feed gear 1055, a heater receiving element 1065, as well as any of the cartridge components described in connection with the cartridge 200 of FIGS. 2A and 2B.

The spool 1060 forms a cylinder with opposing top and bottom surfaces. In this example, the deposition material/filament is coiled to help form sides of the cylinder. The spool is situated within the cartridge such that the top and bottom surfaces of the spool are parallel and/or adjacent to opposing side surfaces 1051a of the cartridge 1050.

A bottom surface 1051b of the cartridge 1050, which is perpendicular to the side surfaces, is arranged to rest on the top surface 1001a of the printer 1000 when the cartridge is fully seated in the printer, as shown in FIG. 11A. A nozzle of a nozzle assembly in the cartridge 1050 points in the same downward direction that the bottom surface 1051b of the cartridge 1050 faces.

In the illustrated embodiment, the cartridge 1050 also includes an attachment surface 1051c, which is perpendicular to both the side surfaces 1051a and the bottom surface 1051b of the cartridge. The heater receiving element 1065 of the cartridge extends in a direction perpendicular to this attachment surface. The heater receiving element may be at least partially exposed and positioned outside the attachment surface, or be within the housing of the cartridge e.g., accessible through an opening or a door in the housing.

There is also a feed gear 1055 that is positioned near, at or on the attachment surface. The feed gear 1055 may be at least partially exposed outside of the cartridge housing, or positioned within the housing e.g., accessible through an opening or a door in the housing. In this particular embodiment, the feed gear 1055 has the shape of a flat cylinder. The top and opposing bottom surfaces of the gear are connected with toothed side surfaces. In this example, the feed gear is positioned such that the toothed surfaces face outward in the same direction as the attachment surface 1051c and the top/bottom surfaces of the feed gear are parallel to the side surfaces of the cartridge.

The printer 1000 includes a base structure 1010 and a top attachment structure 1005. The base structure 1010 includes opposing top and bottom surfaces. The top surface of the printer 1001a, as shown in FIG. 11A, is arranged to support the bottom surface of the cartridge. The attachment structure 1005 is a structure that is positioned on or extends out of the top surface 1001a of the base structure.

In the illustrated embodiment, the feed pinion 1015 and the heating element 1020 of the printer are at least partially covered by, supported by or positioned within the attachment structure 1005 of the printer 1000. In this example, the attachment structure 1005 forms a slot/recessed region in cooperation with the top surface 1001a of the base structure. The cartridge 1050 is arranged to fit into this slot/recessed region. When the cartridge is fully seated in the slot/recessed region of the printer, the heating element 1020 of the printer extends into the heater receiving element 1065 of the cartridge, as shown in FIG. 11A. Additionally, the feed pinion 1015 of the printer engages the feed gear 1055 of the cartridge.

It should be noted that the orientation of the heater receiving element in the cartridge is somewhat different in the cartridge of FIG. 10 than it is in, for example, the cartridge of FIG. 9. In FIG. 10, the heater receiving element 1065 is facing outward and away from the cartridge. That is, the aperture in the heater receiving element through which the heating element is inserted faces the printer and/or faces in the same direction as the attachment surface.

In FIG. 9, however, the design of the heater receiving element 250 is somewhat different. The heater receiving element 250 in FIG. 9 is facing inward. Put another way, the cartridge 200 includes a bottom surface 201a that rests on the printer, and two opposing side surfaces (first and second side surfaces 201b/201c) that are perpendicular to and/or at opposing edges of the bottom surface 201a. The heater receiving element 250 is substantially closer to the first side surface than the second side surface, but does not face in the same direction as the first side surface. Rather, it faces in the same direction as the second side surface.

Figure 11B:
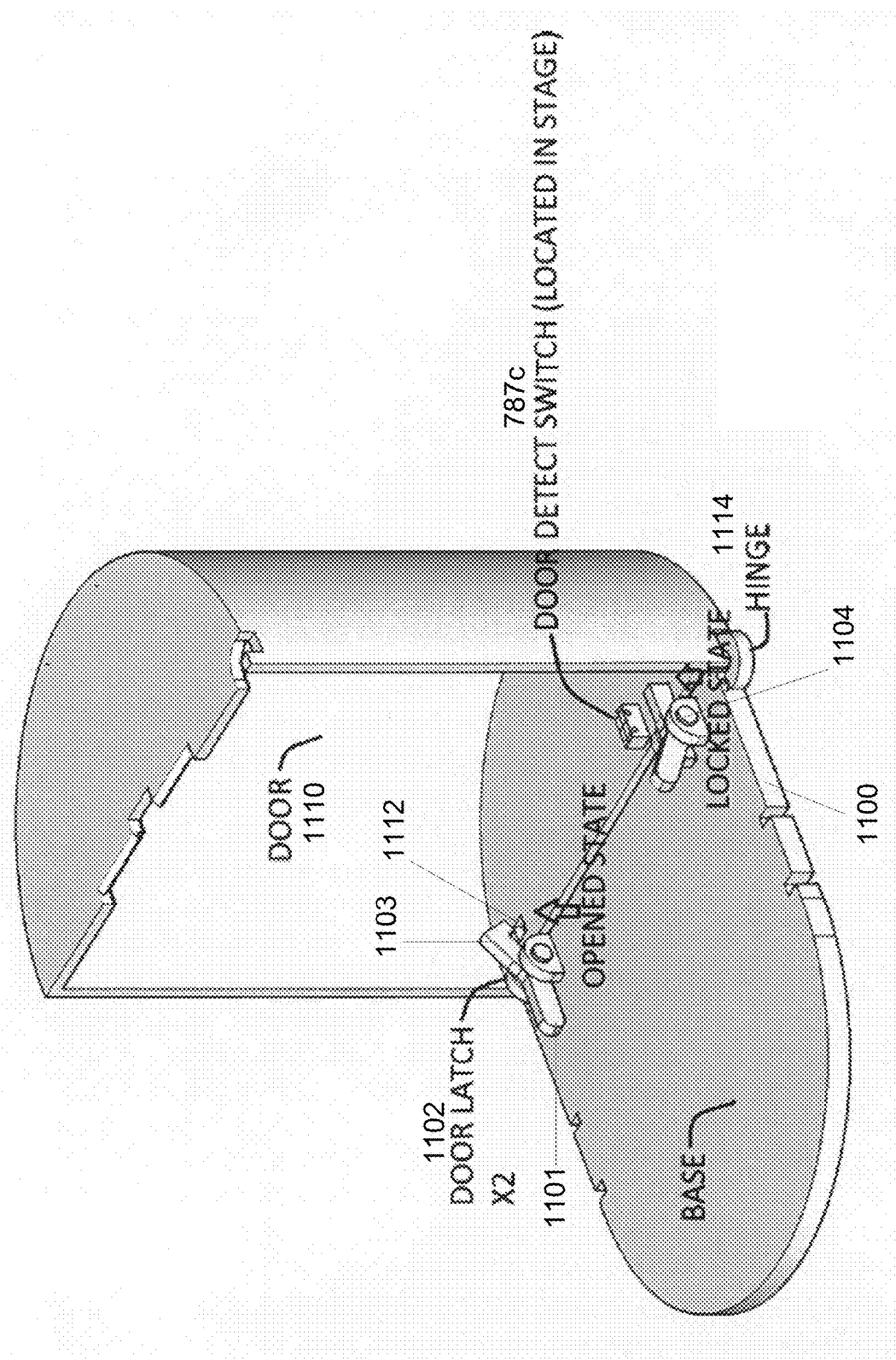
FIG. 11B is a perspective view of printer base and door with safety latches.
Figure 11C:
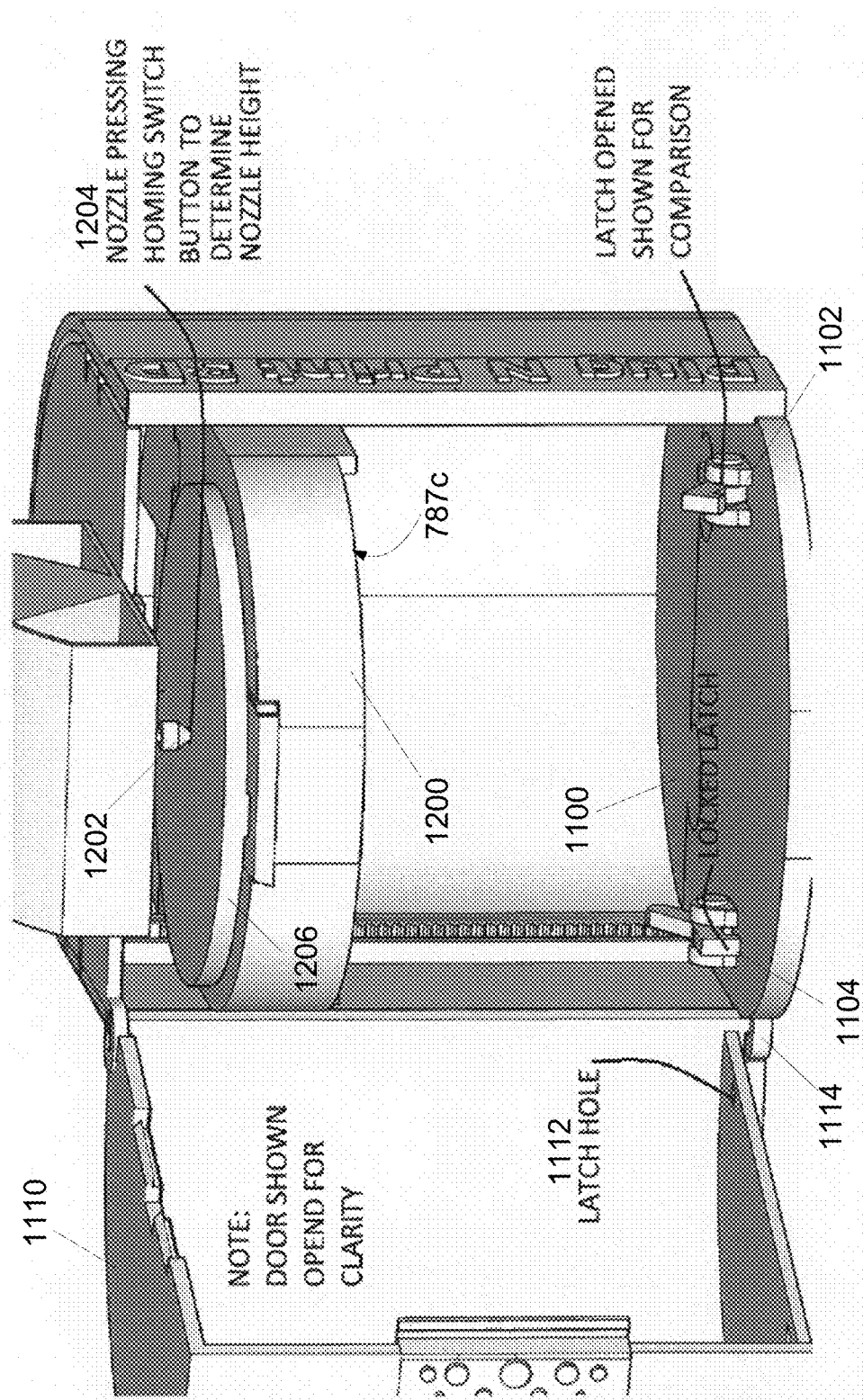
FIG. 11C is a perspective view of a 3-D printer having safety latches.

Referring next to FIGS. 11B and 11C, a safety feature for the door is shown in the form of a pair of latching mechanisms. FIG. 11B shows a base portion 1100 of the printer structure with the base portion including a first latch 1102 and a second latch 1104. The latches are spring loaded and oriented to be biased in the closed (or locked) position, as representatively shown by latch 1104. These example latches include a latching hook 1103 and a latch tail 1101. A door detect switch 787c is also shown, which is actually located in the stage section as per FIG. 7B. The door 1110 is shown connected to the printer base via a hinge 1114. The door includes respective latch holes 1112 for interacting with the latch hooks 1103. When the stage is moved to the lower-most Z position in the printer, the stage will come into contact with the latch tails (1101) located on each latch. The weight of the stage will push the tails downward and thereby open the latch hooks (1103) from contact with their respect latch holes 1112 in the door 1110.

FIG. 11C shows another representative viewpoint of a printer having the safety latches. The base 1100 includes a first and second latch 1102 and 1104. When closed, the latches interact with the respective latch holes 1112. In this view, the door detect switch 787c is located in the bottom of the stage 1200. When the stage 1200 is raised to its upper position (as shown), the nozzle 1202 comes in contact with the home switch 1204 in the center of the platform 1206. This serves to determine the nozzle height and to nominalize the vector motions at the point of origin. When the stage is lowered, the weight of the stage causes the latches to spring open, and the door can be opened. The door detect switch provides an additional indication that the door is in the closed position. Prior 3-D printing systems use solenoids, mechanical switches, and the like to insure that the door is latched closed. The present configuration provides the advantage of stage itself, at its lower-most position, serving to physically unlatch the door. It is important that the door remain closed during operation due to vapors from the extruded filament, and the present configuration provides further safety that the door will not be inadvertently opened during operation.

In representative FIGS. 11B and 11C, for clarity in seeing both positions, latch 1102 is shown in an open position, and latch 1104 is shown in a closed position. In operation the latches 1102 and 1104 will both be either open or closed at the same time depending upon the relative position of the stage.

Figure 12:
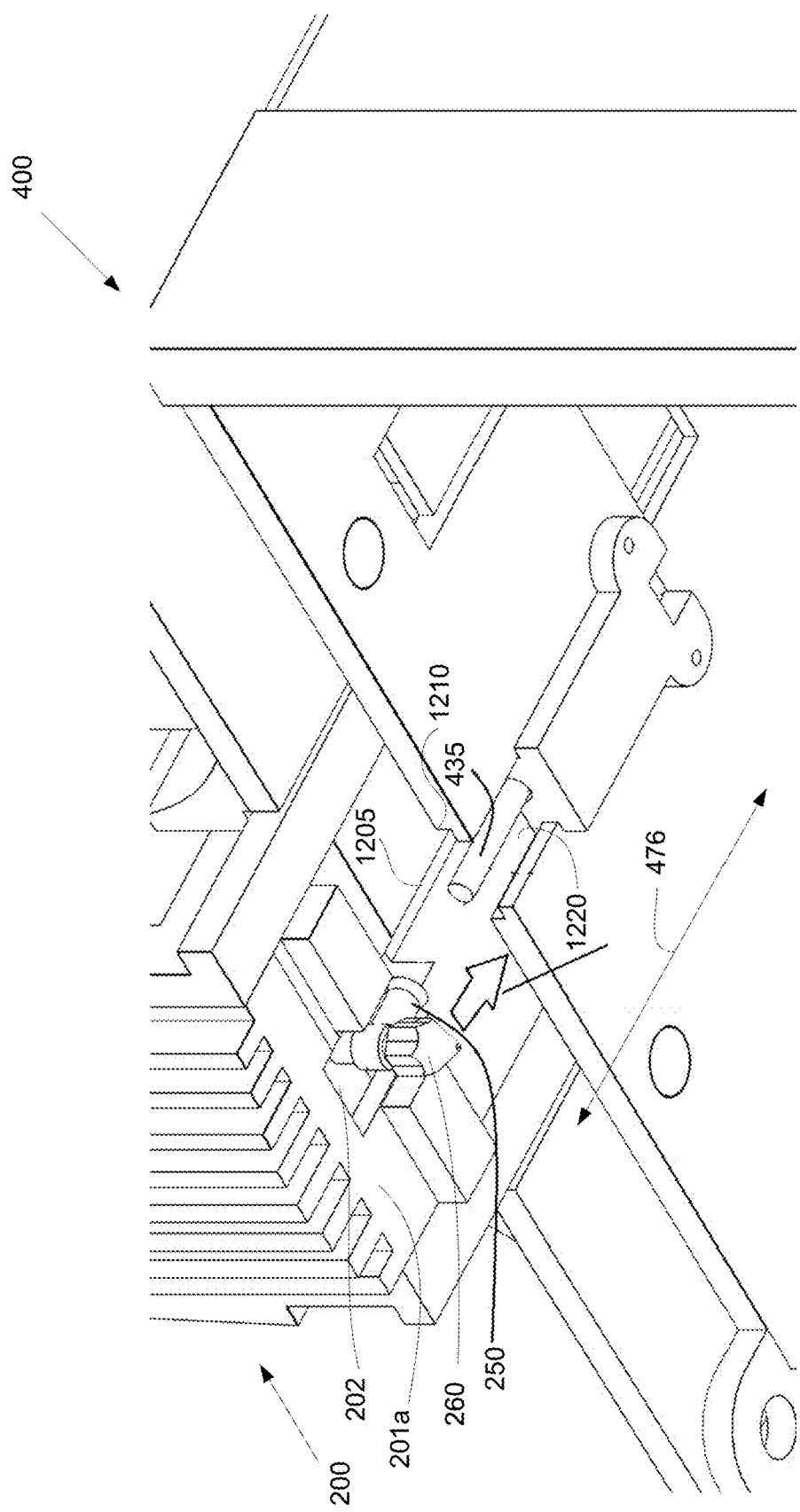
FIG. 12 is perspective view of a heater receiving element and a heating element according to a particular embodiment of the present invention.

Referring next to FIGS. 12 and 13, an enlarged perspective view of the engagement between the heating element of the printer and the heater receiving element of the cartridge is shown. FIG. 12 illustrates a particular implementation of the cartridge 200 and printer 400 in FIG. 9, in which the heater receiving element 250 of the cartridge and the heating element 435 of the printer 400 are close to one another, but have not yet fully engaged one another.

As seen in FIG. 12, the bottom surface 201a of the cartridge, which rests on a top surface of the printer, includes an aperture 202. A portion of the nozzle 260 and/or nozzle assembly 225 extends out of the aperture and is exposed outside the housing 205 of the cartridge 200. In the illustrated embodiment, much of the tubing is almost entirely encased in the housing, but enough of the nozzle assembly 225 extends through the aperture 202 such that the nozzle 260 and the heater receiving element 250 are exposed outside of the cartridge housing.

The bottom surface 201a of the cartridge 200 includes a rail or ridge 1205 that is shaped to engage a slot 1210 at the edge of a top surface of the printer 408. The ridge, which extends along an R axis 477, is arranged to slide along the slot. That is, the cartridge is arranged to slide in a direction that is parallel to the top surface of the printer 408. As the cartridge is slid in this manner, the heating element 435 of the printer 400 simultaneously moves further into the heater receiving element 250 of the cartridge 200. That is, the heating element enters and extends into the opening in the heater receiving element.

The heating element 435 is in the shape of a cylinder or bar that is arranged to fit into the opening of the heater receiving element 250. In the illustrated embodiment, there is a space or opening 1220 in the housing of the printer 400 where the heating element 435 is positioned. This space helps prevent the heating element from heating and damaging parts of the housing or other components of the printer. FIG. 13 illustrates the heating element 435 and heater receiving element 250 of FIG. 12 when they are fully engaged with one another. That is, in FIG. 13, the heating element 435 of the printer 400 is inserted into the heater receiving element 250 of the cartridge 200.

Figure 14:
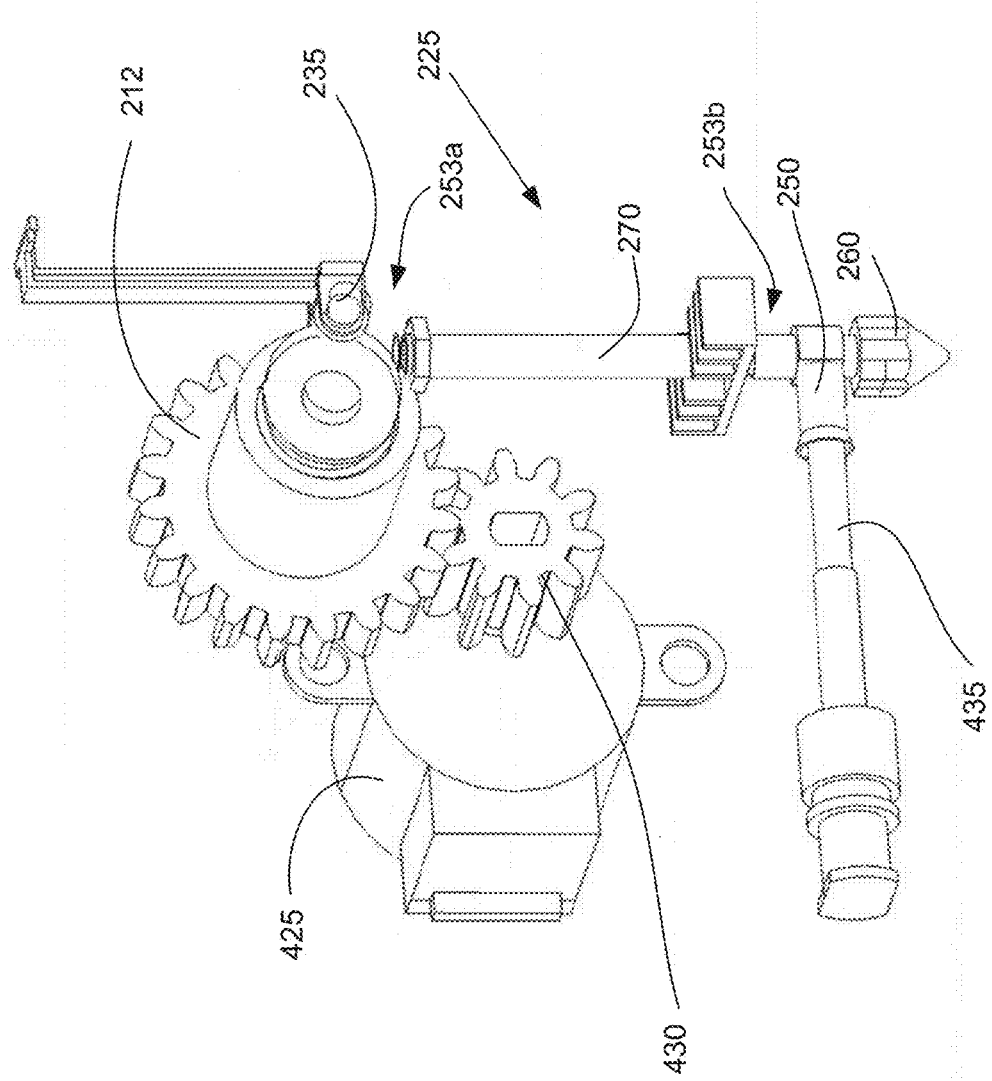
FIG. 14 is an illustration of components in the printer and the cartridge according to a particular embodiment of the present invention.

Referring next to FIG. 14, a diagram of selected components of a cartridge 200 and a printer 400 according to a particular embodiment are described. The components are illustrated at a point in time in which the cartridge and the printer are fully engaged with one another. They may be, for example, components of the cartridge 200 and printer 400 of FIGS. 8 and 9.

In the illustrated embodiment, the printer includes a feed pinion motor 425 and a feed pinion 430. The feed pinion motor drives the feed pinion, causing the feed pinion to rotate. In this example, the feed pinion is a toothed gear that engages the toothed gear of a feed gear 212 in the cartridge 200. At one end of the feed gear is a toothed gear. The opposing end is engaged with deposition material/filament (not shown) that is inserted into the nozzle assembly 225. The rotation of the printer feed pinion 430 causes the interlocked cartridge feed gear 212 to rotate as well, which helps push the deposition material/filament into and through the nozzle assembly 225. In the illustrated embodiment, the area of engagement where the feed gear structure and a pressure roller engage the deposition material/filament is adjacent to or very close to the opening in the nozzle assembly 225 where the deposition material/filament enters.

The deposition material/filament enters one end 253a of a tube 270 of the nozzle assembly 225, which is covered in a thermally insulating material 275. It extends through a space within the tube to an opposing end 253b of the tube, which is connected with a nozzle 260.

The heating element 435 of the printer 400 extends through an opening in a heater receiving element 250 of the nozzle assembly 225. In the illustrated embodiment, the heater receiving element forms a socket or tube that the heater receiving element is inserted into. When the heating element is fully inserted into the heater receiving element, it is close to or adjacent to a space in the tube that is close to the nozzle (e.g., at end 253b of the tube.) Alternatively, the heater receiving element 250 may be coupled to the nozzle itself. When the heating element 435 is heated, the heat is transmitted through the tube or nozzle, which causes the deposition material/filament within to change from a solid state to a plastic state. When the printer is printing, the deposition material is then dispensed from the nozzle into the compartment 410 of the printer 400 and onto the platform 445. According to an embodiment, the heating element 435 is spring-loaded with force to thermally couple with heater receiving element 250.

In operation, the described 3-D printer embodiment uses a nozzle 260 that has a relatively low mass, and a heating element 435 that is relatively low power. For instance, one low cost and effective heating element is a 5V USB element that is often used in USB soldering irons. A low mass nozzle provides an extrusion device that can be heated and cooled more quickly relative to higher mass nozzle configurations that often include a heater block. The lower power heating element provides the ability to quickly and effectively heat the extrusion material, while only using a few watts (i.e., 6-8 W) of power.

The configuration described herein therefore provides a 3-D printer that can power and drive all of its internal systems via a single 5V (i.e., USB connection) interface. The lightweight motors that drive the self-contained stage, as described in FIGS. 7A-7D can operate in conjunction with the heating element and filament feed gear motor without causing power overloading issues. One way of achieving this is to use a power management technique that time splices the power usage across different devices. For instance, the heating element can be powered off while the motors are moving, and vice versa. If power-on and power-off sequences are performed in a strategic manner, the platform movements and extrusion flow will still be smooth, even though the associated devices are being power cycled.

The various embodiments described herein have generally described a heating element and nozzle whereby a filament material is heating to a flowing state and extruded onto the platform to form each successive 2-D layer of a 3-D object. The current printer configuration can operate without a heated nozzle. Certain materials might already be of a consistency that can flow if enough pressure or extraction force is applied to the respective holding container (i.e., tube, bag, cup, receptacle or the like). Such materials can include, for example, chocolate, candies, frosting, decorative gels, and so forth. Gels and frostings can be used to decorate a cake or cookies. The cartridge or spool of the shown configurations could be replaced with a device that uses the extruder motor to apply pressure to a tube of material. The nozzle of the tube itself can used as the final delivery means. The material would then be extruded and applied to the platform without heat. FIGS. 3B and 3C further illustrate an alternative configuration where the top plate is replaced or modified to accommodate a liquid or paste containing pouch, and a motor/pump combination (peristaltic or otherwise) is used to extrude the liquid or paste onto the 3-D object platform.

Figure 15:
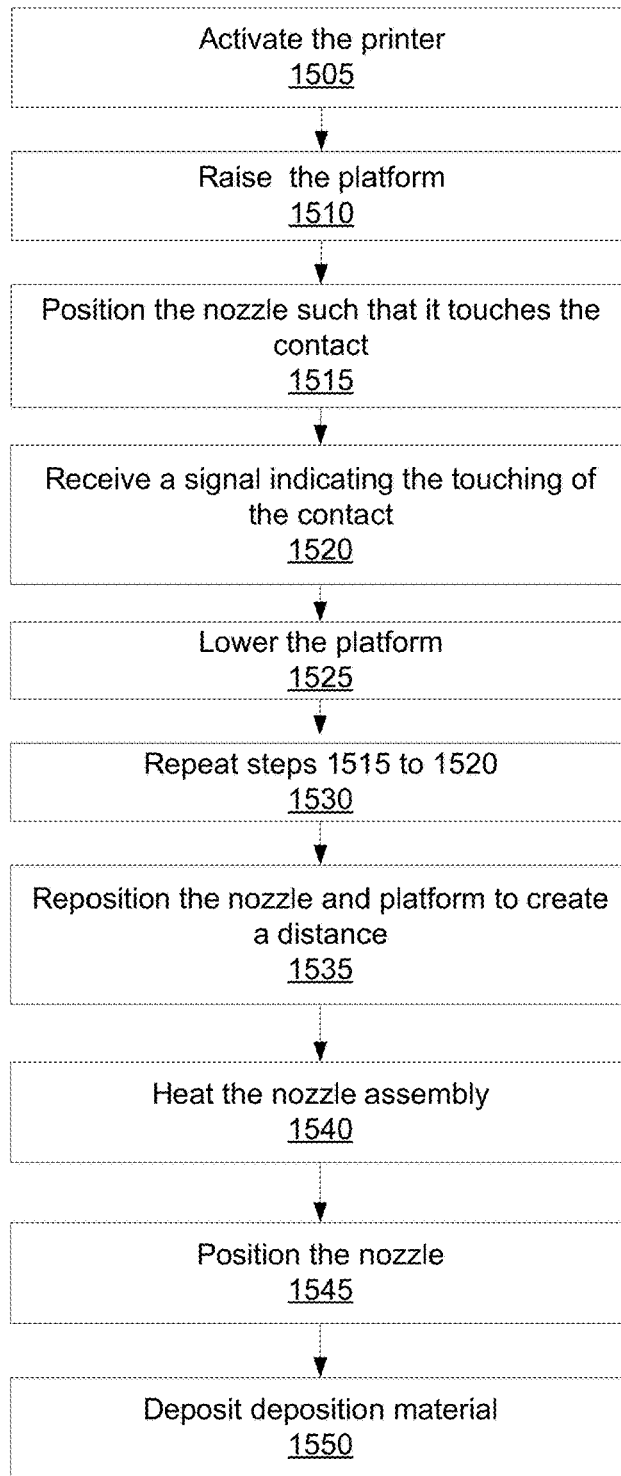
FIG. 15 is flow diagram illustrating a method for preparing a nozzle and a platform for printing according to a particular embodiment of the present invention.

Referring next to FIGS. 15 and 16, a method 1500 of using a three dimensional printer according to a particular embodiment of the present invention will be described. FIG. 15 is a flow diagram illustrating the method 1500. FIG. 16 illustrates a cross-sectional view of various steps in the method, which involve a nozzle 260 and a platform 445. In this example, it is assumed that the method 1500 is performed using the printer 400 illustrated in FIG. 4A and the cartridge 200 illustrated in FIG. 2A. The cartridge 200 and the printer 400 are fully engaged with one another e.g., as illustrated in FIGS. 8 and 9. However, it should be appreciated that the method 1500 may be performed using any suitable printer, cartridge, nozzle assembly and platform.

Initially, at step 1505, a user activates a three-dimensional printer 400. The user may, for example, touch or trigger a power switch on the printer. In other embodiments, the user may activate the printer remotely e.g., using a wireless connection, a smart phone and/or another portable device.

Figure 16A:
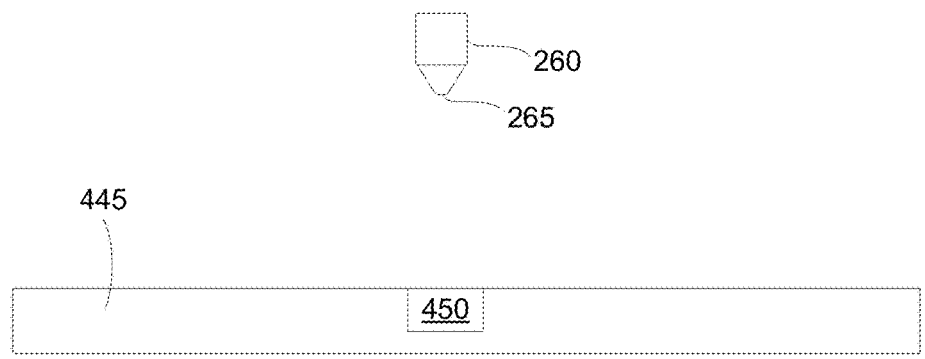
FIGS. 16A-E are side views of some of the operations described in FIG. 15.

In various embodiments, as shown in FIG. 16A, when the printer 400 has just been activated, the platform 445 and the nozzle 260 are separated from one another. At step 1510, the printer 400 raises the platform 445 to bring it in closer proximity to the nozzle 260. This raising of the platform may be performed as previously described e.g., in connection with FIGS. 4A, 4B and 6.

Figure 16B:
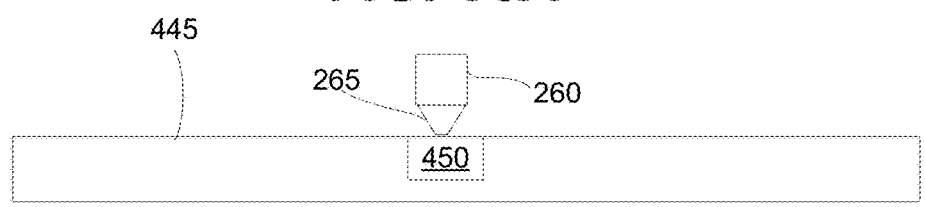

At step 1515, the printer 400 positions the nozzle 260 such that the tapered nozzle tip 265 touches the contact 450 on the platform 445. An example of this is shown in FIG. 16B, in which the tip 265 of the nozzle 260 applies pressure to the contact 450. It should be noted that the contact 450 may have any suitable design or architecture (e.g. as described in connection with FIG. 4A.) For example, the contact 450 may be an electrical contact, a sensor, or a button. This step may involve further raising the platform so that a (stationary) nozzle touches the contact 450 on the platform 445.

As discussed in connection with FIGS. 4A and 4B, when the nozzle 260 and nozzle tip 265 touches and/or applies pressure to the contact 450, the contact transmits a signal indicating that this has happened. At step 1520, a control system 420 of the printer 400 receives this signal.

In various embodiments, the information indicated by the signal may be helpful for several reasons. For one, the control system 420 is informed that the nozzle has reached the top surface of the platform. Based on this information, the control system 420 can determine a suitable distance between the nozzle and the platform surface prior to printing. This is important because in various implementations this distance must be precisely determined. If the nozzle is too far from the surface of the platform during printing, the deposition material may fail to adhere to the surface of the platform, thereby causing a printing error. On the other hand, if the distance between the nozzle and the platform is too small, there is a risk that the deposition material dispensed on the platform will be squeezed and/or that the nozzle will drive into the surface of the platform.

Various existing printer designs have systems for determining a proper distance between the nozzle and the platform. For example, some systems use a sensor/detection mechanism that is outside of the platform. When the platform and/or the nozzle are repositioned such that they are touching one another, the sensor/detection mechanism is supposed to trigger. However, since the sensor/detection mechanism is outside of the platform itself, there is a possibility that it will not properly reflect the actual position of the nozzle relative to the platform. Put another way, to truly confirm the relative positions of the nozzle in the platform, in various applications it is desirable to use a sensor/contact that is actually in the same location as the area of interest i.e., where the nozzle touches the platform.

Additionally, as previously discussed, in some embodiments, the contact is positioned in the center of the top surface of the platform. For example, in some polar coordinate printer designs, the top surface of the platform that is arranged to receive the dispensed deposition material is in the shape of a circle, and the contact is in the exact center of the circle. When the nozzle is determined to have touched the contact, the control system is informed that the nozzle is also in the exact center of the platform. This is particularly useful information for polar coordinate printer designs, in which printer operations are based on polar coordinates i.e., in terms of radius or distance from a center point.

Optionally, the printer 400 may redo some of the above steps in order to more precisely determine the position of the nozzle 260. For example, in some embodiments, since the platform 445 begins at the bottom of the compartment of the printer, the printer raises it (e.g., step 1510) fairly quickly until the nozzle touches the contact (e.g., step 1515). This helps to save time during the startup process. However, it may be desirable to obtain a more precise determination of the relative positions of the nozzle and the platform. Accordingly, at step 1525, the printer lowers the platform, thereby creating a distance between the nozzle and the platform. Then, at step 1530, the printer causes the nozzle to touch the platform, which triggers the transmission of a signal indicating that action i.e., the printer repeats steps 1515 and 1520. When causing the nozzle to touch the platform a second time, the printer may raise the platform more slowly than in step 1510, so that it can more precisely determine the current location of the nozzle.

Figure 16C:
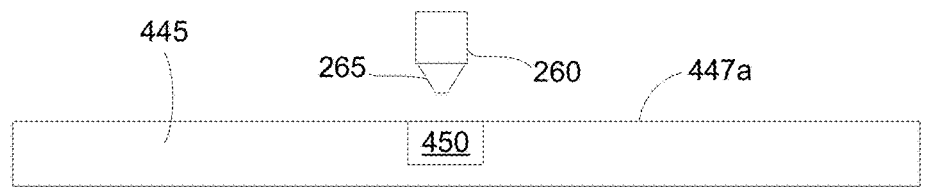

After the control system 420 of the printer 400 determines, based on the signal, that the nozzle has touched the contact 450 on the platform, the printer 400 repositions the nozzle 260 and the platform 445 to create a suitable distance between the nozzle and the platform (step 1535 and FIG. 16C). For instance, if A represents a predetermined distance between the top surface 447a of the platform 445 and the nozzle 260 that is suitable for printing, in various implementations, the printer lowers the platform to create distance of A+B between the nozzle and the platform, where B represents a predetermined additional distance. The repositioning of the nozzle and the platform is based on the signal received in step 1520 i.e., they are based on the assumption that the signal helps accurately represent the location of the nozzle relative to the platform at that time.

Figure 16D:
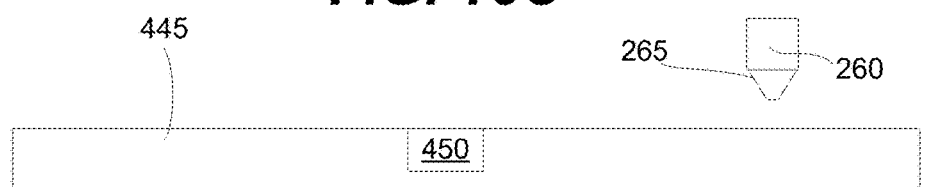

Additionally, the printer may laterally reposition the nozzle relative to the platform, as shown in FIG. 16D. For example, if printing is to be performed in a polar coordinate printer, it is common for the printing process to start closer to the edge of the circular surface of the platform, rather than at the center of the platform. Thus, during this step, the printer may laterally move the platform so that the nozzle is in an appropriate position. As previously discussed, this may involve moving a slider 460 that underlies the platform 445. This causes the platform to move laterally (e.g., along an R axis 477) and positions the nozzle at a location that is closer to the edge of the top surface of the platform than the center.

At step 1540, the printer 400 heats the nozzle assembly 225. In various designs, it is not desirable to begin this heating process when the nozzle is too close to the platform, which is the reason why step 1535 is performed. As previously discussed, this process may involve heating the heating element 435 of the printer 400, which is inserted into the heater receiving element 250 of the cartridge 200. In various implementations, the printer continues to heat the heating element until a desired temperature has been reached, which may vary depending on the type of deposition material that is used. The control system 420 of the printer may determine the temperature at the heating element based on data received from a temperature sensor that is inside or coupled with the heating element.

After a suitable temperature has been reached and/or the heating process has been completed, at step 1545, the printer 400 repositions the nozzle 260 in preparation for the dispensing of deposition material. To use the above example, the printer may then raise the platform a distance B, such that there is only a distance A between the nozzle and the top surface of the platform.

Figure 16E:
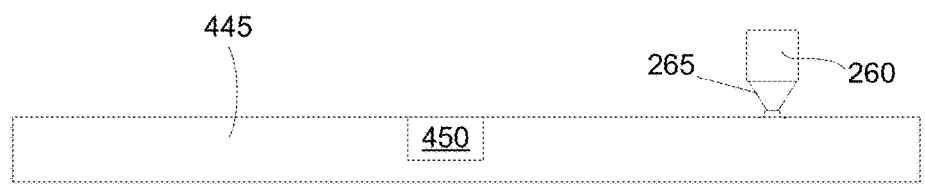

At step 1550 and as shown in FIG. 16E, the printer begins to dispense deposition material through the nozzle 260 over the platform 445. During the printing process, the printer may laterally move the platform and/or rotate the platform so that the deposition material is dispensed in an appropriate pattern to form the desired object. In some printer designs, the printer may also/instead move the nozzle during the printing process.

The above method involves multiple, specific steps that are performed in a particular order. However, it should be appreciated that in some implementations of the method, the steps are reordered or modified. Additionally, one or more steps may be added or removed.

Additionally, the above method assumes a printer design in which the platform is capable of movement, but the nozzle is not capable of movement. However, this is not a requirement. That is, in some implementations, to bring the nozzle and platform closer together, the nozzle can be moved, rather than just the platform. Put another way, the use of the contact as described above is not limited to polar coordinate printers or printers that are only capable of platform movement, but rather to any suitable printer design (e.g., Cartesian printers, etc.)

Figure 17A:
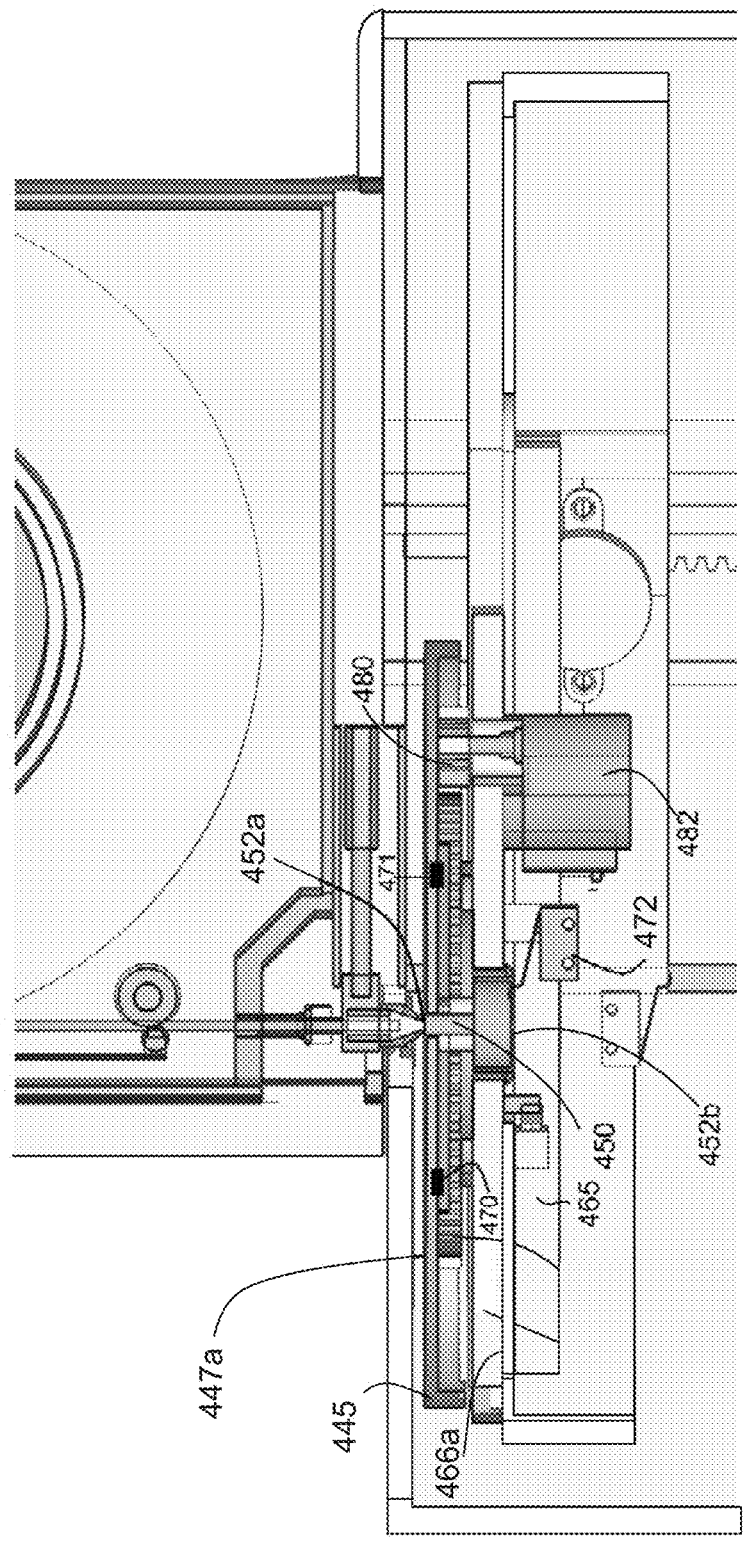
FIG. 17A is a side view of a cartridge, a nozzle assembly, a contact, a platform and a 3-D printer according to a particular embodiment of the present invention.

Referring next to FIG. 17A, a diagram of a cartridge and a three-dimensional printer according to a particular embodiment of the present invention will be described. This diagram illustrates an operation (e.g., step 1515 of FIG. 15) in which the printer causes the tip of the nozzle to touch a contact on/at the platform. The illustrated cartridge and three-dimensional printer may be, for example, the cartridge 200 of FIG. 2A and the printer 400 of FIG. 4A.

In this particular embodiment, the contact 450 is a mechanical button. The top surface 452a of the button is substantially coplanar with the top surface 447a of the platform 445. In this example, the top surface of the button is also positioned at the center of the (circular) top surface of the platform. The button extends through apertures in the platform 445, the platform turning mechanism 455 and the slider 460. The bottom surface 452b of the button, which opposes the top surface of the button, is positioned on the top surface of the table 466a. When the nozzle comes in contact with the button, a Z-axis nozzle switch 472 is toggled.

The table 465 may include one or more motors that help adjust the position of the platform. In this particular embodiment, a platform turning motor 482 is positioned within the table. The platform turning motor is coupled with a platform turning gear 480 that is positioned over the top surface of the table and underneath a bottom surface of the platform 445. The platform turning gear 480 is physically engaged with the platform turning mechanism 455. Magnet pairs 470 and 471 are shown in mated contact with each other for holding the plate 445 in position. Similar to the description for FIGS. 7B and 7C above, the first part of the magnet pair will be located on the lower surface of the plate 445, and the second part of the magnet pair will be located on the upper surface of the platform turning mechanism 455. When the magnet pairs 470, 471 are in contact with each other, the plate 445 is in a seated position.

Figure 17B:
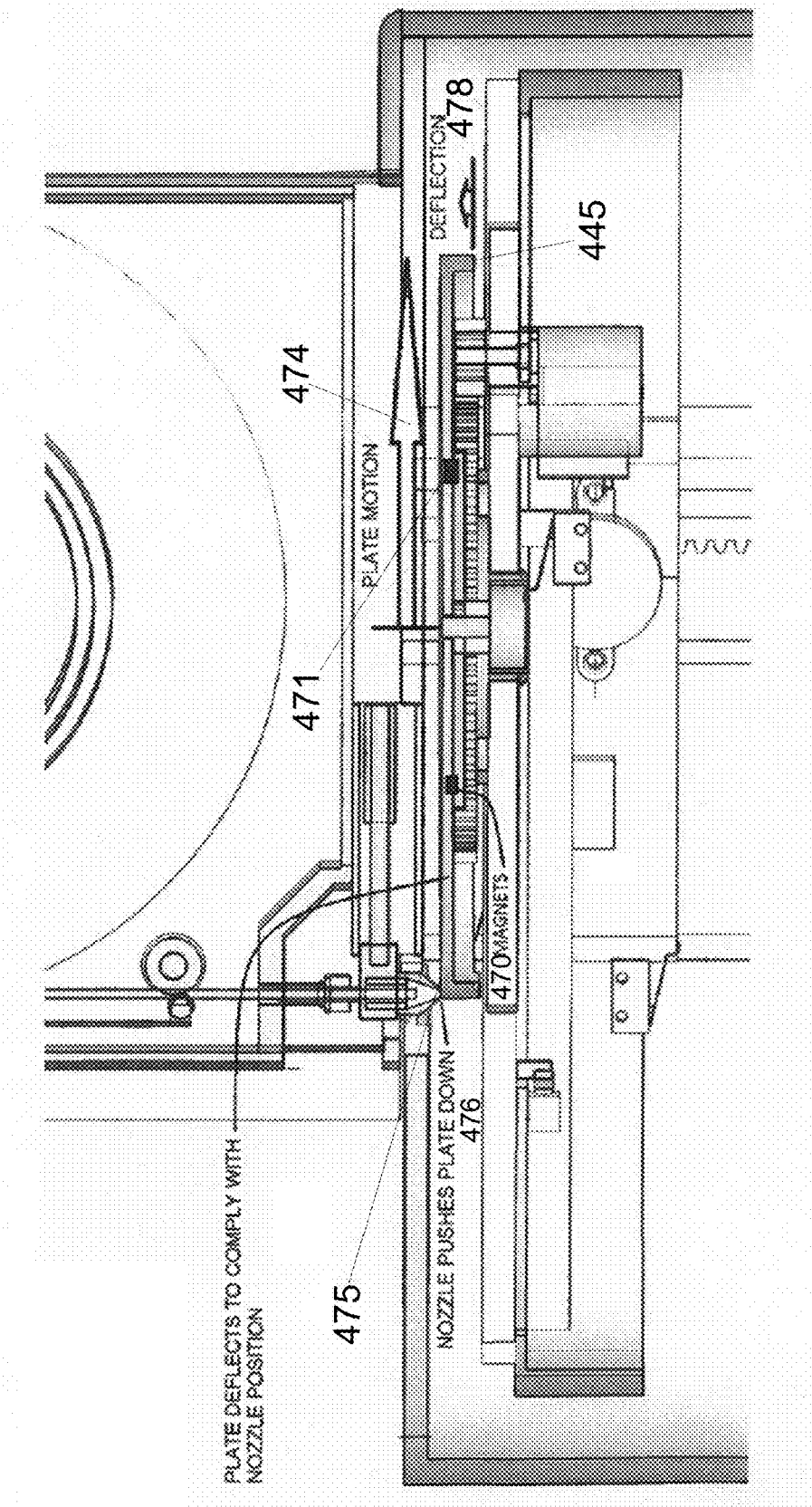
FIG. 17B is a side view of a platform plate on a 3-D printer that has been laterally moved and is allowed to deflect due to the use of platform plate mounting magnets.

Referring next to FIG. 17B, the plate 445 is shown transitioned to the right along a representative plate motion vector 474. The terms plate and platform are generally meant to be interchangeable when describing the present configuration. The plate 445 is often not completely flat due to fabrication difficulties or changes to the plate with use. As a result, the outer rim 475 of the plate, for instance, can be slightly higher than the center of the plate. In operation, as the plate 445 transitions to the right (along vector 474), the higher surface points of the plate will then come into contact with the nozzle. This can cause the system to 'crash', particularly if the nozzle digs into the upper surface of the plate 445 in a destructive way. Under such crash or collision conditions, both the nozzle and the plate can be damaged. The shown configuration provides a solution to the collision condition by allowing the magnet pair that is opposite the collision to release and thereby allow the plate 445 to tilt or deflect slightly. In the example shown, the collision occurs at the outer rim 475 of the plate 445. The nozzle 476 pushes the plate downward at this point of contact (or collision). The magnet 471 on the opposite side of the plate 445 releases to allow the plate to deflect upward, as shown by representative vector 478. The magnets 470, 471 will therefore be configured to release if enough pressure (by the nozzle or otherwise) is applied at an opposite edge of the plate 445.

In operation, the relatively higher surface points on the plate 445 will not adversely affect the end formation of most 3-D printed objects. In practice, the first layer or two of most 3-D printed objects can be uneven and the resulting 3-D printed object will still be viable and usable. Hence, rather than spend considerable resources trying to manufacture a completely flat plate 445, the present configuration provides a solution that allows for slight defects in the plate, but without completely crashing or damaging the overall system if the nozzle comes into contact with the plate.

The upper surface of the plate 445 can also be purposefully designed to curve upward in a concave or upwardly sloping manner. This is advantageous because it allows the nozzle contact button, or trigger, to be placed at the known lowest point on the plate to establish a center of origin for the 3-D printer movement. This helps to insure that the center of the plate will be at the lowest point for registration of the nozzle via the button. Thereafter, as the platform is moved around, the nozzle may come into contact with a higher point away from the center, but any adverse (or damaging) pressure caused by the contact can be relieved via the magnets on the plate releasing and allowing the plate to deflect.

Figure 18:
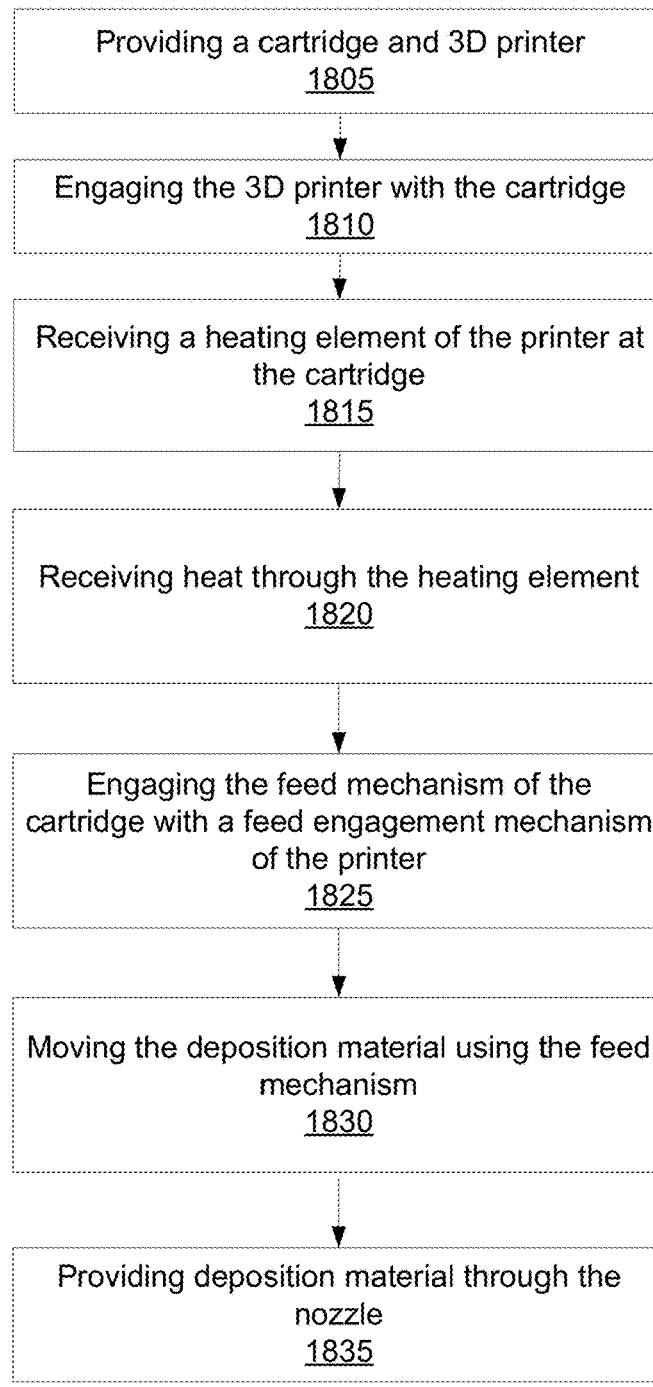
FIG. 18 is a flow diagram illustrating a method for using a cartridge according to a particular embodiment of the present invention.

Referring next to FIG. 18, a method 1800 for using a cartridge according to a particular embodiment of the present invention will be described. Initially, at step 1805, a cartridge and a three-dimensional printer are provided. In the illustrated embodiment, the cartridge and printer are the cartridge 200 and printer 400 of FIGS. 2A and 4A, respectively, although any cartridge or printer described herein may be used.

At step 1810, the cartridge 200 engages the printer 400. In some embodiments, for example, the cartridge is inserted into or locked into the printer. Various techniques for engaging the cartridge with the printer are described, for example, in connection with FIGS. 8 and 9.

At step 1815, the cartridge 200 receives a heating element 435 of the printer 400. For instance, the cartridge 200 may have heater receiving element 250 e.g., a tube that is positioned close to or adjacent to a nozzle of the cartridge 200. The heating element of the printer can be inserted into an opening in the tube. The engagement between the heating element of the printer and the heater receiving element of the cartridge may be performed as described in connection with FIGS. 9, 12, 13 and 14.

At step 1820, the cartridge 200 receives heat from the heating element 435. In various embodiments, heat is transmitted from the heating element into a nozzle assembly 225 of the cartridge 200 via the heater receiving element 250 of the cartridge 200. This helps to melt deposition material/filament inside of the nozzle assembly so that it can be dispensed over the platform to form an object.

At step 1825, the cartridge 200 receives a feed pinion 425 of the printer 400. The feed pinion of the printer engages a feed mechanism 233 in the cartridge 200. The feed mechanism may include a feed gear that, when engaged and driven by the feed pinion, helps move the filament/deposition material through the cartridge and the nozzle assembly. This step may be performed using any of the techniques and structures described herein e.g., as described in connection with FIGS. 9, 10 and 11.

At step 1830, the feed mechanism 233 in the cartridge 200 helps move deposition material through the cartridge 200 and the nozzle assembly 225. In various embodiments, as described above, the feed gear 212 of the cartridge 200 is physically engaged with a portion of the filament/deposition material. When the feed gear is driven by the feed pinion of the printer, the feed gear rotates, causing the deposition material/filament to move towards the nozzle 260. In designs involving a spool of filament that is rotatably mounted within the cartridge, as the feed gear is rotated, more filament is uncoiled from the spool and moved through the nozzle assembly 225.

At step 1835, the cartridge dispenses deposition material 210 through the nozzle 260. That is, the deposition material is dispensed in a plastic/glass state from the nozzle onto the platform 445 of the printer 400.

Figure 19:
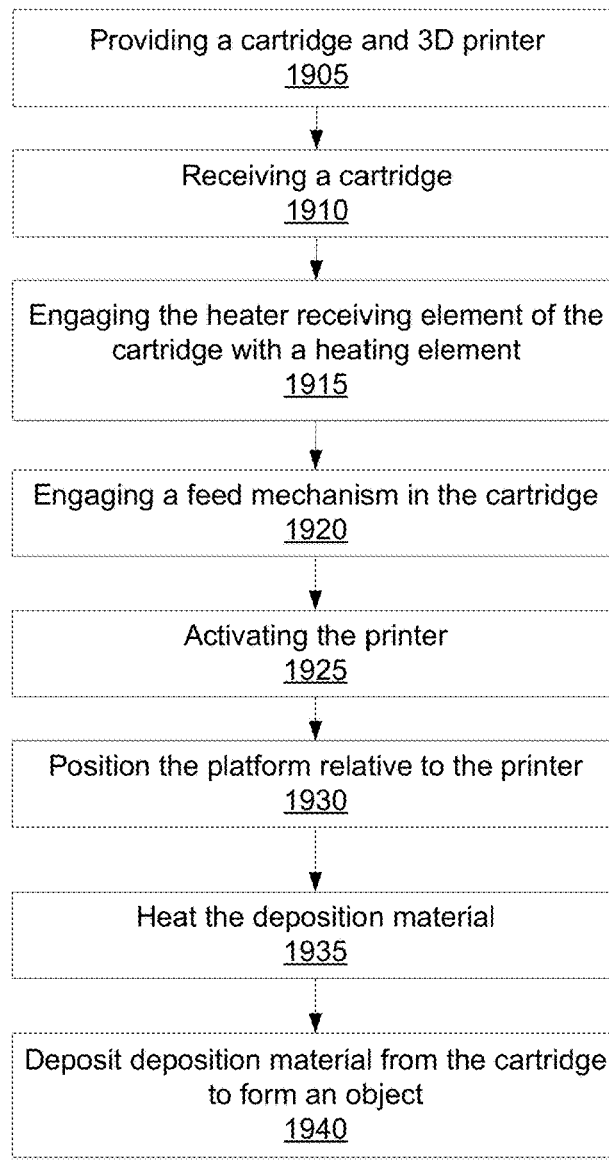
FIG. 19 is a flow diagram illustrating a method for using a three-dimensional printer according to a particular embodiment of the present invention.

Referring next to FIG. 19, a method 1900 for using a three-dimensional printer according to a particular embodiment of the present invention will be described. This method 1900 may be performed using any of the cartridges or printers described herein (e.g., the cartridge 200 and printer 400 of FIGS. 2 and 4, respectively.)

At step 1905, a cartridge 200 and a three-dimensional printer 400 are provided. At step 1910, the printer 400 receives a cartridge 200. For example, the printer 400 may include a cartridge interface 415. The cartridge interface may include any suitable feature that is used to help secure the cartridge to the printer e.g., a rail, a slot, a latch, etc. The user then attaches the cartridge with the printer using the cartridge interface e.g., as described in connection with FIGS. 9, 10 and 11.

At step 1915, the printer 400 engages a heater receiving element 250 of the cartridge 200 with the heating element 435. In various embodiments, the printer may extend its heating element into an opening in the heater receiving element e.g., as described in connection with FIGS. 8-14. Once the heating element 435 is inserted fully into the heater receiving element 250, it is positioned near to or adjacent to deposition material within the nozzle assembly 225 of the cartridge 200, thereby allowing it to heat the deposition material.

At step 1920, the printer 400 engages a feed mechanism 233 in the cartridge 200. In various embodiments, a feed pinion 425 in the printer 400 engages a feed gear 212 in the cartridge 200. A motor 430 in the printer drives the feed pinion 425, causing it to rotate. The rotation of the feed pinion is arranged to rotate the feed gear, which in turn helps move the deposition material/filament through the nozzle assembly, as previously described.

At step 1925, the printer 400 is activated e.g., using a remote device, wireless connection or a power switch on the printer. At step 1930, the printer positions the platform relative to the nozzle. During this step, any of the steps of method 1500 of FIG. 15 may be performed e.g., positioning/moving the platform, causing a contact to be touched, receiving a signal, etc.

At step 1935, the printer 400 heats the deposition material in the cartridge 200. As previously described, in some embodiments, the heating element 435 of the printer 400 may be a metallic tube that includes a coil/wire. The printer 400 runs an electrical current through the coil/wire, which causes the temperature of the heating element to rise.

At step 1940, the printer 400 uses the cartridge 200 to dispense deposition material over the platform 445. That is, the printer 400 uses its engagement with the feed mechanism 233 in the cartridge 200 to move deposition material through the nozzle assembly 225. The printer heats a portion of the deposition material that is near to or adjacent to the nozzle. Deposition material is then dispensed from the nozzle. Based on data received from a connected computing device 115, the printer 400 continuously repositions the platform relative to the nozzle so that the desired object is formed from the dispensed deposition material.

The above application includes various methods, each with multiple operations. It should be noted that in some implementations, one or more of these operations are modified, reordered or removed. In other implementations, one or more operations are added. Thus, it should be appreciated that the methods may be adjusted as needed for various applications.

The application sometimes refers to structures that have multiple components. It should be noted, however, that not all implementations of the structure need to have all of the described components. Some implementations may have only one or some of the components, or may have fewer or more components. For example, in this application, there are references to a nozzle assembly. One description of a nozzle assembly indicates that a nozzle assembly includes at least a tube, heat sink, heater receiving element, a thermally insulating layer and a nozzle. However, in some implementations of the nozzle assembly, the nozzle assembly includes none of these elements except for the nozzle. In other implementations, one, some, all or more than these components are included in the nozzle assembly.

This application sometimes refers to Cartesian and polar coordinate printers. A Cartesian printer is a printer that is based on a Cartesian coordinate system. In various implementations, this means that the printer is controlled at least in part based on Cartesian coordinates e.g., X, Y and Z coordinates. For example, some printer designs involve identifying locations on the surface of a printing platform in terms of X and Y coordinates. The height or elevation of a printing platform and/or a nozzle may be defined using a Z coordinate. The printer then generates or obtains instructions that indicate how the platform and/or nozzle should be moved during the printing process in order to form a desired object. The printer moves these components based on the instructions. In a Cartesian printer, these movements and instructions may involve the use of the X, Y and Z coordinates.

A polar coordinate printer is a printer that is based on a polar coordinate system. In various implementations, this means that the printer is controlled based on polar coordinates e.g., an amount of rotation and a radius or distance from a center/origin point. For example, in some printer designs, locations on the surface of the platform are understood or represented in terms of distance from a single (central) point (e.g., radius) and an angle. When the printer generates or obtains instructions that indicate how the platform and/or nozzle should be moved during a printing process, the instructions are based on or use polar coordinates.

Any of the methods or operations described herein for any device (e.g., the printer or cartridge) may be stored in the form of executable computer code in a non-transitory, computer readable medium. The computer code, when executed by a processor in the device, will cause the device to perform the operations.

Although only a few embodiments of the invention have been described in detail, it should be appreciated that the invention may be implemented in many other forms without departing from the spirit or scope of the invention. For example, the drawings and specification of this application described a variety of different printer and cartridge designs. It should be appreciated that any component described in one figure may include any feature of the corresponding component in another figure. Therefore, the present embodiments should be considered as illustrative and not restrictive and the invention is not limited to the details given herein, but may be modified within the scope and equivalents of the appended claims.

What is claimed is:

1. A 3-D printer comprising:
a vertically movable stage that is pivotally supported in a cantilevered manner relative to a pivot axis; and
a movable platform carried by the stage, the movable platform having a workpiece support surface for supporting a workpiece, the workpiece support surface defining a workpiece support plane, the platform being moveable relative to the stage to move the workpiece support surface in two degrees of freedom within the workpiece support plane, wherein movement in a first degree of freedom of the two degrees of freedom is linear movement perpendicular to the pivot axis; and
wherein the stage is supported in the cantilevered manner with a cantilever bias in the same direction regardless of a position of the movable platform relative to the stage; and
wherein a deposition area in which a material emitter deposits material to form at least part of the workpiece is laterally offset from a stage support such that the deposition area overlies a cantilevered portion of the stage during all printing of a 3-D object.

2. A 3-D printer as recited in claim 1 wherein a position of the material emitter is fixed during printing of the 3-D object.

3. A 3-D printer as recited in claim 1 wherein the stage is movable substantially vertically to facilitate positioning the platform vertically relative to the material emitter, and wherein during printing of the 3-D object, adjustments of a height of the stage facilitate printing of different layers of the 3-D object.

4. A 3-D printer as recited in claim 1 wherein during a printing of each layer, the workpiece support surface stays the same consistent distance relative to the material emitter when the movable platform is moved within the two degrees of freedom to facilitate the printing of such layer.

5. A 3-D printer as recited in claim 1 further comprising a cartridge interface adapted to receive a cartridge that includes the material emitter and a supply of printing material.

6. A 3-D printer as recited in claim 5 wherein the cartridge interface is configured to hold the cartridge in a fixed position during printing to thereby hold the material emitter in a fixed position during printing.

7. A 3-D printer as recited in claim 5 further comprising a heater configured to heat a filament carried by the cartridge that constitutes the supply of printing material, wherein the heater is received by a heater receiving element on the cartridge.

8. A 3-D printer as recited in claim 1 wherein the platform includes a contact at a reference location on the platform, wherein the contact is arranged to generate a signal when the contact is touched by the material emitter, wherein the signal may be used to help determine a location of the material emitter relative to the platform.

9. A 3-D printer as recited in claim 1 wherein the platform is rotatable within the workpiece support plane about a point of origin, the 3-D printer further comprising a slider that carries the platform, the slider being moveable in a linear direction, wherein linear movement of the slider causes a corresponding linear movement of the platform, whereby the 3-D printer is a polar coordinate printer.

10. A 3-D printer as recited in claim 9 further comprising a platform motion mechanism configured to rotate the platform about the origin, the platform motion mechanism being carried by the slider.

11. A 3-D printer as recited in claim 1 further comprising first and second sliders, wherein:
    the first slider carries the platform and is movable in a first linear direction and linear movement of the first slider in the first linear direction causes a corresponding linear movement of the platform within the workpiece support plane, and
    the second slider carries the first slider and is movable in a second linear direction that is substantially perpendicular to the first linear direction and linear movement of the second slider in the second linear direction causes a corresponding linear movement of the platform within the workpiece support plane; and
    the second slider is carried by the stage; and
    whereby the 3-D printer is a Cartesian coordinate printer.

12. A 3-D printer as recited in claim 1 further comprising a material emitter support that supports the material emitter.

13. A 3-D printer as recited in claim 12 wherein at least one of the material emitter and the stage is moveable substantially vertically relative to the other of the material emitter and the stage to facilitate height adjustment during printing of the workpiece to facilitate the printing of different layers of the 3-D object.

14. A 3-D printer as recited in claim 1 further comprising a housing that encloses the stage and platform.

15. A 3-D printer as recited in claim 1 wherein the deposition material is a form of plastic.

16. A 3-D printer as recited in claim 1 wherein the deposition material is an edible food material.

17. A 3-D printer comprising:
    a cartridge interface adapted to receive a cartridge that includes a material emitter and a supply of printing material, wherein the cartridge interface is configured to hold the cartridge in a manner that maintains the material emitter in a fixed position during printing of a layer of a 3-D object;
    a movable platform, the platform having a workpiece support surface for supporting a workpiece, the workpiece support surface defining a workpiece support plane, the platform being moveable to move the workpiece support surface in two degrees of freedom within the workpiece support plane;
    a stage that carries the platform, the stage being movable substantially vertically to facilitate positioning the platform vertically relative to the material emitter, and wherein during printing of the 3-D object, adjustments of a height of the stage facilitate printing of different layers of the 3-D object, wherein the stage is pivotally supported in a cantilevered manner relative to a pivot axis with a cantilever bias in the same direction regardless of the position of the movable platform during printing of the 3-D object; and
    wherein a deposition area in which the material emitter deposits material to form at least part of the workpiece is laterally offset from a stage support such that the deposition area overlies a cantilevered portion of the stage during printing of the 3-D object.

18. A 3-D printer as recited in claim 17 wherein the platform is rotatable within the workpiece support plane about a point of origin, the 3-D printer further comprising:
    a slider that carries the platform, the slider being moveable in a linear direction, wherein linear movement of the slider causes a corresponding linear movement of the platform, whereby the 3-D printer is a polar coordinates printer; and
    a contact positioned at the point of origin on the platform, wherein the contact is arranged to generate a signal when the contact is touched by the material emitter, wherein the signal may be used to help determine a location of the material emitter relative to the platform.

19. A 3-D printer as recited in claim 17 wherein during the printing of each different layer, the workpiece support surface stays the same consistent distance relative to the material emitter when the movable platform is moved within the two degrees of freedom to facilitate the printing of such layer even when the platform is not horizontally level.

20. A 3-D printer as recited in claim 17 further comprising:
    a housing that encloses the stage and platform,
    a heater configured to heat the printing material, wherein the heater is received by a heater receiving element on the cartridge.

21. A machine comprising:
    a stage;
    a movable platform carried by the stage, the movable platform having a workpiece support surface for supporting a workpiece, the workpiece support surface defining a workpiece support plane, the platform being moveable to move the workpiece support surface in two degrees of freedom within the workpiece support plane;
    wherein the stage is supported in a cantilevered manner relative to a pivot axis with a cantilever bias in the same direction regardless of the position of the movable platform within the workpiece support plane during work on the workpiece;
    wherein a working area in which a material emitter tool carried by the workpiece support apparatus interacts with the workpiece during work on the workpiece is offset laterally from a stage support such that the working area overlies a cantilevered portion of the stage during all work by the material emitter on the workpiece; and wherein the movable platform surface stays the same consistent distance relative to the tool when the movable platform is moved in any planar direction within the workpiece support plane during work on the workpiece.

22. A machine as recited in claim 21 wherein the machine is a 3-D printer and the workpiece is 3-D printed object.

* * * * *